United States Patent
Morimoto et al.

(10) Patent No.: US 9,399,400 B2
(45) Date of Patent: Jul. 26, 2016

(54) VEHICULAR ACCELERATION SUPPRESSION DEVICE AND VEHICULAR ACCELERATION SUPPRESSION METHOD

(71) Applicant: NISSAN MOTOR CO., LTD., Yokohama-shi, Kanagawa (JP)

(72) Inventors: Akira Morimoto, Sagamihara (JP); Osamu Fukata, Sagamihara (JP); Yasuhisa Hayakawa, Yokohama (JP); Daisuke Oiki, Zama (JP); Daisuke Tanaka, Hadano (JP)

(73) Assignee: NISSAN MOTOR CO., LTD., Yokohama-Shi, Kanagawa (JP)

( * ) Notice: Subject to any disclaimer, the term of this patent is extended or adjusted under 35 U.S.C. 154(b) by 0 days.

(21) Appl. No.: 14/443,114

(22) PCT Filed: Nov. 22, 2013

(86) PCT No.: PCT/JP2013/006888
§ 371 (c)(1),
(2) Date: May 15, 2015

(87) PCT Pub. No.: WO2014/083828
PCT Pub. Date: Jun. 5, 2014

(65) Prior Publication Data
US 2015/0291031 A1    Oct. 15, 2015

(30) Foreign Application Priority Data
Nov. 27, 2012    (JP) .................... 2012-259207

(51) Int. Cl.
*B60K 31/00* (2006.01)
*B60W 50/12* (2012.01)
(Continued)

(52) U.S. Cl.
CPC ............ *B60K 31/0058* (2013.01); *B60W 30/06* (2013.01); *B60W 50/12* (2013.01);
(Continued)

(58) Field of Classification Search
CPC ......... B60K 31/0058; B60W 2520/06; B60W 2540/10; B60W 2540/18; B60W 2720/106; B60W 30/06; B60W 50/12; B62D 15/027; G06K 9/00812; G08G 1/168
USPC ............................................................ 701/70
See application file for complete search history.

(56) References Cited

U.S. PATENT DOCUMENTS 5,234,071 A * 8/1993 Kajiwara ........... B60K 31/0008
                                                    180/169
7,606,644 B2 * 10/2009 Kato .................. B62D 15/0285
                                                    340/932.2
(Continued)

FOREIGN PATENT DOCUMENTS

JP          10-272913 A      10/1998
JP          2003137001 A      5/2003
(Continued)

*Primary Examiner* — Thomas Tarcza
*Assistant Examiner* — Tyler J Lee
(74) *Attorney, Agent, or Firm* — Young Basile Hanlon & MacFarlane P.C.

(57) ABSTRACT

Based on a parking frame certainty degree indicative of a degree of certainty about a presence is a parking frame in the travel direction of the vehicle and a parking frame entering certainty degree indicative of a degree of certainty about whether the vehicle enters the parking frame, a total certainty degree indicative of a total degree of the certainty of the parking frame certainty degree and the parking frame entering certainty degree is calculated. Acceleration of the vehicle is controlled depending on a manipulation amount of an accelerator pedal manipulated by a drive to instruct a driving force and is suppressed in a lower suppression degree when the total certainty degree is lower than when the total certainty degree is higher. Furthermore, the acceleration of the vehicle is suppressed in the suppression degree decreased depending on the travel direction of the vehicle.

7 Claims, 20 Drawing Sheets

| TOTAL CERTAINTY DEGREE / ACCELERATION SUPPRESSION CONDITION | EXTREMELY LOW | LOW | HIGH· EXTREMELY HIGH |
|---|---|---|---|
| SUPPRESSION CONTROL START TIMING (ACCELERATOR OPENING DEGREE) | 80% | 50% | 50% |
| SUPPRESSION AMOUNT | MEDIUM | MEDIUM | LARGE |
| WARNING SOUND | YES | YES | YES |

(51) Int. Cl.
*B60W 30/06* (2006.01)
*G06K 9/00* (2006.01)
*B62D 15/02* (2006.01)
*G08G 1/16* (2006.01)

(52) U.S. Cl.
CPC ......... *B62D 15/027* (2013.01); *G06K 9/00812* (2013.01); *B60W 2520/06* (2013.01); *B60W 2540/10* (2013.01); *B60W 2540/18* (2013.01); *B60W 2720/106* (2013.01); *G08G 1/168* (2013.01)

(56) References Cited

U.S. PATENT DOCUMENTS

| | | | | |
|---|---|---|---|---|
| 2001/0027363 | A1* | 10/2001 | Shimazaki | B60R 1/00 701/41 |
| 2003/0080877 | A1* | 5/2003 | Takagi | B60R 1/00 340/932.2 |
| 2004/0153243 | A1* | 8/2004 | Shimazaki | B62D 15/0275 701/300 |
| 2005/0049766 | A1* | 3/2005 | Tanaka | B62D 15/0285 701/36 |
| 2007/0010918 | A1* | 1/2007 | Shimazaki | B62D 15/028 701/1 |
| 2007/0100543 | A1* | 5/2007 | Kato | B62D 15/027 701/36 |
| 2013/0173148 | A1* | 7/2013 | Kagawa | B62D 15/0275 701/400 |
| 2014/0039728 | A1 | 2/2014 | Imazu et al. | |

FOREIGN PATENT DOCUMENTS

| | | |
|---|---|---|
| JP | 2008285083 A | 11/2008 |
| JP | 2009071659 A | 4/2009 |
| JP | 2010183234 A | 8/2010 |
| JP | 2010195118 A | 9/2010 |
| JP | 2012087692 A | 5/2012 |
| JP | 2012136206 A | 7/2012 |
| JP | 2012228119 A | 11/2012 |

* cited by examiner

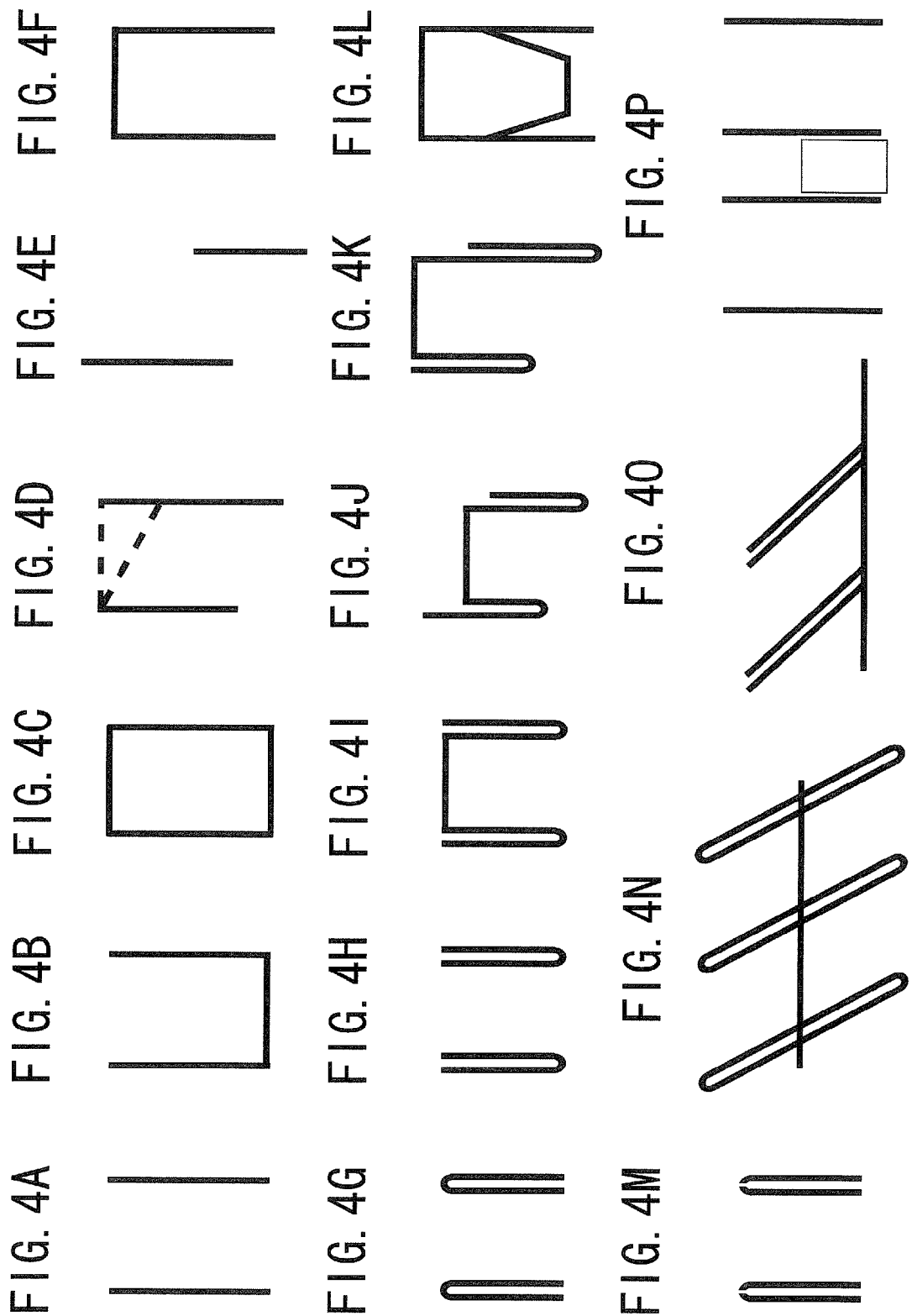

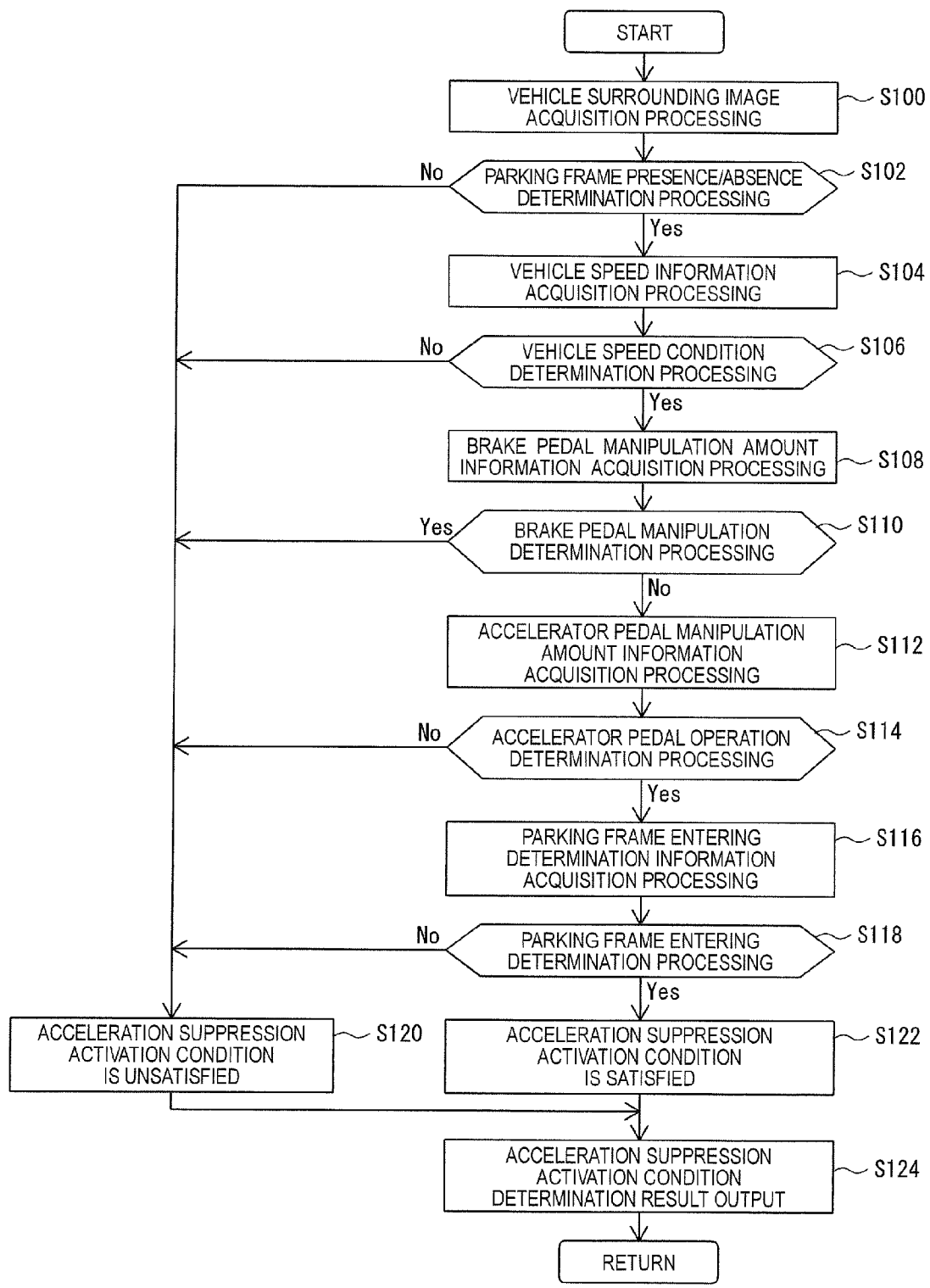

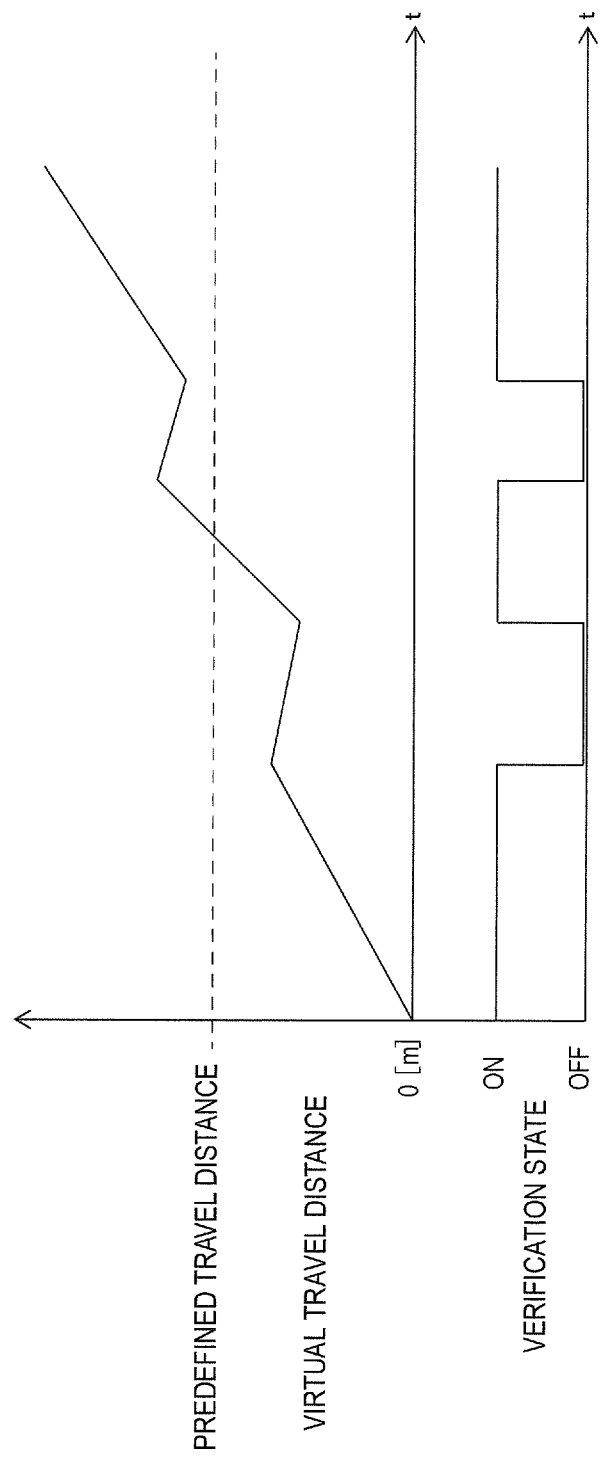

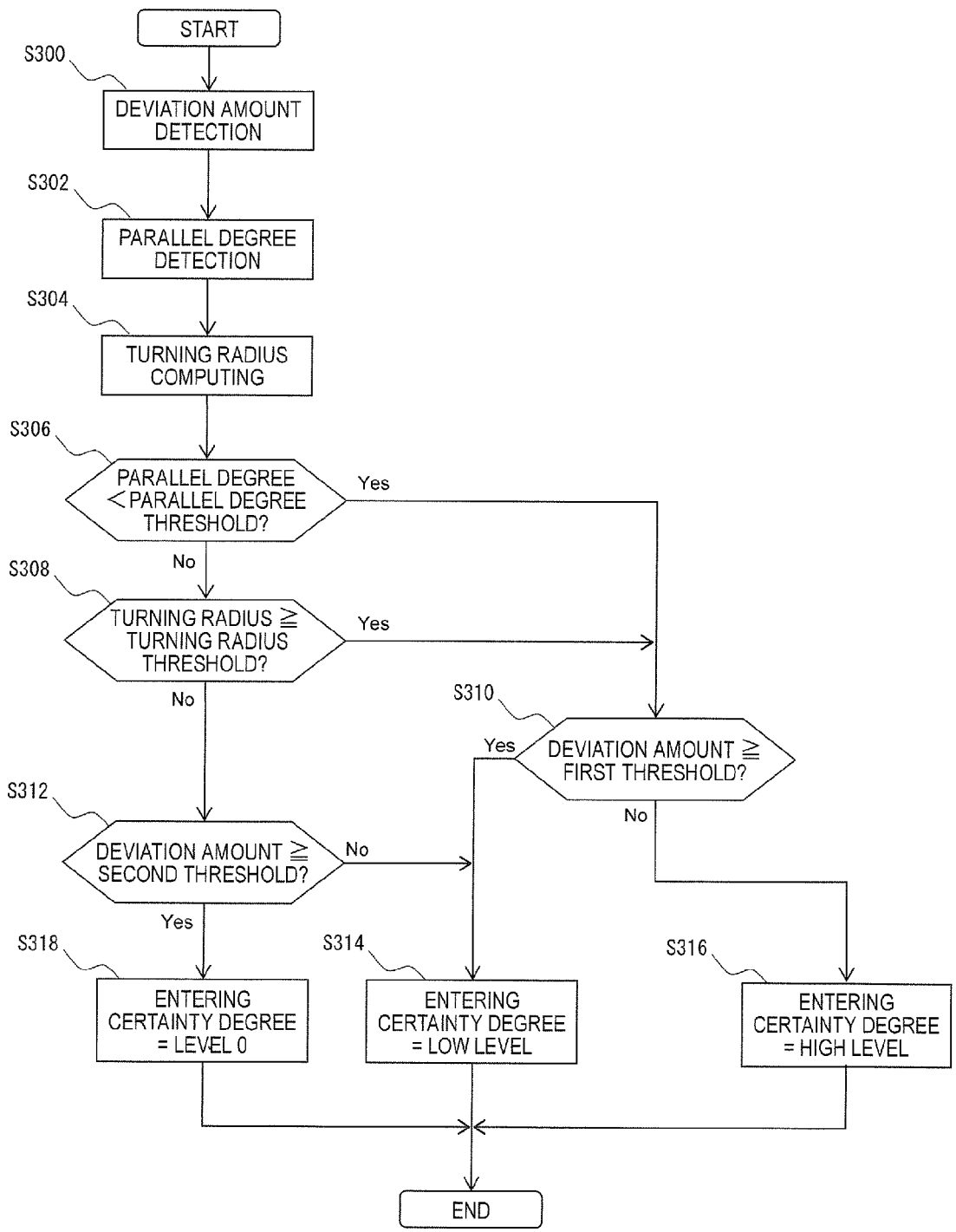

FIG. 13

| ENTERING CERTAINTY DEGREE \ FRAME CERTAINTY DEGREE | LEVEL 0 | LEVEL 1 | LEVEL 2 | LEVEL 3 | LEVEL 4 |
|---|---|---|---|---|---|
| LEVEL 0 | — | — | — | — | — |
| LOW LEVEL | — | EXTREMELY LOW | LOW | LOW | LOW |
| HIGH LEVEL | — | EXTREMELY LOW | LOW | HIGH | EXTREMELY HIGH |

FIG. 14

| ACCELERATION SUPPRESSION CONDITION \ TOTAL CERTAINTY DEGREE | EXTREMELY LOW | LOW | HIGH | EXTREMELY HIGH |
|---|---|---|---|---|
| SUPPRESSION CONTROL START TIMING (ACCELERATOR OPENING DEGREE) | 80% | 80% | 50% | 50% |
| SUPPRESSION AMOUNT | SMALL | MEDIUM | MEDIUM | LARGE |
| WARNING SOUND | NO | YES | YES | YES |

| ACCELERATION SUPPRESSION CONDITION / PARKING FRAME CERTAINTY DEGREE | LEVEL 1 | LEVEL 2 | LEVEL 3 | LEVEL 4 |
|---|---|---|---|---|
| SUPPRESSION CONTROL START TIMING (ACCELERATOR OPENING DEGREE) | 80% | 80% | 50% | 50% |
| SUPPRESSION AMOUNT | SMALL | MEDIUM | MEDIUM | LARGE |
| WARNING SOUND | NO | YES | YES | YES |

FIG. 18

| ENTERING CERTAINTY DEGREE \ FRAME CERTAINTY DEGREE | LEVEL 0 | LEVEL 1 | | LEVEL 2 TO 4 | |
|---|---|---|---|---|---|
| LEVEL 0 | – | – | | – | |
| LOW LEVEL | – | SINGLE LINE | DOUBLE LINE | SINGLE LINE | DOUBLE LINE |
| | | – | EXTREMELY LOW | EXTREMELY LOW | EXTREMELY HIGH |
| HIGH LEVEL | – | EXTREMELY LOW | | EXTREMELY HIGH | |

FIG. 19

| ACCELERATION SUPPRESSION CONDITION \ TOTAL CERTAINTY DEGREE | EXTREMELY LOW | EXTREMELY HIGH |
|---|---|---|
| SUPPRESSION CONTROL START TIMING (ACCELERATOR OPENING DEGREE) | 80% | 50% |
| HOLDING TIME | 0.25[sec] | 0.65[sec] |
| SUPPRESSION AMOUNT | SMALL | LARGE |

| ENTERING CERTAINTY DEGREE \ FRAME CERTAINTY DEGREE | LEVEL 0 | LEVEL 1 | LEVEL 2 | LEVEL 3 | LEVEL 4 |
|---|---|---|---|---|---|
| LEVEL 0 | — | — | — | — | — |
| LOW FORWARD MOVEMENT LEVEL | — | EXTREMELY LOW | LOW | LOW | LOW |
| HIGH FORWARD MOVEMENT LEVEL | — | EXTREMELY LOW | LOW | HIGH | EXTREMELY HIGH |
| LOW BACKWARD MOVEMENT LEVEL | — | EXTREMELY LOW | LOW | LOW | HIGH |
| HIGH BACKWARD MOVEMENT LEVEL | — | LOW | HIGH | HIGH | EXTREMELY HIGH |

FIG. 22

| ACCELERATION SUPPRESSION CONDITION \ TOTAL CERTAINTY DEGREE | EXTREMELY LOW | LOW | HIGH· EXTREMELY HIGH |
|---|---|---|---|
| SUPPRESSION CONTROL START TIMING (ACCELERATOR OPENING DEGREE) | 80% | 50% | 50% |
| SUPPRESSION AMOUNT | MEDIUM | MEDIUM | LARGE |
| WARNING SOUND | YES | YES | YES |

FIG. 23

| TRAVEL STATE \ FRAME CERTAINTY DEGREE | LEVEL 0 | LEVEL 1 | LEVEL 2 | LEVEL 3 | LEVEL 4 |
|---|---|---|---|---|---|
| FORWARD MOVEMENT | — | EXTREMELY LOW | LOW | HIGH | EXTREMELY HIGH |
| BACKWARD MOVEMENT | — | LOW | HIGH | HIGH | EXTREMELY HIGH |

FIG. 24

| FRAME CERTAINTY DEGREE / ENTERING CERTAINTY DEGREE | LEVEL 0 | LEVEL 1 | LEVEL 2 | LEVEL 3 | LEVEL 4 |
|---|---|---|---|---|---|
| LEVEL 0 | — | — | — | — | — |
| LOW NON-TURNING STATE LEVEL | — | EXTREMELY LOW | LOW | LOW | LOW |
| HIGH NON-TURNING STATE LEVEL | — | EXTREMELY LOW | LOW | HIGH | EXTREMELY HIGH |
| LOW TURNING STATE LEVEL | — | EXTREMELY LOW | LOW | LOW | HIGH |
| HIGH TURNING STATE LEVEL | — | LOW | HIGH | HIGH | EXTREMELY HIGH |

FIG. 25

| FRAME CERTAINTY DEGREE / TRAVEL STATE | LEVEL 0 | LEVEL 1 | LEVEL 2 | LEVEL 3 | LEVEL 4 |
|---|---|---|---|---|---|
| NON-TURNING STATE | — | EXTREMELY LOW | LOW | HIGH | EXTREMELY HIGH |
| TURNING STATE | — | LOW | HIGH | HIGH | EXTREMELY HIGH |

FIG. 26

| VEHICLE SPEED / CONTROL | 0[km/h] | 0~15[km/h] | 15~20[km/h] | 20[km/h]~ |
|---|---|---|---|---|
| CONTROL START | ○ | ○ | CONTROL START CONDITION IS REGULATED | CONTROL START CONDITION IS REGULATED |
| CONTROL CONTINUATION | ○ | ○ | ○ | CONTROL TERMINATION CONDITION IS RELAXED |
| CERTAINTY DEGREE | — | — | CERTAINTY DEGREE IS MAINTAINED DURING CONTROL  CERTAINTY DEGREE IS DECREASED OTHER THAN DURING CONTROL | CERTAINTY DEGREE IS DECREASED ACROSS THE BOARD | ced so as to decrease the driving speed regardless of the manipulation of the accelerator by the driver.

VEHICULAR ACCELERATION SUPPRESSION DEVICE AND VEHICULAR ACCELERATION SUPPRESSION METHOD

CROSS REFERENCE TO RELATED APPLICATION

The present application claims priority to Japanese Patent Application No. 2012-259207, filed Nov. 27, 2012, incorporated herein in its entirety.

TECHNICAL FIELD

This disclosure relates to a technology for suppressing acceleration of a vehicle in order to support driving at the time of parking.

BACKGROUND

As a technology for controlling a speed of a vehicle such as a car, for example, a safety device described in JP 2003-137001 A is known.

The safety device described in JP 2003-137001 A detects that the current position of the vehicle is a position which departs from a road (public road) on the basis of a map data of a navigation device and information indicative of the current position of the vehicle. In addition to this, when it is determined that an accelerator is manipulated so as to increase a driving speed of the vehicle and that the driving speed of the vehicle is higher than a predetermined value, the throttle is controlled so as to decrease the driving speed regardless of the manipulation of the accelerator by the driver.

The technology described in JP 2003-137001 A intends to prevent the acceleration of the vehicle which the driver does not intend, even if the accelerator is erroneously manipulated. Therefore, a technical problem is a determination of whether or not the manipulation of the accelerator is the erroneous manipulation. Then, the technology described in JP 2003-137001 A uses a condition on whether or not the vehicle is located at a position which departs from the road, and a condition on whether or not the accelerator is manipulated when the driving speed of the vehicle is detected as being higher than the predetermined value, as a condition for determining whether or not the accelerator may have been erroneously manipulated.

However, when the above-mentioned determination condition is used, a throttle of a vehicle which enters a parking space from a road is controlled so as to decrease the vehicle speed depending thereon. Therefore, there may occur a problem of spoiling a drive performance in driving when moving to the vicinity of a parking frame in a parking space or the like.

SUMMARY

The present disclosure has been made in view of the above-mentioned problem, and has an object to provide a vehicular acceleration suppression device and a vehicular acceleration suppression method capable of suppressing the degradation in the drive performance at the time of parking, and of suppressing the acceleration when the accelerator is erroneously manipulated.

In order to solve the above-mentioned problem, according to an aspect of the present disclosure, a travel direction of a vehicle is detected, and a parking frame certainty degree indicative of a degree of certainty about a presence of a parking frame in the travel direction of the vehicle on the basis of a surrounding environment of the vehicle. Then, acceleration of the vehicle is suppressed in a suppression degree decreased depending on the travel direction which has been detected.

BRIEF DESCRIPTION OF THE DRAWINGS

FIGS. 4A to 4P are views illustrating patterns of parking frames for which a parking frame certainty degree calculation unit calculates a parking frame certainty degree;

FIG. 5 is a flowchart illustrating processing by an acceleration suppression activation condition determination unit of determining whether or not an acceleration suppression activation condition is satisfied;

FIG. 10 is a view illustrating processing performed by a parking frame certainty degree calculation unit;

FIG. 11 is a flowchart illustrating processing by a parking frame entering certainty degree calculation unit of calculating a parking frame entering certainty degree;

FIG. 13 is a view illustrating a total certainty degree calculation map;

FIG. 14 is a view illustrating an acceleration suppression condition computing map;

FIG. 18 is a view illustrating a modification of the first embodiment of the present disclosure;

FIG. 19 is a view illustrating a modification of the first embodiment of the present disclosure;

FIG. 22 is a view illustrating an acceleration suppression condition computing map for backward movement;

FIG. 23 is a view illustrating a modification of the second embodiment of the present disclosure;

FIG. 24 is a view illustrating a total certainty degree calculation map used in the third embodiment of the present disclosure;

FIG. 25 is a view illustrating a modification of the third embodiment of the present disclosure; and FIG. 26 is a view illustrating a map used in processing performed by an acceleration suppression control computing unit in the fourth embodiment of the present disclosure.

DETAILED DESCRIPTION OF THE EMBODIMENTS

Hereinafter, embodiments of the present disclosure will now be described with reference to the drawings.
(First Embodiment)
(Configuration)

Figure 1:
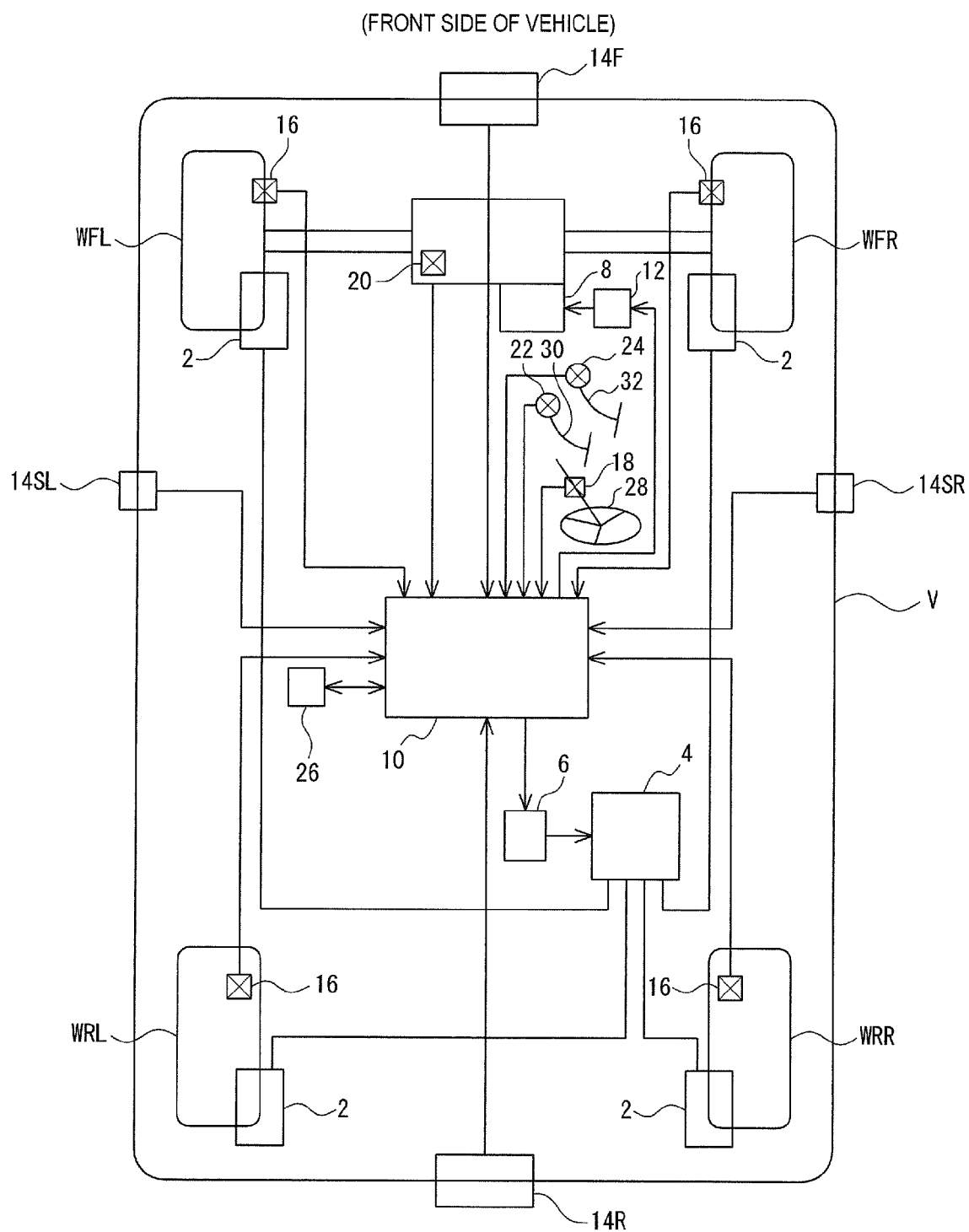
FIG. 1 is a conceptual diagram illustrating a configuration of a vehicle including a vehicular acceleration suppression device according to the first embodiment of the present disclosure.

Firstly, a configuration of a vehicle including a vehicular acceleration suppression device according to the present embodiment will be described by using FIG. 1. FIG. 1 is a conceptual diagram illustrating the configuration of the vehicle including the vehicular acceleration suppression device according to the present embodiment.

As illustrated in FIG. 1, the vehicle V includes wheels W (a front right wheel WFR, a front left wheel WFL, a rear right wheel WRR, and a rear left wheel WRL), a brake device 2, a fluid pressure circuit 4, and a brake controller 6. In addition to this, the vehicle V includes an engine 8 and an engine controller 12.

The brake device 2 is configured with a wheel cylinder, for example, and is provided for each wheel W. It is to be noted that the brake device 2 is not limited to a device of applying a brake force by a fluid pressure, and may be configured with an electric brake device or the like.

The fluid pressure circuit 4 includes piping connected to the respective brake devices 2. The brake controller 6 is configured to control the brake force generated at the respective brake devices 2 to be a value corresponding to a brake force command value via the fluid pressure circuit 4, on the basis of the brake force command value received from a travel controller 10 which is a higher controller. That is, the brake controller 6 configures a deceleration control unit. It is to be noted that the travel controller 10 will be described later. Thus, the brake device 2, the fluid pressure circuit 4, and the brake controller 6 configure a brake device of generating a brake force.

The engine 8 configures a drive source of the vehicle V. The engine controller 12 is configured to control a torque (drive force) generated at the engine 8, on the basis of a target throttle opening degree signal (acceleration command value) received from the travel controller 10. That is, the engine controller 12 configures an acceleration control unit. It is to be noted that the target throttle opening degree signal will be described later. Thus, the engine 8 and the engine controller 12 configure a drive unit of generating the drive force.

It is to be noted that the drive source of the vehicle V is not limited to the engine 8, and may be configured with an electric motor. Furthermore, the drive source of the vehicle V may be configured by combining the engine 8 with the electric motor.

Figure 2:
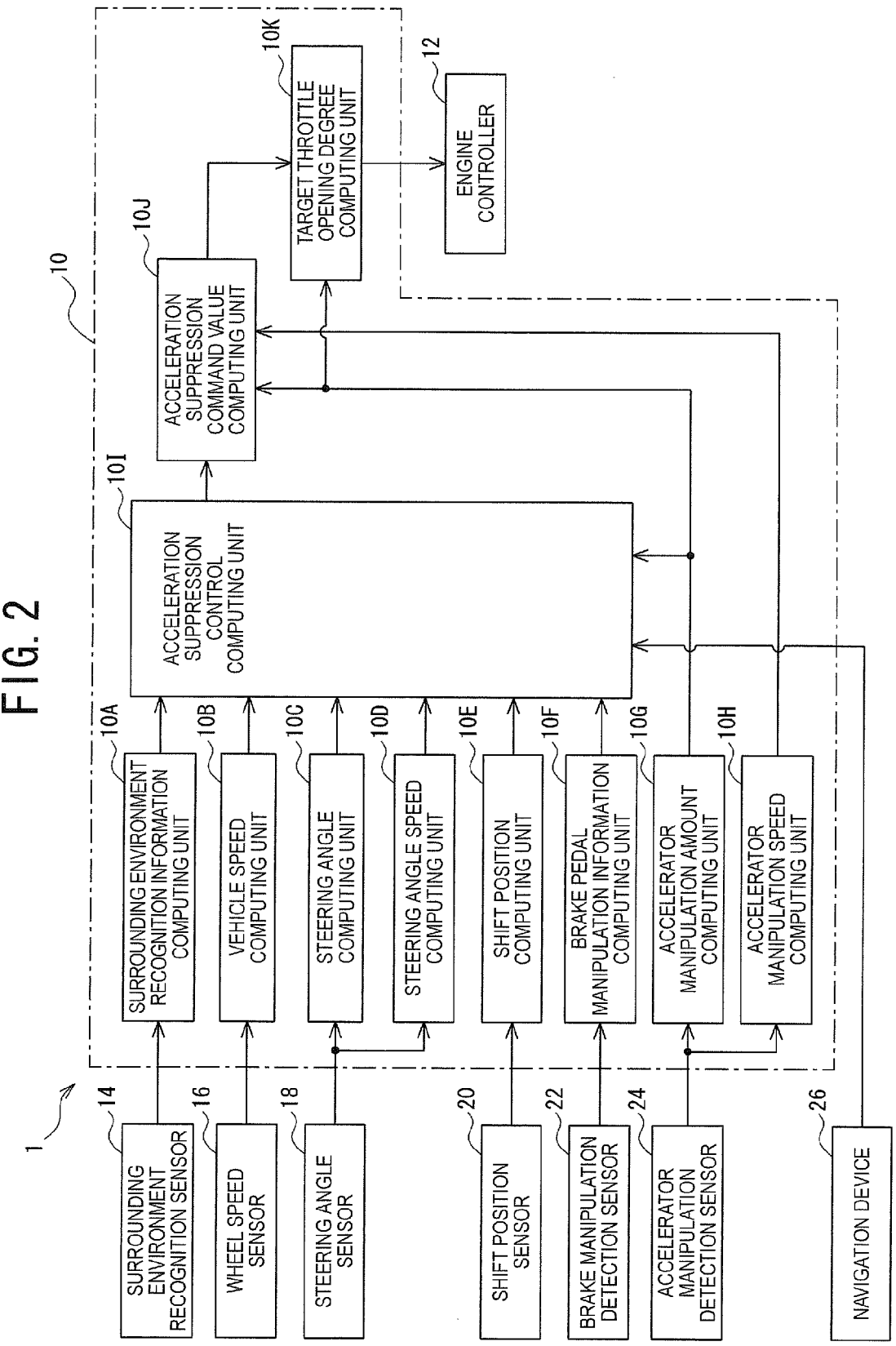
FIG. 2 is a block diagram illustrating a schematic configuration of a vehicular acceleration suppression device according to the first embodiment of the present disclosure.

Next, the schematic configuration of the vehicular acceleration suppression device 1 will be described by using FIG. 2 and referring to FIG. 1. FIG. 2 is a block diagram illustrating the schematic configuration of the vehicular acceleration suppression device 1 according to the present embodiment.

As illustrated in FIG. 1 and FIG. 2, the vehicular acceleration suppression device 1 includes a surrounding environment recognition sensor 14, a wheel speed sensor 16, a steering angle sensor 18, a shift position sensor 20, a brake manipulation detection sensor 22, and an accelerator manipulation detection sensor 24. In addition to this, the vehicular acceleration suppression device 1 includes a navigation device 26 and a travel controller 10.

The surrounding environment recognition sensor 14 is configured to capture an image of surroundings of the vehicle V, and to generate an information signal (hereinafter, may be referred to as "individual image signal") including individual images corresponding to plural imaging directions on the basis of the respective images that has been captured. Then, the individual image signal which has been generated is output to the travel controller 10.

It is to be noted that, in the present embodiment, as an example, a description will be given of a case where the surrounding environment recognition sensor 14 is configured with a front camera 14F, a right side camera 14SR, a left side camera 14SL, and a rear camera 14R. Note that the front camera 14F is configured to capture a frontward image of the vehicle V in front-rear direction of the vehicle V, and the right side camera 14SR is configured to capture a right side image of the vehicle V. Furthermore, the left side camera 14SL is configured to capture a left side image of the vehicle V, and the rear camera 14R is configured to capture a rearward image of the vehicle V in the front-rear direction of the vehicle V. The wheel speed sensor 16 is configured, for example, with a pulse generator, such that a rotary encoder of measuring a wheel speed pulse or the like.

Furthermore, the wheel speed sensor 16 is configured to detect a rotation speed of each wheel W, and to output an information signal (hereinafter, may be referred to as "wheel speed signal") including the rotation speed which has been detected to the travel controller 10. For example, the steering angle sensor 18 is provided at a steering column (not illustrated) configured to rotatably support a steering wheel 28.

Furthermore, the steering angle sensor 18 is configured to detect a current steering angle which is a current rotation angle (steering manipulation amount) of the steering wheel 28 which is a steering manipulation element. Then, the steering angle sensor 18 is configured to output an information signal (hereinafter, may be referred to as "current steering angle signal") including the current steering angle which has been detected to the travel controller 10. It is to be noted that the information signal including the turning angle of turning wheels may be detected as information indicative of a steering angle.

It is to be noted that the steering manipulation element is not limited to the steering wheel 28 steered by a driver. For example, it may be a lever manipulated to be inclined by a driver's hand. In this case, the inclination angle of the lever from a neutral position is output as the information signal corresponding to the current steering angle signal.

The shift position sensor 20 is configured to detect a current position of a member, such as a shift knob, a shift lever, or the like, configured to change the shift position (for example, "P", "D", "R" or the like) of the vehicle V. Then, the shift position sensor 20 is configured to output an information signal (hereinafter, may be referred to as "shift position signal") including the current position which has been detected to the travel controller 10.

The brake manipulation detection sensor 22 is configured to detect an opening degree of a brake pedal 30 which is a brake force instruction manipulation element. Then, the brake manipulation detection sensor 22 is configured to output an information signal (hereinafter, may be referred to as "brake opening degree signal") including the opening degree of the brake pedal 30 which has been detected to the travel controller 10. Note that the brake force instruction manipulation element can be manipulated by the driver of the vehicle V, and is configured to instruct the brake force of the vehicle V by a change in the opening degree. It is to be noted that the brake force instruction manipulation element is not limited to the brake pedal 30 to be pressed for manipulation by the driver with a foot. For example, it may be a lever manipulated by the driver's hand.

The accelerator manipulation detection sensor 24 is configured to detect the opening degree of an accelerator pedal 32 that is a drive force instruction manipulation element. Then, the accelerator manipulation detection sensor 24 is configured to output an information signal (hereinafter, may be referred to as "accelerator opening degree signal") including the opening degree of the accelerator pedal 32 which has been detected to the travel controller 10.

Note that the drive force instruction manipulation element can be manipulated by the driver of the vehicle V, and is configured to indicate the drive force of the vehicle V by a change in the opening degree. It is to be noted that the drive force instruction manipulation element is not limited to the accelerator pedal 32 to be pressed for manipulation by the driver with the foot. For example, it may be a lever manipulated by the driver's hand.

The navigation device 26 includes a GPS (Global Positioning System) receiver, a map database, an information presentation device including a display monitor, and the like, and is configured to perform a route search, a route guidance, and the like.

Furthermore, the navigation device 26 is capable of acquiring road information such as a type, a width, and the like of the road on which the vehicle V travels, on the basis of the current position of the vehicle V acquired by using the GPS receiver and the road information stored in the map database.

Furthermore, the navigation device 26 is configured to output an information signal (hereinafter, may be referred to as "vehicle position signal") including the current position of the vehicle V acquired by using the GPS receiver to the travel controller 10. In addition to this, the navigation device 26 is configured to output an information signal (hereinafter, may be referred to as "travel road information signal") including the type, the width, and the like of the road on which the vehicle V travels to the travel controller 10.

The information presentation device is configured to output warning or another presentation in a sound or image in response to a control signal from the travel controller 10. Furthermore, the information presentation device includes for example, a speaker configured to provide information to the driver in a buzzer or a sound, and a display unit configured to provide information by presenting an image or text. Furthermore, for example, a display monitor of the navigation device 26 may be also used as the display unit.

The travel controller 10 is an electronic control unit including a CPU (Central Processing Unit) and CPU peripheral components such as a ROM (Read Only Memory), a RAM (Random Access Memory), and the like.

Furthermore, the travel controller 10 includes a parking drive support unit configured to perform a drive support processing for parking the vehicle.

The parking drive support unit of processing of the travel controller 10 functionally includes, as illustrated in FIG. 2, processing of a surrounding environment recognition information computing unit 10A, a vehicle speed computing unit 10B, a steering angle computing unit 10C, and a steering angle speed computing unit 10D. In addition to this, the parking drive support unit functionally includes processing of a shift position computing unit 10E, a brake pedal manipulation information computing unit 10F, an accelerator manipulation amount computing unit 10G, an accelerator manipulation speed computing unit 10H, and an acceleration suppression control computing unit 10I. Furthermore, the parking drive support unit functionally includes processing of an acceleration suppression command value computing unit 10J, and a target throttle opening degree computing unit 10K. These functions are configured with one or more programs.

The surrounding environment recognition information computing unit 10A is configured to create an image (bird's-eye view image) of surroundings of the vehicle V viewed from above the vehicle V on the basis of the individual image signal received from the surrounding environment recognition sensor 14. Then, the surrounding environment recognition information computing unit 10A is configured to output an information signal (hereinafter, may be referred to as "bird's-eye view image signal") including the bird's-eye view image which has been created to the acceleration suppression control computing unit 10I.

Note that the bird's-eye view image is created, for example, by synthesizing the images captured by the respective cameras (the front camera 14F, the right side camera 14SR, the left side camera 14SL, and the rear camera 14R). Furthermore, a bird's-eye view image includes, for example, an image indicative of a road marking such as a line of a parking frame (hereinafter, may be referred to as "parking frame line") displayed on a road surface.

The vehicle speed computing unit 10B is configured to compute the speed (vehicle speed) of the vehicle V from the rotation speed of the wheel W on the basis of the wheel speed signal received from the wheel speed sensor 16. Then, the vehicle speed computing unit 10B is configured to output an information signal (hereinafter, may be referred to as "vehicle speed computed value signal") including the speed which has been computed to the acceleration suppression control computing unit 10I.

The steering angle computing unit 10C is configured to compute the manipulation amount (rotation angle) of the steering wheel 28 from the neutral position on the basis of the current steering angle signal received from the steering angle sensor 18 from the current rotation angle of the steering wheel 28. Then, the steering angle computing unit 10C is configured to output an information signal (hereinafter, may be referred to as "steering angle signal") including the manipulation amount from the neutral position which has been computed to the acceleration suppression control computing unit 10I.

The steering angle speed computing unit 10D is configured to perform differential processing on the current steering angle included in the steering angle signal received from the steering angle sensor 18, and to compute the steering angle speed of the steering wheel 28. Then, the steering angle speed computing unit 10D is configured to output an information signal (hereinafter, may be referred to as "steering angle speed signal") including the steering angle speed which has been computed to the acceleration suppression control computing unit 10I.

The shift position computing unit 10E is configured to determine the current shift position on the basis of the shift position signal received from the shift position sensor 20. Then, the shift position computing unit 10E is configured to output an information signal (hereinafter, may be referred to as "current shift position signal") including the current shift position which has been computed to the acceleration suppression control computing unit 10I.

The brake pedal manipulation information computing unit 10F is configured to compute the pressed amount of the brake pedal 30 with a reference state in which the pressed amount is "0", on the basis of the brake opening degree signal which has been received from the brake manipulation detection sensor 22. Then, the brake pedal manipulation information computing unit 10F is configured to output an information signal (hereinafter, may be referred to as "brake side pressed amount signal") including the pressed amount of the brake pedal 30 which has been computed to the acceleration suppression control computing unit 10I.

The accelerator manipulation amount computing unit 10G is configured to compute the pressed amount of the accelerator pedal 32 with a reference state in which the pressed amount is "0", on the basis of the accelerator opening degree signal which has been received from the accelerator manipulation detection sensor 24. Then, the accelerator manipulation amount computing unit 10G is configured to output an information signal (hereinafter, may be referred to as "drive side pressed amount signal") including the pressed amount of the accelerator pedal 32 which has been computed to the acceleration suppression control computing unit 10I, the acceleration suppression command value computing unit 10J, and the target throttle opening degree computing unit 10K.

The accelerator manipulation speed computing unit 10H is configured to compute the manipulation speed of the accelerator pedal 32, by performing differential processing on the opening degree of the accelerator pedal 32 included in the accelerator opening degree signal which has been received from the accelerator manipulation detection sensor 24. Then, the accelerator manipulation speed computing unit 10H is configured to output an information signal (hereinafter, may be referred to as "accelerator manipulation speed signal") including the manipulation speed of the accelerator pedal 32 which has been computed to the acceleration suppression command value computing unit 10J.

The acceleration suppression control computing unit 10I is configured to receive inputs of the above-mentioned various information signals (including the bird's-eye view image signal, the vehicle speed computed value signal, the steering angle signal, the steering angle speed signal, the current shift position signal, the brake side pressed amount signal, the drive side pressed amount signal, the vehicle position signal, and the travel road information signal). Then, the acceleration suppression control computing unit 10I is configured to compute an acceleration suppression activation condition determination result, an acceleration suppression control start timing, and an acceleration suppression control amount, to be described later, on the basis of the various information signals that have been received. Furthermore, the acceleration suppression control computing unit 10I is configured to output information signals including these parameters which have been computed to the acceleration suppression command value computing unit 10J.

It is to be noted that a detailed configuration of the acceleration suppression control computing unit 10I and processing performed by the acceleration suppression control computing unit 10I will be described later.

The acceleration suppression command value computing unit 10J is configured to receive inputs of the drive side pressed amount signal and the accelerator manipulation speed signal described above, and inputs of an acceleration suppression activation condition determination result signal, an acceleration suppression control start timing signal, and an acceleration suppression control amount signal, to be described later. Then, the acceleration suppression command value computing unit 10J is configured to compute the acceleration suppression command value which is a command value for suppressing the acceleration command value which depends on the pressed amount (drive force manipulation amount) of the accelerator pedal 32. Furthermore, the acceleration suppression command value computing unit 10J is configured to output an information signal (hereinafter, may be referred to as "acceleration suppression command value signal") including the acceleration suppression command value which has been computed to the target throttle opening degree computing unit 10K.

Furthermore, the acceleration suppression command value computing unit 10J is configured to compute a normal acceleration command value which is a command value for use in normal acceleration control depending on the acceleration suppression activation condition determination result signal which has been received. Furthermore, the acceleration suppression command value computing unit 10J is configured to output an information signal (hereinafter, may be referred to as "normal acceleration command value signal") including the normal acceleration command value which has been computed to the target throttle opening degree computing unit 10K. It is to be noted that the processing performed by the acceleration suppression command value computing unit 10J will be described later.

The target throttle opening degree computing unit 10K is configured to receive inputs of the drive side pressed amount signal, and the acceleration suppression command value signal or the normal acceleration command value signal. Then, the target throttle opening degree computing unit 10K is configured to compute the target throttle opening degree which is the throttle opening degree depending on the pressed amount of the accelerator pedal 32 or the acceleration suppression command value, on the basis of the pressed amount of the accelerator pedal 32, and the acceleration suppression command value or the normal acceleration command value. Furthermore, the target throttle opening degree computing unit 10K is configured to output an information signal (hereinafter, maybe referred to as "target throttle opening degree signal") including the target throttle opening degree which has been computed to the engine controller 12.

Furthermore, the target throttle opening degree computing unit 10K is configured to output the target throttle opening degree signal to the engine controller 12 on the basis of the acceleration suppression control start timing, to be described later, when the acceleration suppression command value includes the acceleration suppression control start timing command value to be described later. It is to be noted that the processing performed by the target throttle opening degree computing unit 10K will be described later.

(Configuration of Acceleration Suppression Control Computing Unit 10I)

Figure 3:
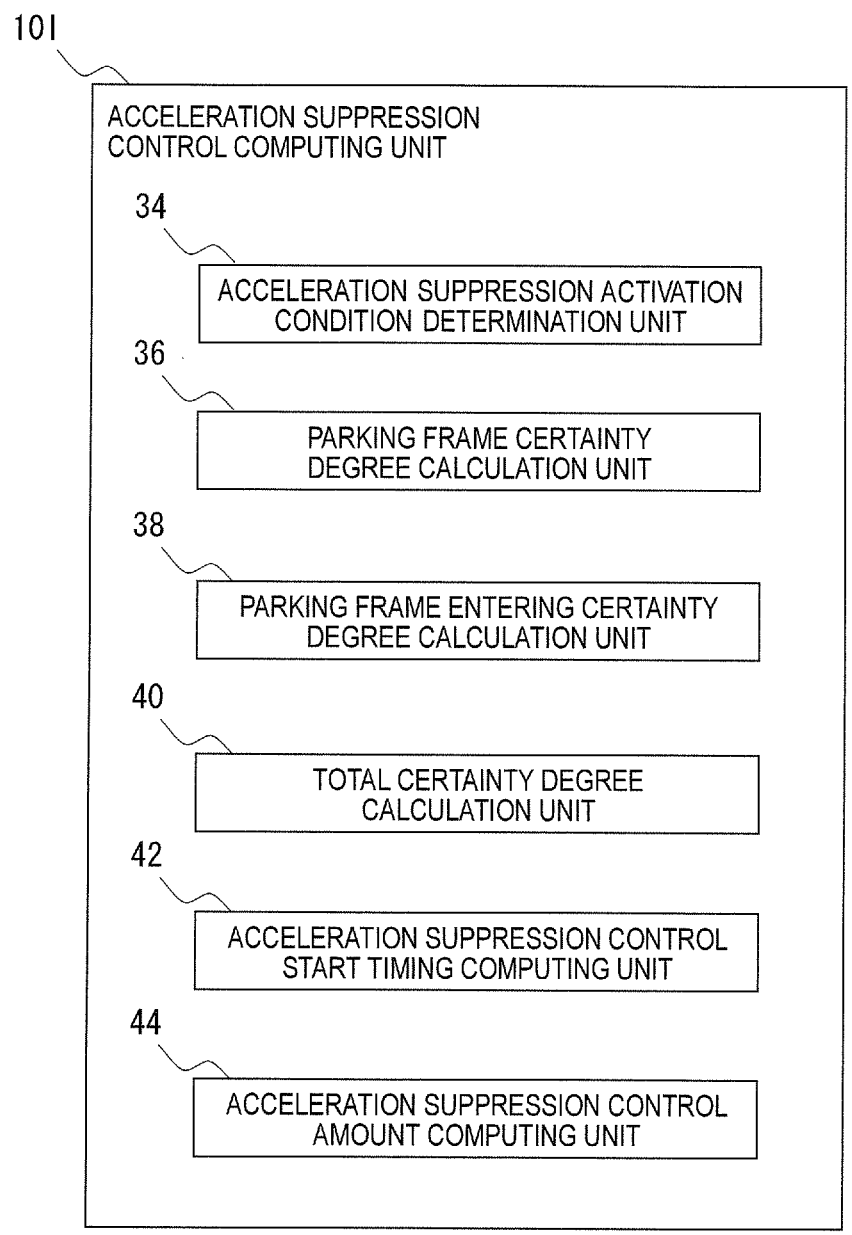
FIG. 3 is a block diagram illustrating a configuration of an acceleration suppression control computing unit.

Next, a detailed configuration of the acceleration suppression control computing unit 10I will be described, by using FIG. 3 and FIGS. 4A to 4P, and referring to FIG. 1 and FIG. 2. FIG. 3 is a block diagram illustrating the configuration of the acceleration suppression control computing unit 10I.

As illustrated in FIG. 3, the acceleration suppression control computing unit 10I includes an acceleration suppression activation condition determination unit 34, a parking frame certainty degree calculation unit 36, a parking frame entering certainty degree calculation unit 38, and a total certainty degree calculation unit 40. In addition to this, the acceleration suppression control computing unit 10I includes an acceleration suppression control start timing computing unit 42, and an acceleration suppression control amount computing unit 44.

The acceleration suppression activation condition determination unit 34 is configured to determine whether or not a condition to activate acceleration suppression control is satisfied, and to output an information signal (hereinafter, may be referred to as "acceleration suppression activation condition determination result signal") including the determination result to the acceleration suppression command value computing unit 10J. Note that the acceleration suppression control means control to suppress an acceleration command value to accelerate the vehicle V depending on the pressed amount of the accelerator pedal 32.

It is to be noted that a description will be given later of the processing by the acceleration suppression activation condition determination unit 34 of determining whether or not the condition to activate acceleration suppression control is satisfied.

The parking frame certainty degree calculation unit 36 is configured to calculate a parking frame certainty degree indicative of a degree of certainty about a presence of a parking frame in a travel direction of the vehicle V. Then, the parking frame certainty degree calculation unit 36 is configured to output an information signal (hereinafter, may be referred to as "parking frame certainty degree signal") including the parking frame certainty degree which has been calculated to the total certainty degree calculation unit 40.

Note that the parking frame certainty degree calculation unit 36 is configured to calculate the parking frame certainty degree by referring to various information included in the bird's-eye view image signal, the vehicle speed computed value signal, the current shift position signal, the vehicle position signal, and the travel road information signal.

Furthermore, there are plural patterns of the parking frames for which the parking frame certainty degree calculation unit 36 calculates the certainty degree, as illustrated in FIGS. 4A to 4P for example. It is to be noted that FIGS. 4A to 4P are views illustrating the patterns of the parking frames for which the parking frame certainty degree calculation unit 36 calculates the parking frame certainty degree. It is to be noted that the processing of calculating the parking frame certainty degree by the parking frame certainty degree calculation unit 36 will be described later.

The parking frame entering certainty degree calculation unit 38 is configure to calculate a parking frame entering certainty degree indicative of the degree of certainty about whether the vehicle V enters a parking frame. Then, the parking frame entering certainty degree calculation unit 38 is configured to output an information signal (hereinafter, may be referred to as "parking frame entering certainty degree signal") including the parking frame entering certainty degree which has been calculated to the total certainty degree calculation unit 40.

Note that the parking frame entering certainty degree calculation unit 38 is configured to calculate the parking frame entering certainty degree by referring to various information included in the bird's-eye view image signal, the vehicle speed computed value signal, the current shift position signal, and the steering angle signal. It is to be noted that the processing of calculating the parking frame entering certainty degree by the parking frame entering certainty degree calculation unit 38 will be described later.

The total certainty degree calculation unit 40 is configured to receive inputs of the parking frame certainty degree signal the parking frame entering certainty degree signal, and to calculate the total certainty indicative of a total certainty degree of the parking frame certainty degree and the parking frame entering certainty degree. Then, the total certainty degree calculation unit 40 is configured to output an information signal (hereinafter, may be referred to as "total certainty degree signal") including the total certainty degree which has been calculated to the acceleration suppression control start timing computing unit 42 and the acceleration suppression control amount computing unit 44. It is to be noted that the processing of calculating the total certainty degree by the total certainty degree calculation unit 40 will be described later.

The acceleration suppression control start timing computing unit 42 is configured to compute the acceleration suppression control start timing which is a timing to start acceleration suppression control. Then, the acceleration suppression control start timing computing unit 42 is configured to output an information signal (hereinafter, may be referred to as "acceleration suppression control start timing signal") including the acceleration suppression control start timing which has been computed to the acceleration suppression command value computing unit 10J.

Note that the acceleration suppression control start timing computing unit 42 is configured to compute the acceleration suppression control start timing by referring to various information included in the total certainty degree signal, the brake side pressed amount signal, the vehicle speed computed value signal, the current shift position signal, and the steering angle signal.

It is to be noted that the processing of computing the acceleration suppression control start timing by the acceleration suppression control start timing computing unit 42 will be described later.

The acceleration suppression control amount computing unit 44 is configured to compute an acceleration suppression control amount which is a control amount to suppress the acceleration command value which depends on the pressed amount of the accelerator pedal 32. Then, the acceleration suppression control amount computing unit 44 is configured to output an information signal (hereinafter, may be referred to as "acceleration suppression control amount signal") including the acceleration suppression control amount that has been computed to the acceleration suppression command value computing unit 10J.

Note that the acceleration suppression control amount computing unit 44 is configured to compute the acceleration suppression control amount by referring to various information included in the total certainty degree signal, the brake side pressed amount signal, the vehicle speed computed value signal, the current shift position signal, and the steering angle signal. It is to be noted that the processing of computing the acceleration suppression control amount by the acceleration suppression control amount computing unit 44 will be described later.

(Processing Performed by Acceleration Suppression Control Computing Unit 10I)

Next, the processing performed by the acceleration suppression control computing unit 10I will be described, by using FIG. 5 to FIG. 14, and referring to FIG. 1 to FIG. 4P.

The processing by the acceleration suppression activation condition determination unit 34 of determining whether or not the condition (hereinafter, may be referred to as "acceleration suppression activation condition") to activate the acceleration suppression control is satisfied will be described, by using FIG. 5 and FIG. 7, and referring to FIG. 1 to FIG. 4P.

FIG. 5 is a flowchart illustrating the processing by the acceleration suppression activation condition determination unit 34 of determining whether or not the acceleration suppression activation condition is satisfied. It is to be noted that the acceleration suppression activation condition determination unit 34 is configured to perform the processing to be described below at every predefined sampling time (for example, 10 msec).

As illustrated in FIG. 5, when the acceleration suppression activation condition determination unit 34 starts the processing (START), firstly, in step S100, processing of acquiring an image of surroundings of the vehicle V ("vehicle surrounding image acquisition processing" in the drawing) is performed. When the processing of acquiring an image of surroundings of the vehicle V is performed in step S100, the processing performed by the acceleration suppression activation condition determination unit 34 proceeds to step S102. It is to be noted that the image of surroundings of the vehicle V is acquired by referring to the bird's-eye view image of surroundings of the vehicle V included in the bird's-eye view image signal received from the surrounding environment recognition information computing unit 10A.

In step S102, on the basis of the image acquired in step S100, processing of determining the presence or absence of the parking frame ("parking frame presence/absence determination processing" in the drawing) is performed.

Note that the processing of determining the presence or absence of the parking frame is performed, for example, by determining whether or not a white line (parking frame line) specifying the parking frame is present within a predefined distance or region (area) with the vehicle V being used as a reference. Furthermore, for the processing of recognizing the parking frame line from the image acquired in step S100, various types of publicly known methods, for example, edge detection and the like are used.

Figure 6A:
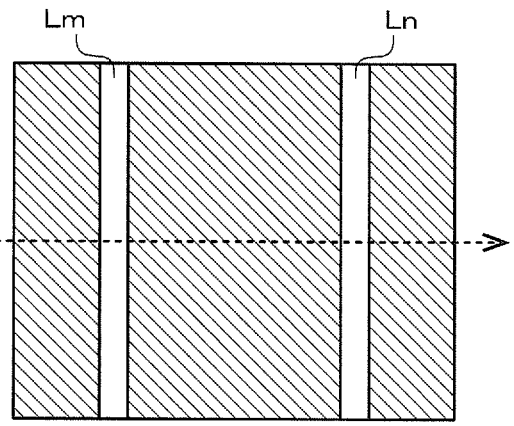
FIGS. 6A to 6C are schematic diagrams schematically illustrating a recognition method of a parking frame line by edge detection.
Figure 6B:
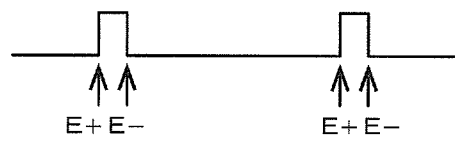
Figure 6C:
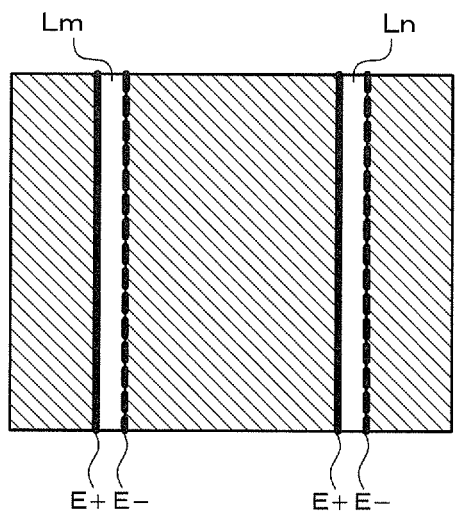

Hereinafter, a recognition method of the parking frame line by the edge detection will be described by using FIGS. 6A to 6C. FIGS. 6A to 6C are schematic diagrams schematically illustrating the recognition method of the parking frame line by the edge detection.

As illustrated in FIG. 6A, scanning in a lateral direction in a region indicative of the captured image when detecting parking frame lines Lm and Ln. In scanning in the image, for example, a black-and-white image which is obtained by binarizing the captured image, or the like is used. It is to be noted that FIG. 6A is a view illustrating the captured image.

The parking frame lines are indicated in white color or the like, which is sufficiently brighter than the road surface, and thus has brightness higher than that of the road surface. Therefore, as illustrated in FIG. 6B, plus edges in which the brightness becomes higher precipitously are detected at boundary portions from the road surface to the parking frame lines. It is to be noted that FIG. 6B is a graph indicating a change in the brightness in the image in scanning from left to right, and FIG. 6C is a view illustrating the captured image, similarly to FIG. 6A. Furthermore, in FIG. 6B, the plus edges are indicated by a symbol "E+". In FIG. 6C, the plus edges are indicated by thick solid lines with the symbol "E+".

Furthermore, minus edges in which the brightness becomes lower precipitously are detected at boundary portions from the parking frame lines to the road surface. It is to be noted that, in FIG. 6B, the minus edges are indicated by a symbol "E−". In FIG. 6C, the minus edges are indicated by thick solid lines with the symbol "E−".

Then, in the processing of recognizing the parking frame line, it is determined that the parking frame line is present by detecting one pair of the adjacent edges in the order of the plus edge and the minus edge in the scanning direction. It is to be noted that the processing performed by the parking frame certainty degree calculation unit 36 of calculating the parking frame certainty degree may be used as the processing of determining the presence or absence of the parking frame.

When it is determined that the parking frame is present ("Yes" in the drawing) in step S102, the processing performed by the acceleration suppression activation condition determination unit 34 proceeds to step S104.

On the other hand, when it is determined that the parking frame is not present ("No" in the drawing) in step S102, the processing performed by the acceleration suppression activation condition determination unit 34 proceeds to step S120.

In step S104, by referring to the vehicle speed computed value signal received from the vehicle speed computing unit 10B, the processing of acquiring the vehicle speed of the vehicle V ("vehicle speed information acquisition processing" in the drawing) is performed. When the processing of acquiring the vehicle speed of the vehicle V is performed in step S104, the processing performed by the acceleration suppression activation condition determination unit 34 proceeds to step S106.

In step S106, on the basis of the vehicle speed acquired in step S104, processing of determining whether or not the condition that the speed of the vehicle V is lower than a predefined threshold vehicle speed is satisfied ("vehicle speed condition determination processing" in the drawing) is performed.

It is to be noted that in the present embodiment, a case where the threshold vehicle speed is set to 15 km/h, as an example, will be described. Furthermore, the threshold vehicle speed is not limited to 15 km/h. For example, it may be changed depending on data of the vehicle V, such as a brake performance of the vehicle V or the like. Furthermore, for example, it may be changed depending on the local (national) traffic regulation where the vehicle V travels.

When it is determined that the condition that the vehicle speed of the vehicle V is lower than the threshold vehicle speed is satisfied ("Yes" in the drawing) in step S106, the processing performed by the acceleration suppression activation condition determination unit 34 proceeds to step S108.

On the other hand, it is determined that the condition that the vehicle speed of the vehicle V is lower than the threshold vehicle speed is not satisfied ("No" in the drawing) in step S106, the processing performed by the acceleration suppression activation condition determination unit 34 proceeds to step S120.

In step S108, by referring to the brake side pressed amount signal received from the brake pedal manipulation information computing unit 10F, processing of acquiring information about the pressed amount (manipulation amount) of the brake pedal 30 ("brake pedal manipulation amount information acquisition processing" in the drawing) is performed. When the processing of acquiring the information about the pressed amount (manipulation amount) of the brake pedal 30 is performed in step S108, the processing performed by the acceleration suppression activation condition determination unit 34 proceeds to step S110.

In step S110, on the basis of the pressed amount of the brake pedal 30 acquired in step S108, processing of determining whether or not the brake pedal 30 is manipulated ("brake pedal manipulation determination processing" in the drawing) is performed. When it is determined that the brake pedal 30 is not manipulated ("No" in the drawing) in step S110, the processing performed by the acceleration suppression activation condition determination unit 34 proceeds to step S112.

On the other hand, when it is determined that the brake pedal 30 is manipulated ("Yes" in the drawing) in step S110, the processing performed by the acceleration suppression activation condition determination unit 34 proceeds to step S120.

In step S112, by referring to the drive side pressed amount signal received from the accelerator manipulation amount computing unit 10G, processing of acquiring the information about the pressed amount (manipulation amount) of the accelerator pedal 32 ("accelerator pedal manipulation amount information acquisition processing" in the drawing) is performed. When the processing of acquiring the information about the pressed amount (manipulation amount) of the accelerator pedal 32 is performed in step S112, the processing performed by the acceleration suppression activation condition determination unit 34 proceeds to step S114.

In step S114, processing of determining whether or not the condition that the pressed amount (manipulation amount) of the accelerator pedal 32 is equal to or larger than a predefined threshold accelerator manipulation amount is satisfied ("accelerator pedal operation determination processing" in the drawing) is performed. Note that the processing in step S114 is performed on the basis of the pressed amount of the accelerator pedal 32 acquired in step S112.

It is to be noted that in the present embodiment, a case where the threshold accelerator manipulation amount is set to a manipulation amount corresponding to 3% of the opening degree of the accelerator pedal 32, as an example, will be described. Furthermore, the threshold accelerator manipulation amount is not limited to the manipulation amount corresponding to 3% of the opening degree of the accelerator pedal 32. For example, it may be changed depending on data of the vehicle V, such as the brake performance of the vehicle V or the like.

In step S114, when it is determined that the condition that the pressed amount (manipulation amount) of the accelerator pedal 32 is equal to or larger than the threshold accelerator manipulation amount is satisfied ("Yes" in the drawing), the processing performed by the acceleration suppression activation condition determination unit 34 proceeds to step S116.

On the other hand, when it is determined that the condition that the pressed amount (manipulation amount) of the accelerator pedal 32 is equal to or larger than the threshold accelerator manipulation amount is not satisfied ("No" in the drawing) in step S114, the processing performed by the acceleration suppression activation condition determination unit 34 proceeds to step S120.

In step S116, processing of acquiring information to determine whether or not the vehicle V enters a parking frame ("parking frame entering determination information acquisition processing" in the drawing) is performed. Note that, in the present embodiment, as an example, a description will be given for a case where it is determined whether or not the vehicle V enters the parking frame, on the basis of the steering angle of the steering wheel 28, an angle between the vehicle V and the parking frame, and a distance between the vehicle V and the parking frame. When the processing of acquiring the information to determine whether or not the vehicle V enters a parking frame is performed in step S116, the processing performed by the acceleration suppression activation condition determination unit 34 proceeds to step S118.

Now, a specific example of the processing performed in step S116 will be described. In step S116, by referring to the steering angle signal received from the steering angle computing unit 10C, the rotation angle (steering angle) of the steering wheel 28 is acquired. In addition to this, on the basis of the bird's-eye view image of surroundings of the vehicle V included in the bird's-eye view image signal received from the surrounding environment recognition information computing unit 10A, an angle α between the vehicle V and a parking frame L0 and a distance D between the vehicle V and the parking frame L0 are acquired.

Figure 7:
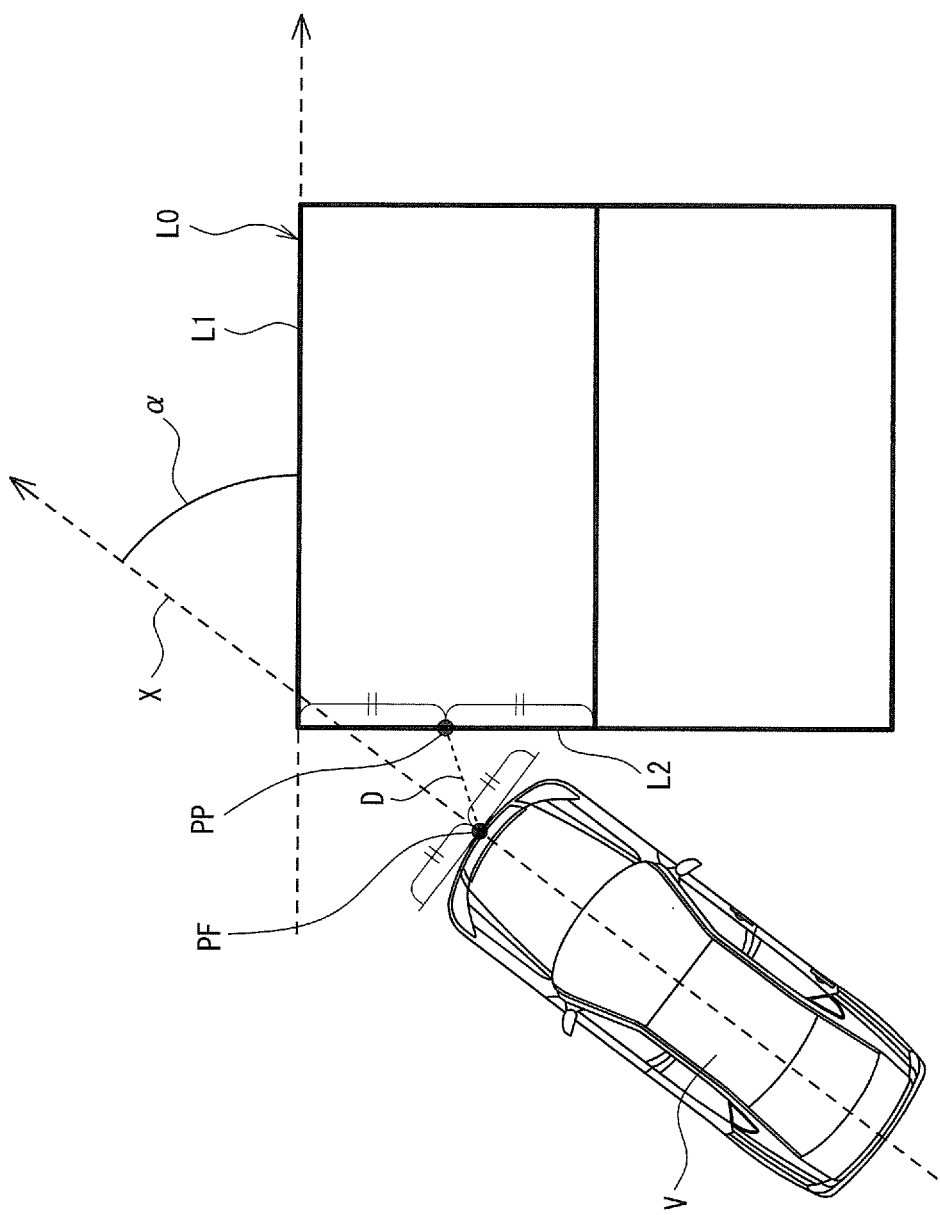
FIG. 7 is a view illustrating the vehicle, a parking frame, and a distance between the vehicle and the parking frame.

Note that the angle α is, for example, set to an absolute value of a crossing angle of a virtual straight line X and a frame line L1 as well as a line on the parking frame L0 side, as illustrated in FIG. 7. It is to be noted that FIG. 7 is a view illustrating the vehicle V, the parking frame L0, and the distance D between the vehicle V and the parking frame L0.

Furthermore, the straight line X is a straight line extending in the front-rear direction of the vehicle V passing through the center of the vehicle V (a virtual straight line extending in the travel direction). The frame line L1 is a frame line of the parking frame L0, which is parallel or substantially parallel to the front-rear direction of the vehicle V when parking in the parking frame L0 is completed. Furthermore, the line on the parking frame L0 side is an extending line of the parking line L1 existing on the parking frame L0 side.

Furthermore, the distance D is, for example, as illustrated in FIG. 7, set to a distance between a center point PF of the front end face of the vehicle V and a center point PP of an entrance L2 of the parking frame L0. The distance D, however, takes a negative value after the front end face of the vehicle V passes through the entrance L2 of the parking frame L0. It is to be noted that the distance D may be set to zero, after the front end face of the vehicle V passes through the entrance L2 of the parking frame L0.

Note that the position on the vehicle V side for defining the distance D is not limited to the center point PF. For example, they may be a predefined position on the vehicle V and a predefined position at the entrance L2. In this case, the distance D is set to be a distance between the predefined position on the vehicle V and the predefined position at the entrance L2.

As described heretofore, in step S116, as the information to determine whether or not the vehicle V enters the parking frame L0, the steering angle, the angle cc of the vehicle V and the parking frame L0, and the distance D between the vehicle V and the parking frame L0 are acquired.

In step S118, on the basis of the information acquired in step S116, processing of determining whether or not the vehicle V enters the parking frame ("parking frame entering determination processing" in the drawing) is performed.

When it is determined that the vehicle V does not enter the parking frame ("No" in the drawing) in step S118, the processing performed by the acceleration suppression activation condition determination unit 34 proceeds to step S120.

On the other hand, when it is determined that the vehicle V enters the parking frame ("Yes" in the drawing) in step S118, the processing performed by the acceleration suppression activation condition determination unit 34 proceeds to step S122.

Now, a specific example of the processing performed in step S118 will be described. In step S118, when all of following three conditions (A1 to A3) are satisfied, for example, it is determined that the vehicle V enters the parking frame.

(Condition A1) An elapsed time that has been passed after the steering angle detected in step S116 becomes a value equal to or larger than a predefined steering angle (for example, 45 degrees) is shorter than or equal to a predefined time (for example, 20 sec).

(Condition A2) The angle cc between the vehicle V and the parking frame L0 is smaller than or equal to a predefined angle (for example, 40 degrees).

(Condition A3) The distance D between the vehicle V and the parking frame L0 is shorter than or equal to a predefined distance (for example, 3 m).

It is to be noted that the processing of calculating the parking frame entering certainty degree by the parking frame entering certainty degree calculation unit 38 may be used as the processing of determining whether or not the vehicle V enters the parking frame.

Furthermore, the processing used for determining whether or not the vehicle V enters the parking frame is not limited to the processing of using plural conditions as described above. One or more conditions of the above-mentioned three conditions may be used for the processing of determining. Furthermore, the processing of determining whether or not the vehicle V enters the parking frame may be performed by using the vehicle speed of the vehicle V.

In step S120, the processing of generating the acceleration suppression activation condition determination result signal, as an information signal including a determination result that an acceleration suppression control activation condition is not satisfied, is performed ("acceleration suppression activation condition is unsatisfied" in the drawing). When the processing of generating the acceleration suppression activation condition determination result signal including the determination result that the acceleration suppression control activation condition is not satisfied is performed in step S120, the processing performed by the acceleration suppression activation condition determination unit 34 proceeds to step S124.

In step S122, processing of generating the acceleration suppression activation condition determination result signal, as an information signal including the determination result that the acceleration suppression control activation condition is satisfied, is performed ("acceleration suppression activation condition is satisfied" in the drawing). When the processing of generating the acceleration suppression activation condition determination result signal including the determination result that the acceleration suppression control activation condition is satisfied is performed in step S122, the processing performed by the acceleration suppression activation condition determination unit 34 proceeds to step S124.

In step S124, processing of outputting the acceleration suppression activation condition determination result signal generated in step S120 or step S122 to the acceleration suppression command value computing unit 10J ("acceleration suppression activation condition determination result output" in the drawing) is performed. When the processing of outputting the acceleration suppression activation condition determination result signal to the acceleration suppression command value computing unit 10J is performed in step S124, the processing performed by the acceleration suppression activation condition determination unit 34 returns (RETURN) to step S100.

The processing by the parking frame certainty degree calculation unit 36 of calculating the parking frame certainty degree will be described, by using FIG. 8 to FIG. 10, and referring to FIG. 1 to FIG. 7.

Figure 8:
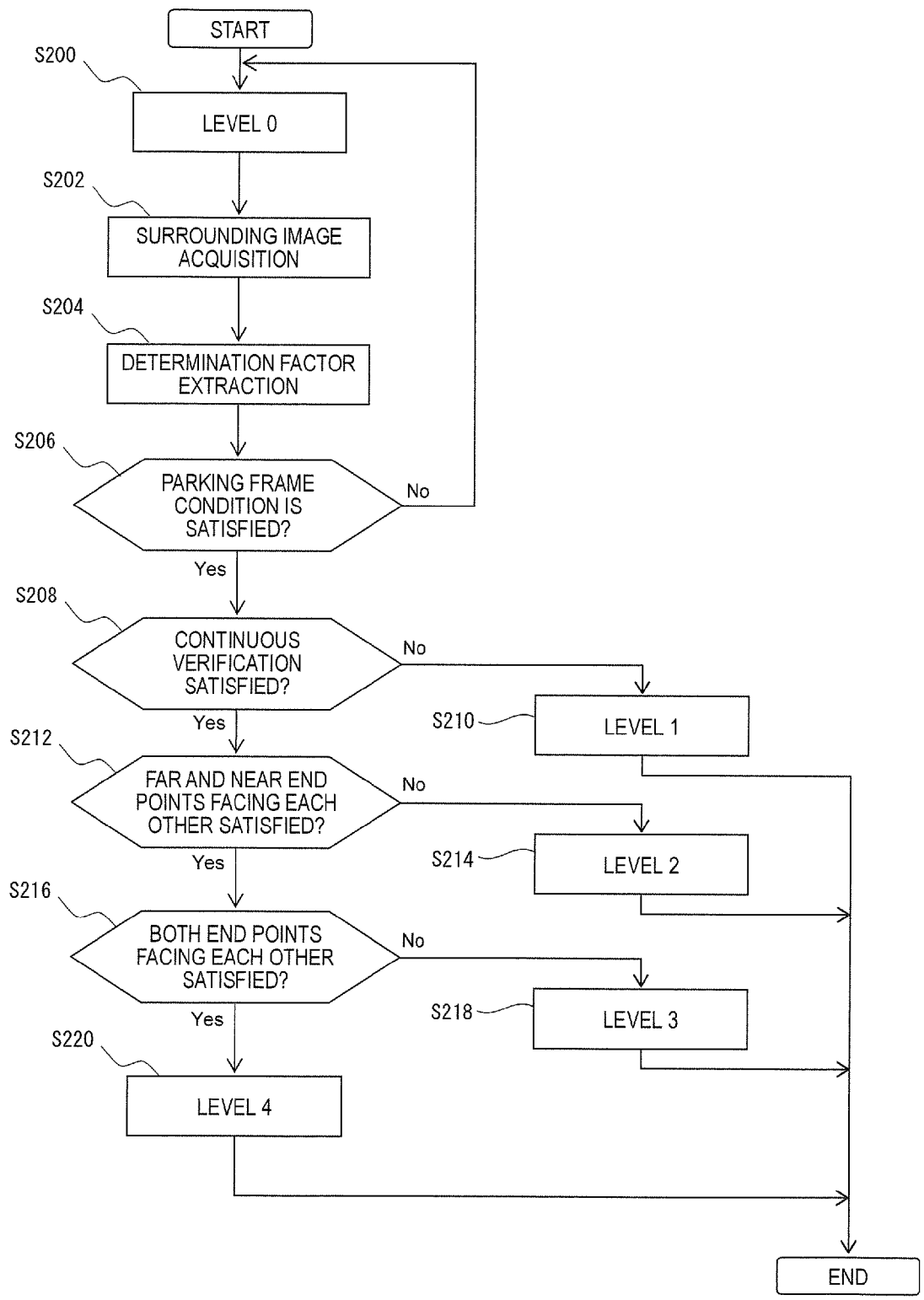
FIG. 8 is a flowchart illustrating processing by a parking frame certainty degree calculation unit of calculating a parking frame certainty degree.

FIG. 8 is a flowchart illustrating the processing by the parking frame certainty degree calculation unit 36 of calculating the parking frame certainty degree. It is to be noted that the parking frame certainty degree calculation unit 36 is configured to perform the processing to be described below at every predefined sampling time (for example, 10 msec).

As illustrated in FIG. 8, when the parking frame certainty degree calculation unit 36 starts the processing (START), firstly, processing of calculating (setting) a level of the parking frame certainty degree as a minimum (level 0) is performed in step S200 ("level 0" in the drawing). When the processing of calculating the parking frame certainty degree as the level 0 is performed in step S200, the processing performed by the parking frame certainty degree calculation unit 36 proceeds to step S202.

In step S202, processing of acquiring the bird's-eye view image of surroundings of the vehicle V included in the bird's-eye view image signal received from the surrounding environment recognition information computing unit 10A ("surrounding image acquisition" in the drawing) is performed. When the processing of acquiring the bird's-eye view image of surroundings of the vehicle V is performed in step S202, the processing performed by the parking frame certainty degree calculation unit 36 proceeds to step S204.

In step S204, from the bird's-eye view image acquired in step S202, processing of extracting a determination factor used for calculating the parking frame certainty degree ("determination factor extraction" in the drawing) is performed. When the processing of extracting the determination factor from the bird's-eye view image is performed in step S204, the processing performed by the parking frame certainty degree calculation unit 36 proceeds to step S206.

Note that the determination factor is a line (such as a white line) indicated on the road surface such as the parking frame line or the like. When, for example, the state of the line satisfies all of the following three conditions (B1 to B3), the line is extracted as the determination factor.

(Condition B1) When there is a broken portion in the line indicated on the road surface, the broken portion is the part where the indicated line is spotted or blurred (for example, a part where the clarity is lower than that of the line and is higher than that of the road surface).

(Condition B2) The width of the line indicated on the road surface is equal to or larger than a predefined width (for example, 10 cm). It is to be noted that the predefined width is not limited to 10 cm. For example, it may be changed depending on the local (national) traffic regulation where the vehicle V travels.

(Condition B3) The length of the line indicated on the road surface is equal to or longer than a predefined marking line length (for example, 2.5 m). It is to be noted that the predefined marking line length is not limited to 2.5 m. For example, it may be changed depending on the local (national) traffic regulation where the vehicle V travels.

In step S206, processing of determining whether or not the determination factor extracted in step S204 satisfies the condition of the line forming the parking line is performed ("parking frame condition is satisfied?" in the drawing). When it is determined that the determination factor extracted in step S204 does not satisfy the condition of the line forming the parking line ("No" in the drawing) in step S206, the processing performed by the parking frame certainty degree calculation unit 36 proceeds to step S200.

On the other hand, when it is determined in step S206 that the determination factor extracted in step S204 satisfies the condition of the line forming the parking line ("Yes" in the drawing), the processing performed by the parking frame certainty degree calculation unit 36 proceeds to step S208. It is to be noted that the processing performed in step S206, for example, is performed by referring to the bird's-eye view image signal received from the surrounding environment recognition information computing unit 10A.

Now, a specific example of processing performed in step S206 will be described by using FIGS. 9A to 9D. It is to be noted that FIGS. 9A to 9D are views illustrating the processing performed by the parking frame certainty degree calculation unit 36. Furthermore, in FIGS. 9A to 9D, a symbol "PE" indicates a region indicative of an image captured by the front camera 14F in the bird's-eye view images.

In step S206, firstly, from the lines indicated on the road surface, which is the determination factor extracted in step S204, two adjacent lines displayed on one screen are specified as one pair (hereinafter, may be referred to as "pairing"). It is to be noted that when three or more lines are displayed on the one screen, two or more pairs are specified with respective pairs of adjacent two lines among the three or more lines.

Next, when all of following four conditions (C1 to C4), for example, are satisfied for the two lines paired, it is determined that the determination factor extracted in step S204 satisfies the condition of the line forming the parking line.

Figure 9A:
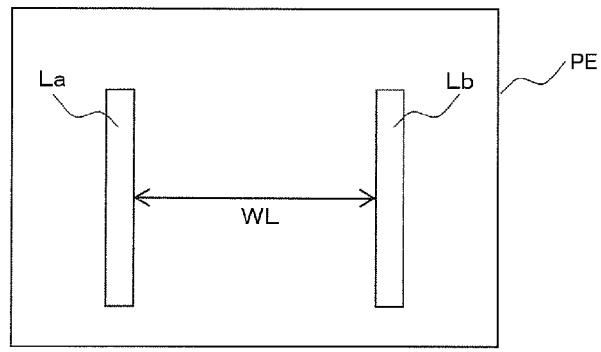
FIGS. 9A to 9D are views illustrating processing performed by a parking frame certainty degree calculation unit.

(Condition C1) As illustrated in FIG. 9A, a width WL between the two lines paired (indicated by a symbol "La" and a symbol "Lb" in the drawing) is smaller than or equal to a predefined pairing width (for example, 2.5 m). It is to be noted that the predefined pairing width is not limited to 2.5 m. For example, it may be changed depending on the local (national) traffic regulation where the vehicle V travels.

Figure 9B:
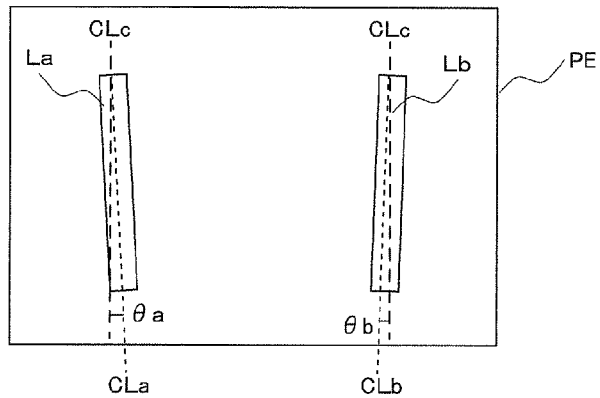

(Condition C2) As illustrated in FIG. 9B, an angle between the line La and the line Lb (parallel degree) is smaller than or equal to a predefined angle (for example, 3°). It is to be noted that the predefined angle is not limited to 3°. For example, it may be changed depending on the recognition capability or the like of the surrounding environment recognition sensor 14.

It is to be noted that, in FIG. 9B, a reference line (line extending in a vertical direction of the region PE) is indicated by a dot line with a symbol "CLc", a central axis of the line La is indicated by a broken line with a symbol "CLa", and a central axis of the line Lb is indicated by a broken line with a symbol "CLb". Furthermore, an inclination angle of the central axis CLa relative to the reference line CLc is indicated by a symbole "θa", and an inclination angle of the central axis CLb relative to the reference line CLc is indicated by a symbole "θb". Therefore, when a conditional expression of |θa−θb|≤3° is satisfied, Condition C2 is satisfied.

Figure 9C:
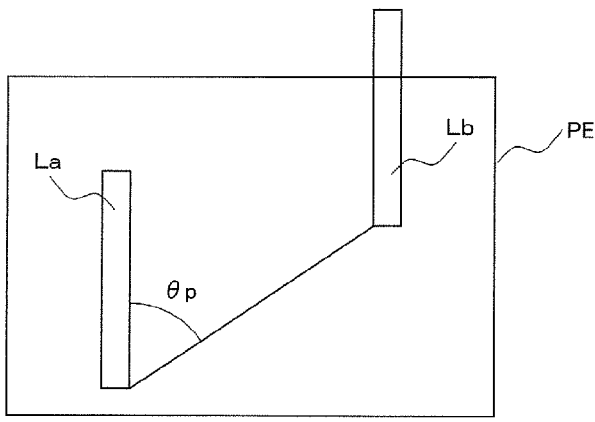

(Condition C3) As illustrated in FIG. 9C, the angle 8 between a virtual straight line connecting an end of the line La on the vehicle V side (an end on the lower side in the drawing) and an end of the line Lb on the vehicle V side, and the line L closer to the vehicle V is equal to or larger than a predefined deviation angle (for example, 45°). It is to be noted that the predefined deviation angle is not limited to 45°. For example, it may be changed depending on the recognition capability or the like of the surrounding environment recognition sensor 14.

Figure 9D:
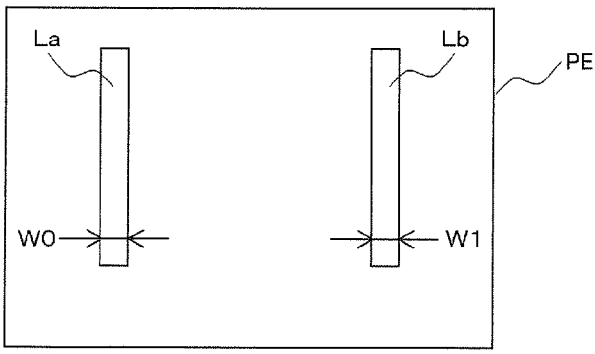

(Condition C4) As illustrated in FIG. 9D, an absolute value (|W0−W1|) of a difference between the line width W0 of the line La and the line width W1 of the line Lb is smaller than or equal to a predefined line width (for example, 10 cm). It is to be noted that the predefined line width is not limited to 10 cm. For example, it may be changed depending on the recognition capability or the like of the surrounding environment recognition sensor 14.

It is to be noted that in the processing of determining whether or not the above-described four conditions (C1 to C4) are satisfied, when, for example, the length of at least one of the line La and the line Lb is broken, for example, in two meters or so, the processing continues with the line of four meters extended with a virtual line of two meters or so.

In step S208, processing of determining whether or not the satisfaction of the condition is continuously verified in the processing of step S206 after the processing of step S206 starts until the travel distance of the vehicle V reaches a predefined travel distance is performed ("continuous verification satisfied?" in the drawing). It is to be noted that, for example, the predefined travel distance is set within a range of 1 m to 2.5 m depending on the data of the vehicle V. Furthermore, the processing in step S208 is performed by referring to, for example, the bird's-eye view image signal received from the surrounding environment recognition information computing unit 10A and the vehicle speed computed value signal received from the vehicle speed computing unit 10B.

When it is determined that the satisfaction of the condition is not continuously verified in the processing of step S206 ("No" in the drawing) in step S208, the processing performed by the parking frame certainty degree calculation unit 36 proceeds to step S210.

On the other hand, when it is determined that the satisfaction of the condition is continuously verified in the processing of step S206 ("Yes" in the drawing) in step S208, the processing performed by the parking frame certainty degree calculation unit 36 proceeds to step S212.

Note that, in the processing performed in step S208, for example, as illustrated in FIG. 10, the travel distance of the vehicle V is virtually computed depending on the state of verifying the satisfaction of the condition in the processing of step S206 and the state of not verify the satisfaction of the condition in the processing of step S206. It is to be noted that FIG. 10 is a view illustrating the processing performed by the parking frame certainty degree calculation unit 36. Furthermore, in a region indicated by "verification state" in FIG. 10, "ON" indicates the state where the satisfaction of the condition is verified in the processing of step S206, whereas "OFF" indicates the state where the satisfaction of the condition is not verified in the processing of step S206. Furthermore, in FIG. 10, "virtual travel distance" indicates the travel distance of the vehicle V which has been virtually computed.

When the state where the satisfaction of the condition is verified in the processing of step S206 is "ON", as illustrated in FIG. 10, the virtual travel distance increases. On the other hand, when the state where the satisfaction of the condition is verified in the processing of step S206 is "OFF", the virtual travel distance decreases.

It is to be noted that, in the present embodiment, as an example, a case where an inclination (increasing gain) when the virtual travel distance increases is set larger than an inclination (decreasing gain) when the virtual travel distance decreases will be described. That is, if the state where the "verification state" is "ON" and the state where the "verification state" is "OFF" have the same period of time, the virtual travel distance will be increased.

Then, when the virtual travel distance reaches the predefined travel distance without returning to the initial value (0 m in the drawing), it is determined that the satisfaction of the condition is continuously verified in the processing of step S206.

In step S210, processing of calculating the level of the parking frame certainty degree as a one-stage higher level (level 1) than the minimum (level 0) is performed ("level 1" in the drawing). When the processing of calculating the parking frame certainty degree as the level 1 is performed in step S210, the processing performed by the parking frame certainty degree calculation unit 36 is terminated (END).

In step S212, with respect to the lines La and Lb which are continuously verified in the processing of step S206, end points of the lines La and Lb located on the same side (near side end points or far side end points) with the vehicle V being used as a reference are respectively detected. Then, processing of determining whether or not the end points located on the same side face each other in the direction of the width WL ("far and near end points facing each other satisfied?" in the drawing) is performed. It is to be noted that the processing in step S212 is performed, for example, by referring to the bird's-eye view image signal received from the surrounding environment recognition information computing unit 10A and the vehicle speed computed value signal received from the vehicle speed computing unit 10B.

When it is determined that the end points located on the same side do not face each other in the direction of the width WL in step S212 ("No" in the drawing), the processing performed by the parking frame certainty degree calculation unit 36 proceeds to step S214.

On the other hand, when it is determined that the end points located on the same side face each other in the direction of the width WL in step S212 ("Yes" in the drawing), the processing performed by the parking frame certainty degree calculation unit 36 proceeds to step S216.

In step S214, processing of calculating the level of the parking frame certainty degree as a two-stage higher level (level 2) than the minimum (level 0) is performed ("level 2" in the drawing). When the processing of calculating the parking frame certainty degree as the level 2 in step S214, the processing performed by the parking frame certainty degree calculation unit 36 is terminated (END).

In step S216, with respect to the lines La and Lb in which the end points thereof located on the same side are determined to be facing each other in the direction of the width WL in the processing of step S212, other end points thereof located on the other side are detected. That is, when the near side end points (one side) of the lines La and Lb are detected in the processing of step S212, the far side end points (the other side) of the lines La and Lb are detected in step S216. Then, processing of determining whether or not the end points located on the other side face each other in the direction of the width WL ("both end points facing each other satisfied?" in the drawing) is performed. It is to be noted that the processing in step S216 is performed, for example, by referring to the bird's-eye view image signal received from the 10A and the vehicle speed computed value signal received from the vehicle speed computing unit 10B.

It is to be noted that when the end points of the lines La and Lb are detected, for example, an end point of a straight line like a end point of a line as illustrated in FIG. 4A, an end point having a letter U shape like an upper end point of a line as illustrated in FIG. 4G, and a crossing point of a double line and a horizontal line as illustrated in FIG. 4O are all processed as an end point of a straight line. Similarly, an end point of a double line like an upper end point of a line as illustrated in FIG. 4H and an end point having a gap portion in a letter U shaped curved line like an upper end point of a line as illustrated in FIG. 4M are all processed as an end point of one straight line.

Furthermore, when the end points of the lines La and Lb are detected, for example, a crossing point of slanted double lines extending in top-bottom direction and a single straight line extending in the left-right direction illustrated in FIG. 4N is not processed (recognized) as an end point. This is because, in detection of the end point, the end point is detected by scanning in a lateral direction in a region indicative of the captured image. Furthermore, for example, since a region indicated by a white square in FIG. 4P indicates an object on the road, such as a pole or the like, an end point of such an object is not detected, either.

When it is determined in step S216 that the end points located on the other side do not face each other in the direction of the width WL ("No" in the drawing), the processing performed by the parking frame certainty degree calculation unit 36 proceeds to step S218.

On the other hand, when it is determined in step S216 that the end points located on the other side face each other in the direction of the width WL ("Yes" in the drawing), the processing performed by the parking frame certainty degree calculation unit 36 proceeds to step S220.

In step S218, processing of calculating the level of the parking frame certainty degree as a three-stage higher (level 3) than the minimum (level 0) is performed ("level 3" in the drawing). When the processing of calculating the parking frame certainty degree as the level 3 is performed in step S218, the processing performed by the parking frame certainty degree calculation unit 36 terminated (END).

In step S220, processing of calculating the level of the parking frame certainty degree as a four-stage higher (level 4) than the minimum (level 0) is performed ("level 4" in the drawing). When the processing of setting the parking frame certainty degree to the level 4 is performed in step S220, the processing performed by the parking frame certainty degree calculation unit 36 is terminated (END).

Thus, in the processing of calculating the parking frame certainty degree as the level 3, the parking frame certainty degree is calculated for patterns of FIGS. 4D, 4E, 4J, and 4K, among the parking frames illustrated in FIGS. 4A to 4P. Furthermore, in the processing of calculating the parking frame certainty degree as the level 4, the parking frame certainty degree is calculated for patterns other than the patterns of FIGS. 4D, 4E, 4J, and 4K, among the parking frames illustrated in FIGS. 4A to 4P.

It is to be noted that the parking frame certainty degree may be restricted depending on the width of the parking frame as follows, especially when the pattern illustrated in FIG. 4A of a parking frame which is highly likely indicated on a public road is specified, or when the parking frame other than the pattern illustrated in FIG. 4A can not be specified.

Specifically, for example, when the width of the parking flame is smaller than or equal to 2.6 m, the parking frame certainty degree is held at the originally calculated level. When the width of the parking flame is larger than 2.6 m, however, the parking frame certainty degree is restricted such that it is not calculated as being higher than or equal to level 3. In this way, a configuration of less easily detecting the broken lines indicated on the both side of the public road as a perking frame is obtained.

The processing performed by the parking frame entering certainty degree calculation unit 38 will be described, by using FIG. 11 and FIG. 12, and referring to FIG. 1 to FIG. 10. FIG. 11 is a flowchart illustrating the processing by the parking frame entering certainty degree calculation unit 38 of calculating the parking frame entering certainty degree. It is to be noted that the parking frame entering certainty degree calculation unit 38 is configured to perform the processing to be described below at every predefined sampling time (for example, 10 msec).

As illustrated in FIG. 11, when the parking frame entering certainty degree calculation unit 38 starts the processing (START), firstly, in step S300, processing of detecting a deviation amount between a rear wheel anticipated track of the vehicle V and the parking frame ("deviation amount detection" in the drawing) is performed. When the processing of detecting the deviation amount between the rear wheel anticipated trace of the vehicle V and the parking frame is performed in step S300, the processing performed by the parking frame entering certainty degree calculation unit 38 proceeds to step S302. It is to be noted that in the present embodiment, as an example, a case where centimeter is used as a unit of the deviation amount detected in step S300 will be described. Furthermore, in the present embodiment, a case where the width of the parking frame is set to 2.5 m, as an example, will be described.

Figure 12:
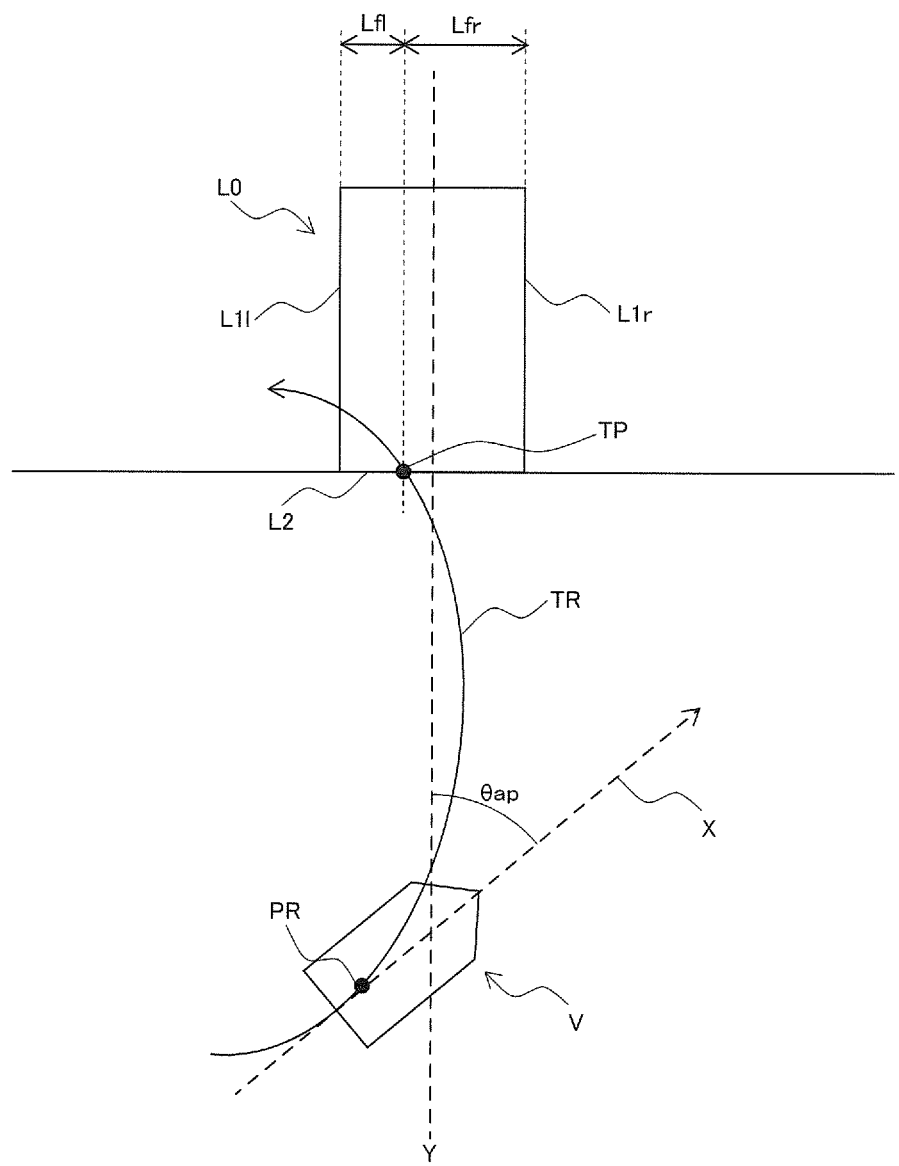
FIG. 12 is a view illustrating processing of detecting a deviation amount between a rear wheel anticipated track of a vehicle and a parking frame.

Note that, in the processing performed in step S300, for example, a rear wheel anticipated trace TR of the vehicle V is calculated as illustrated in FIG. 12, and a crossing point TP between the rear wheel anticipated trace TR which has been calculated and an entrance L2 of the parking frame L0 is calculated. Furthermore, a distance Lfl between a left side frame line L1l of the parking frame L0 and the crossing point TP and a distance Lfr between the right side frame line L1r of the parking frame L0 and the crossing point TP are calculated, and then the distance Lfl is compared with the distance Lfr.

Then, a longer one of the distance Lfl and the distance Lfr is detected as the deviation amount between the rear wheel anticipated trace TR of the vehicle V and the parking frame L0. It is to be noted that FIG. 12 is a view illustrating the processing of detecting the deviation amount between the rear wheel anticipated track TR of the vehicle V and the parking frame L0.

Furthermore, when the rear wheel anticipated trace TR of the vehicle V is calculated, a center point PR in the vehicle width direction between a right rear wheel WRR and a left rear wheel WRL in the vehicle V is set as a reference point on the vehicle V. Then, by using the images captured by the front camera 14F and the left side camera 14SL in the bird's-eye view images, the vehicle speed of the vehicle V, and the rotation angle (a steering angle) of the steering wheel 28, a virtual moving pathway of the center point PR is computed, and the rear wheel anticipated trace TR is calculated.

In step S302, for example, by using the image captured by the front camera 14F in the bird's-eye view images, processing of detecting parallel degree of a straight line X and a length direction of the parking frame L0 such as a depth direction is performed ("parallel degree detection" in the drawing). When the processing of detecting the parallel degree of the straight line X and the length direction of the parking frame L0 is performed in step S302, the processing performed by the parking frame entering certainty degree calculation unit 38 proceeds to step S304. Note that the parallel degree to be detected in step S302, as illustrated in FIG. 12, is detected as an angle θap between the center line Y of the parking frame L0 and the straight line X.

It is to be noted that in step S302, when the vehicle V moves into the parking frame L0 while moving backward, for example, by using the image captured by the rear camera 14R in the bird's-eye view images, the processing of detecting the parallel degree of the straight line X and the length direction of the parking frame L0 is performed. Note that, for example, the moving direction (forward movement or backward movement) of the vehicle V is detected by referring to the current shift position signal.

In step S304, by using the vehicle speed of the vehicle V and the rotation angle (a steering angle) of the steering wheel 28, processing of computing a turning radius of the vehicle V ("turning radius computing" in the drawing) is performed. When the processing of computing the turning radius of the vehicle V is performed in step S304, the processing performed by the parking frame entering certainty degree calculation unit 38 proceeds to step S306.

In step S306, processing of determining whether or not the parallel degree ((hp) detected in step S302 is lower than a predefined parallel degree threshold (for example, 15 degrees) is performed ("parallel degree<parallel degree threshold?" in the drawing).

When it is determined in step S306 that the parallel degree (θap) detected in step S302 is equal to or higher than the parallel degree threshold ("No" in the drawing), the processing performed by the parking frame entering certainty degree calculation unit 38 proceeds to step S308.

On the other hand, when it is determined in step S306 that the parallel degree (θap) detected in step S302 is lower than the parallel degree threshold ("Yes" in the drawing), the processing performed by the parking frame entering certainty degree calculation unit 38 proceeds to step S310.

In step S308, processing of determining whether or not the turning radius detected in step S304 is equal to or higher than a predefined turning radius threshold (for example, 100 R) is performed ("turning radius≥turning radius threshold?" in the drawing).

When it is determined in step S308 that the turning radius detected in step S304 is lower than the turning radius threshold ("No" in the drawing), the processing performed by the parking frame entering certainty degree calculation unit 38 proceeds to step S312.

On the other hand, when it is determined in step S308 that the turning radius detected in step S304 is equal to or higher than the turning radius threshold ("Yes" in the drawing), the processing performed by the parking frame entering certainty degree calculation unit 38 proceeds to step S310.

In step S310, processing of determining whether the deviation amount detected in step S300 is equal to or higher than a predefined first threshold (for example, 75 cm) is performed ("deviation amount≥first threshold?" in the drawing). It is to be noted that the first threshold is not limited to 75 cm. For example, it may be changed depending on the data of the vehicle V.

When it is determined in step S310 that the deviation amount detected in step S300 is equal to or higher than the first threshold ("Yes" in the drawing), the processing performed by the parking frame entering certainty degree calculation unit 38 proceeds to step S314.

On the other hand, when it is determined in step S310 that the deviation amount detected in step S300 is lower than the first threshold ("No" in the drawing), the processing performed by the parking frame entering certainty degree calculation unit 38 proceeds to step S316.

In step S312, processing of determining whether the deviation amount detected in step S300 is equal to or higher than a predefined second threshold (for example, 150 cm) is performed ("deviation amount second threshold?" in the drawing). Note that the second threshold is set to be larger than the first threshold. It is to be noted that the second threshold is not limited to 150 cm. For example, it may be changed depending on the data of the vehicle V.

When it is determined in step S312 that the deviation amount detected in step S300 is equal to or higher than the second threshold ("Yes" in the drawing) in step S312, the processing performed by the parking frame entering certainty degree calculation unit 38 proceeds to step S318.

On the other hand, when it is determined in step S312 that the deviation amount detected in step S300 is lower than the second threshold ("No" in the drawing), the processing performed by the parking frame entering certainty degree calculation unit 38 proceeds to step S314.

In step S314, processing of calculating (setting) the parking frame entering certainty degree as a low level is performed ("entering certainty degree=low level" in the drawing). When the processing of calculating the parking frame entering certainty degree as the low level is performed in step S314, the processing performed by the parking frame entering certainty degree calculation unit 38 is terminated (END).

In step S316, processing of calculating the parking frame entering certainty degree as a high level is performed ("entering certainty degree=high level" in the drawing).

When the processing of calculating the parking frame entering certainty degree as the high level is performed in step S316, the processing performed by the parking frame entering certainty degree calculation unit 38 is terminated (END).

In step S318, processing of calculating the parking frame entering certainty degree as the minimum (level 0) ("entering certainty degree=level 0" in the drawing) is performed. When the processing of calculating the parking frame entering certainty degree as the level 0 in step S318, the processing performed by the parking frame entering certainty degree calculation unit 38 is terminated (END).

As described above, the parking frame entering certainty degree calculation unit 38 is configured to calculate the parking frame entering certainty degree as any one level of the "level 0" as the minimum, "low level", which is higher than the level 0, and "high level", which is higher than the low level. It is to be noted that when the vehicle V is configured to include a device (parking support device) for supporting the steering operation by a driver for entering the parking frame L0, and the parking support device is in an ON state, the level of the parking frame certainty degree may be easily increased.

Note that the parking support device may be, for example, a device which displays a surrounding situation as a bird's-eye view image or the like on a monitor for parking the vehicle, or a device which sets a target parking position on a screen for guiding a course for parking. These devices may be used by manipulating a screen selector switch for displaying the surrounding situation as the bird's-eye view image or the like on the monitor, or a screen selector switch for setting the target parking position on the screen. Then, the parking support device may be configured to turn to the ON state upon manipulation of these switches.

In a specific example of the configuration in which the level of the parking frame certainty degree may be easily increased, even when the parking frame certainty degree is calculated as "level 0" in the processing of step S318, the parking frame certainty degree may be corrected to "low level" in a case where the parking support device is in the ON state. Furthermore, for example, even when the parking frame certainty degree is calculated as "low level" in the processing of step S314, the parking frame certainty degree may be corrected to "high level" in a case where the parking support device is in the ON state. It is to be noted that, in the configuration in which the level of the parking frame certainty degree may be easily increase, the parking frame certainty degree may be, for example, calculated as a predefined level (for example, "high level") regardless of the actual situation of entering the parking frame.

The processing performed by the total certainty degree calculation unit 40 of calculating the total certainty degree will be described, by using FIG. 13, and referring to FIG. 1 to FIG. 12.

The total certainty degree calculation unit 40 is configured to receive inputs of the parking frame certainty degree signal and the parking frame entering certainty degree signal, and to apply the parking frame certainty degree included in the parking frame certainty degree signal and the parking frame entering certainty degree included in the parking frame entering certainty degree signal on a total certainty degree calculation map illustrated in FIG. 13. Then, the total certainty degree is calculated on the basis of the parking frame certainty degree and the parking frame entering certainty degree.

It is to be noted that FIG. 13 is a view illustrating the total certainty degree calculation map. Furthermore, in FIG. 13, the parking frame certainty degree is indicated as "frame certainty degree" and the parking frame entering certainty degree is indicated as "entering certainty degree". Furthermore, the total certainty degree calculation map illustrated in FIG. 13 is used while the vehicle V is moving forward.

In an example of the processing by the total certainty degree calculation unit 40 of calculating the total certainty degree, when the parking frame certainty degree is "level 3" and the parking frame entering certainty degree is "high level", the total certainty degree may be calculated as "high" as illustrated in FIG. 13.

It is to be noted that, in the present embodiment, as an example, a description will be also given of a case where when the total certainty degree calculation unit 40 preforms the processing of calculating the total certainty degree, processing of storing the total certainty degree which has been calculated in a storage unit is performed, the storage unit from which data is not deleted even if an ignition switch is turned to an OFF state. Note that the storage unit from which the data is not deleted even if the ignition switch is in the OFF state is, for example, a ROM or the like.

Thus, in the present embodiment, at the time when the ignition switch is set to the OFF state after parking the vehicle V is completed, and then the ignition switch is turned to an ON state when restarting the vehicle V, the total certainty degree calculated immediately before the time is stored. For this reason, it is possible to start the control from the time when the ignition switch is turned to the ON state when restarting the vehicle V, on the basis of the total certainty degree calculated immediately before the time.

The processing performed by the acceleration suppression control start timing computing unit 42 of computing the acceleration suppression control start timing will be described, by using FIG. 14, and referring to FIG. 1 to FIG. 13.

The acceleration suppression control start timing computing unit 42 is configured to receive an input of the total certainty degree signal, and to apply the total certainty degree included in the total certainty degree signal on an acceleration suppression condition computing map illustrated in FIG. 14. Then, the acceleration suppression control start timing is computed on the basis of the total certainty degree. It is to be noted that FIG. 14 is a view illustrating the acceleration suppression condition computing map. Furthermore, in a column of the "acceleration suppression condition" in FIG. 14, the acceleration suppression control start timing is indicated by "suppression control start timing (accelerator opening degree)".

In an example of the processing performed by the acceleration suppression control start timing computing unit 42, when the total certainty degree is "high", the acceleration suppression control start timing may be set to a timing when the opening degree of the accelerator pedal 32 increases and reaches "50%", as illustrated in FIG. 14. It is to be noted that the opening degree of the accelerator pedal 32 is set to 100% when the accelerator pedal 32 is pressed (manipulated) to a maximum. It is to be noted that the acceleration suppression control start timing of FIG. 14 is an example, and it may be changed depending on the data of the vehicle V such as a brake performance of the vehicle V. Furthermore, for example, it may be changed depending on the local (national) traffic regulation where the vehicle V travels.

The processing by the acceleration suppression control amount computing unit 44 of calculating the acceleration suppression control amount will be described below, by referring to FIG. 1 to FIG. 14.

The acceleration suppression control amount computing unit 44 is configured to receive an input of the total certainty degree signal, and to apply the total certainty degree included in the total certainty degree signal on the acceleration suppression condition computing map illustrated in FIG. 14. Then, the acceleration suppression control amount is computed on the basis of the total certainty degree. It is to be noted that in a column of the "acceleration suppression condition" in FIG. 14, the acceleration suppression control amount is indicated by "suppression amount".

In an example of the processing performed by the acceleration suppression control amount computing unit 44, when the total certainty degree is "high", the acceleration suppression control amount may be set to a control amount such that the throttle opening degree corresponding to the actual opening degree of the accelerator pedal 32 is suppressed to the "medium" level, as illustrated in FIG. 14. It is to be noted that, in the present embodiment, for an example, the "medium" level of the throttle opening degree is an opening degree suppressed to 25% of the throttle opening degree corresponding to the actual opening degree of the accelerator pedal 32. Similarly, the "small" level of the throttle opening degree is an opening degree suppressed to 50% of the throttle opening degree corresponding to the actual opening degree of the accelerator pedal 32. The "large" level of the throttle opening degree is an opening degree suppressed to 10% of the throttle opening degree corresponding to the actual opening degree of the accelerator pedal 32.

It is to be noted that the acceleration suppression control amount illustrated in FIG. 14 is an example, and it may be changed depending on the data of the vehicle V such as a brake performance of the vehicle V. Furthermore, for example, it may be changed depending on the local (national) traffic regulation where the vehicle V travels.

Furthermore, the acceleration suppression control amount computing unit 44 is configured to apply the total certainty degree on the acceleration suppression condition computing map, and to set a presence of absence of the control to output a warning sound. It is to be noted that when outputting the warning sound, for example, the visual information indicating that the acceleration suppression control is operated as character information, symbol, light emission, or the like may be displayed on a display monitor included in the navigation device 26.

(Processing Performed by Acceleration Suppression Command Value Computing Unit 10J)

Figure 15:
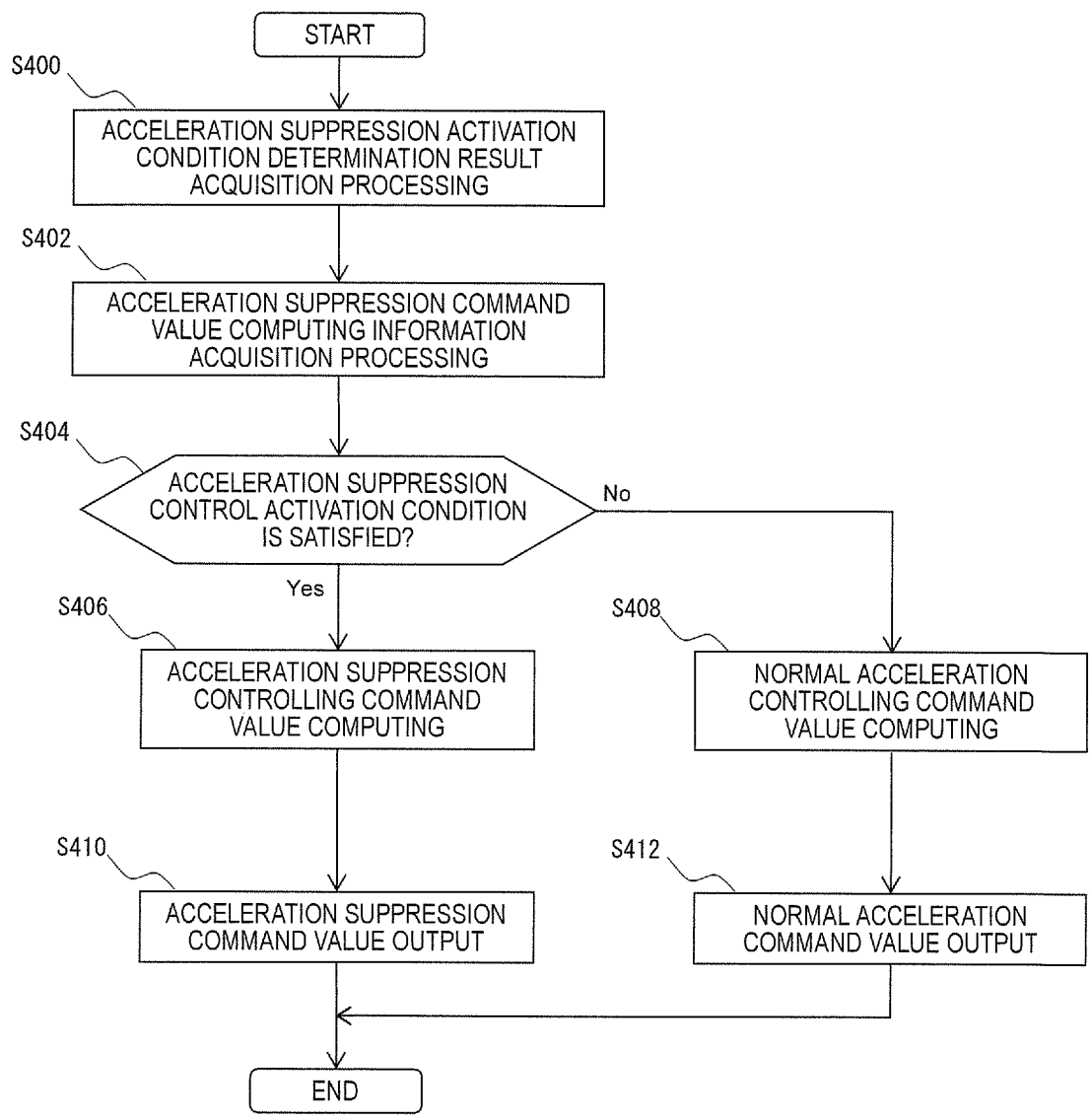
FIG. 15 is a flowchart illustrating processing performed by an acceleration suppression command value computing unit.

Next, the processing performed by the acceleration suppression command value computing unit 10J will be described, by using FIG. 15, and referring to FIG. 1 and FIG. 14. FIG. 15 is a flowchart illustrating the processing performed by the acceleration suppression command value computing unit 10J. It is to be noted that the acceleration suppression command value computing unit 10J is configured to perform the processing to be described below at every predefined sampling time (for example, 10 msec).

As illustrated in FIG. 15, when the acceleration suppression command value computing unit 10J starts the processing (START), firstly, in step S400, the acceleration suppression command value computing unit 10J refers to the acceleration suppression activation condition determination result signal received from the acceleration suppression control computing unit 10I. Then, processing of acquiring the acceleration suppression activation condition determination result ("acceleration suppression activation condition determination result acquisition processing" in the drawing) is performed. When the processing of acquiring the acceleration suppression activation condition determination result in step S400 is performed, the processing performed by the acceleration suppression command value computing unit 10J proceeds to step S402.

In step S402, in addition to the acceleration suppression activation condition determination result acquired in step S400, processing of acquiring information for computing an acceleration suppression command value ("acceleration suppression command value computing information acquisition processing" in the drawing) is performed. When the processing of acquiring the information for computing the acceleration suppression command value is performed in step S402, the processing performed by the acceleration suppression command value computing unit 10J proceeds to step S404.

It is to be noted that the information for computing the acceleration suppression command value is, for example, information included in the acceleration suppression control start timing signal, the acceleration suppression control amount signal, the drive side pressed amount signal, the accelerator manipulation speed signal, which have been described above.

In step S404, processing of determining whether or not the acceleration suppression activation condition determination result acquired in step S400 indicates that the acceleration suppression control operation condition is satisfied is performed ("acceleration suppression control activation condition satisfied?" in the drawing). When it is determined in step S404 that the determination result indicates the acceleration suppression control operation condition is satisfied ("Yes" in the drawing), the processing performed by the acceleration suppression command value computing unit 10J proceeds to step S406.

On the other hand, when it is determined in step S404 that the determination result indicates the acceleration suppression control operation condition is not satisfied ("No" in the drawing), the processing performed by the acceleration suppression command value computing unit 10J proceeds to step S408.

In step S406, processing of computing the acceleration suppression command value, which is an acceleration command value for performing the acceleration suppression control is performed ("acceleration suppression controlling command value computing" in the drawing), on the basis of the information for computing the acceleration suppression command value acquired in step S402. When the processing of computing the acceleration suppression command value is performed in step S406, the processing performed by the acceleration suppression command value computing unit 10J proceeds to step S410.

Note that, in the processing of computing the acceleration suppression command value, the acceleration suppression command value computing unit 10J refers to the pressed amount of the accelerator pedal 32 included in the drive side pressed amount signal and the acceleration suppression control amount included in the acceleration suppression control amount signal. Then, the acceleration suppression command value computing unit 10J computes the acceleration suppression control amount command value to suppress the throttle opening degree corresponding to the actual opening degree of the accelerator pedal 32 in a suppression degree depending on the acceleration suppression control amount (see FIG. 14).

Furthermore, in the processing of computing the acceleration suppression command value, the acceleration suppression command value computing unit 10J refers to the pressed amount of the accelerator pedal 32 included in the drive side pressed amount signal and the acceleration suppression control start timing included in the acceleration suppression control start timing signal. Then, the acceleration suppression command value computing unit 10J computes the acceleration suppression control start timing command value to set the acceleration suppression control start timing to a timing depending on the actual opening degree of the accelerator pedal 32 (see FIG. 14).

Then, in the processing of operating the acceleration suppression command value, the command value including the acceleration suppression control amount command value and the acceleration suppression control start timing command value, which have been computed as described above, is computed as the acceleration suppression command value.

In step S408, processing of computing a normal acceleration command value ("normal acceleration controlling command value computing" in the drawing) is performed. The normal acceleration command value is an acceleration command value to be used in drive force control without the acceleration suppression control, that is, the normal acceleration control. When the processing of computing the normal acceleration command value is performed in step S408, the processing performed by the acceleration suppression command value computing unit 10J proceeds to step S412.

Note that, in the processing of operating the normal acceleration command value, the command value with which the throttle opening degree is computed on the basis of the pressed amount of the accelerator pedal 32 included in the drive side pressed amount signal, is computed as the normal acceleration command value.

In step S410, processing of outputting the acceleration suppression command value signal including the acceleration suppression command value computed in step S406 to the target throttle opening degree computing unit 10K ("acceleration suppression command value output" in the drawing) is performed. When the processing of outputting the acceleration suppression command value signal is performed in step S410, the processing performed by the acceleration suppression command value computing unit 10J is terminated (END).

In step S412, processing of outputting the normal acceleration command value signal including the normal acceleration command value computed in step S408 to the target throttle opening degree computing unit 10K ("normal acceleration command value output" in the drawing) is performed. When the processing of outputting the normal acceleration command value signal is performed in step S412, the processing performed by the acceleration suppression command value computing unit 10J comes to an end (END).

(Processing Performed by Target Throttle Opening Degree Computing Unit 10K)

Figures 16, 17:
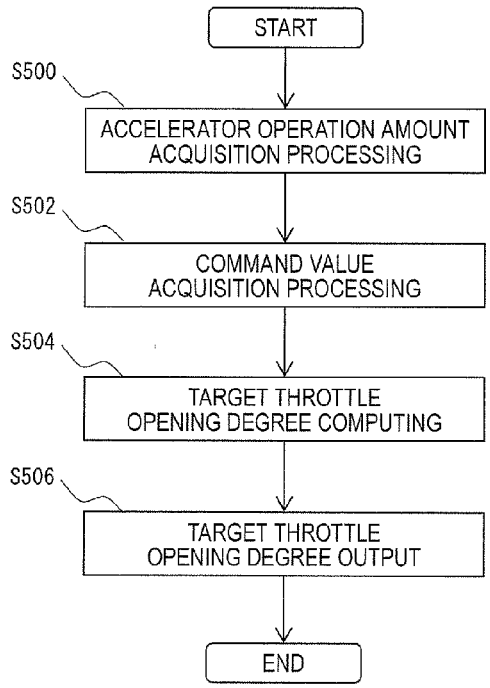
FIG. 16 is a flowchart illustrating processing performed by a target throttle opening degree computing unit.
FIG. 17 is a view illustrating a modification of the first embodiment of the present disclosure.

Next, the processing performed by the target throttle opening degree computing unit 10K will be described, by using FIG. 16, and referring to FIG. 1 to FIG. 15. FIG. 16 is a flowchart illustrating the processing performed by the target throttle opening computing unit 10K. It is to be noted that the target throttle opening degree computing unit 10K is configured to perform the processing to be described below at every predefined sampling time (for example, 10 msec).

When the target throttle opening degree computing unit 10K starts (START) the processing as illustrated in FIG. 16, firstly, in step S500, the target throttle opening degree computing unit 10K refers to the drive side pressed amount signal received from the accelerator manipulation amount computing unit 10G. Then, processing of acquiring the pressed amount (manipulation amount) of the accelerator pedal 32 included in the drive side pressed amount signal ("accelerator operation amount acquisition processing" in the drawing) is performed. When the processing of acquiring the pressed amount (manipulation amount) of the accelerator pedal 32 is performed in step S500, the processing performed by the target throttle opening degree computing unit 10K proceeds to step S502.

In step S502, on the basis of the information signal received from the acceleration suppression command value computing unit 10J, processing of acquiring the acceleration suppression command value (see step S406) or the normal acceleration command value (see step S408) is performed ("command value acquisition processing" in the drawing). When the processing of acquiring the acceleration suppression command value or the normal acceleration command value is performed in step S502, the processing performed by the target throttle opening degree computing unit 10K proceeds to step S504.

In step S504, on the basis of the pressed amount of the accelerator pedal 32 acquired in step S500 and the command value acquired in step S502, computing of the target throttle opening degree ("target throttle opening degree computing" in the drawing) is performed. When the target throttle opening degree is computed in step S504, the processing performed by the target throttle opening degree computing unit 10K proceeds to step S506.

Note that, in step S504, when the command value acquired in step S502 is the normal acceleration command value (when the acceleration suppression activation condition is not satisfied), the throttle opening degree depending on the pressed amount of the accelerator pedal 32 is computed as the target throttle opening degree.

On the other hand, when the command value acquired in step S502 is the acceleration suppression command value (when the acceleration suppression activation condition is satisfied), the throttle opening degree depending on the acceleration suppression control amount command value is computed as the target throttle opening degree.

The target throttle opening degree is computed by using a following expression (1), for example.

$$\theta^* = \theta_1 - \Delta\theta \qquad (1)$$

In the above expression (1), the target throttle opening degree is indicated by "$\theta^*$", the throttle opening degree depending on the pressed amount of the accelerator pedal 32 is indicated by "$\theta_1$", and the acceleration suppression control amount is indicated by "$\Delta\theta$".

In step S506, the target throttle opening degree signal including the target throttle opening degree $\theta^*$ computed in step S504 is output to the engine controller 12 ("target throttle opening degree output" in the drawing). When the processing of outputting the target throttle opening degree signal to the engine controller 12 is performed in step S506, the processing performed by the target throttle opening degree computing unit 10K is terminated (END). Note that, in step S506, when the command value acquired in step S502 is the acceleration suppression command value, the target throttle opening degree signal is output at a timing when the opening degree (pressed amount) of the accelerator pedal 32 reaches the opening degree corresponding to the acceleration suppression control start timing.

(Operation)

Next, referring to FIG. 1 to FIG. 16, an example of an operation performed by using the vehicular acceleration suppression device 1 according to the present embodiment will be described. In the example of the operation described below, an example in which the vehicle V moving in a parking space enters the parking frame L0 selected by the driver will be described.

In a state where the vehicle speed of the vehicle V moving in the parking space is equal to or higher than 15 km/h, which is the vehicle speed threshold, an acceleration suppression control activation condition is not satisfied. Thus, the normal acceleration control on which a driver's acceleration intention is reflected is performed without activating the acceleration suppression control in the vehicle V.

When the vehicle speed becomes lower than the vehicle speed threshold, the parking frame L0 is detected, the brake pedal 30 is not manipulated, and the pressed amount of the accelerator pedal 32 is equal to or larger than the threshold accelerator manipulation amount, a determination is made on whether or not the vehicle V enters the parking frame L0.

Furthermore, while the vehicle V is traveling, the parking frame certainty degree calculation unit 36 calculates the parking frame certainty degree, and the parking frame entering certainty degree calculation unit 38 calculates the parking frame entering certainty degree. Then, the total certainty degree calculation unit 40 calculates the total certainty degree on the basis of the parking frame certainty degree and the parking frame entering certainty degree.

Furthermore, while the vehicle V is traveling, on the basis of the total certainty degree calculated by the total certainty degree calculation unit 40, the acceleration suppression control start timing computing unit 42 computes the acceleration suppression control start timing and the acceleration suppression control amount computing unit 44 computes the acceleration suppression control amount.

Then, when it is determined that the vehicle V enters the parking frame L0 and it is determined that the acceleration suppression control activation condition is satisfied, the acceleration suppression command value computing unit 10J outputs the acceleration suppression command value signal to the target throttle opening degree computing unit 10K. Furthermore, the target throttle opening degree computing unit 10K outputs the target throttle opening degree signal to the engine controller 12.

Accordingly, when a driver manipulates the accelerator pedal 32 in a state where the acceleration suppression control activation condition is satisfied, the throttle opening degree depending on the pressed amount of the accelerator pedal 32 is suppressed to the opening degree depending on the acceleration suppression control amount command value. In addition to this, the start timing of suppressing the throttle opening degree which depends on the pressed amount of the accelerator pedal 32 is set to the timing depending on the acceleration suppression control start timing command value.

Thus, even if the accelerator pedal 32 is manipulated by an erroneous manipulation or the like in a situation where braking is appropriate such as the state where the vehicle V moves to be closer to the position suitable for parking in the parking frame L0, it is possible to suppress the throttle opening degree depending on the total certainty degree. That is, in a state where the total certainty degree is low, the acceleration suppression amount (the suppression degree of the throttle opening degree) is small. Hence, the degradation in the drive performance can be reduced. In a state where the total certainty degree is high, the acceleration suppression amount is large. Hence, the acceleration suppression effect of the vehicle V can be enhanced.

As described above, in the present embodiment, it is possible to suppress the degradation in the drive performance in the parking space before entering the parking frame L0 at the time of parking. In addition, it is possible to suppress acceleration of the vehicle V in the wrong manipulation of the accelerator pedal 32.

Furthermore, in the present embodiment, as the total certainty degree is higher, the acceleration suppression control amount is increased, so that the acceleration of the vehicle V is suppressed and the safety is improved. Furthermore, as the total certainty degree is lower, the acceleration suppression control start timing is delayed, so as to suppress the degradation in the drive performance. In this way, in a situation to be described below, the improvement in the safety and the suppression of the degradation in the drive performance are enabled.

For example, on a road, in a situation when starting the vehicle V which is waiting near an indication of the parking frame L0 for parallel parking beside the travel road, a certain level of acceleration needs to be permitted.

Furthermore, in the situation to be described below, a certain level of acceleration needs to be permitted. Specifically, other vehicles are existing on both sides (left and right parking frames) of the parking frame L0 where the vehicle V is to be parked, and the vehicle V moves forward to enter some space on the opposite side (apart from each parking frame). Then, the vehicle V moves backward to enter the parking frame L0 where the vehicle V is to be parked, and park the vehicle V there.

In these situations, by controlling the acceleration suppression control start timing and the acceleration suppression control amount on the basis of the total certainty degree, the acceleration of the vehicle V is suppressed to enable an improvement in the safety. In addition to this, the acceleration of the vehicle V is permitted to suppress a degradation in the drive performance.

Furthermore, the acceleration suppression control amount is calculated to be smaller when the parking frame certainty degree is lower than when the parking frame certainty degree is high. In this way, it is possible to suppress the degradation in the drive performance in a situation where the current position of the vehicle V is a position which is not on a public road (for example, in a parking space), as described below.

In the situation where the current position of the vehicle V is the position which is not on the public road, the parking frame certainty degree is calculated to be a low level, for example, in a case where a line is detected in the image captured by the surrounding environment recognition sensor 14, but the detected line is not specified as the parking frame line. It is to be noted that a case where the detected line is not specified as the parking frame line means a case where one line and an end thereof are detected in the image captured by the surrounding environment recognition sensor 14, however no line is detected short of the one detected line (in the closer area to the vehicle V).

Furthermore, it is determined that the current position of the vehicle V is the position which is not on the public road, for example when the line detected in the image captured by the surrounding environment recognition sensor 14 has a blurred edge, or is spotted or blurred to be unclear, and thus the parking frame certainty degree is calculated to be the low level. This is because, as to the line indicated on the public rad, they are often maintained by a public organization periodically, and thus it is possible to suppose that the period when the edge is blurred, or the line is spotted or blurred to be unclear is short.

It is to be noted that the acceleration suppression command value computing unit 10J and the target throttle opening computing unit 10K mentioned above correspond to an acceleration control unit.

Furthermore, the above-mentioned surrounding environment recognition information computing unit 10A corresponds to a surrounding environment recognition unit. Furthermore, the vehicle speed computing unit 10B, the steering angle computing unit 10C, the steering angle speed computing unit 10D, the brake pedal manipulation information computing unit 10F, the accelerator manipulation amount computing unit 10G, and the accelerator manipulation speed computing unit 10H mentioned above correspond to a vehicle travel state detection unit.

Furthermore, the acceleration suppression control start timing computing unit 42, the acceleration suppression control amount computing unit 44, the acceleration suppression command value computing unit 10J, and the target throttle opening degree computing unit 10K mentioned above correspond to an acceleration suppression unit.

Furthermore, the above-mentioned throttle opening degree corresponds to an acceleration command value.

Furthermore, the above-mentioned navigation device 26 corresponds to a vehicle current position detection unit and a vehicle travel road type detection unit.

Furthermore, as described above, in a vehicle acceleration suppression method performed by the operation of the vehicular acceleration suppression device 1 according to the present embodiment, the acceleration command value depending on the manipulation amount of the accelerator pedal 32 is suppressed in a lower suppression degree when the parking frame certainty degree is lower than when the parking frame certainty degree is higher. Note that the parking frame certainty degree means the degree of certainty about the presence of the parking frame L0 in the travel direction of the vehicle V, and is calculated on the basis of the surrounding environment of the vehicle V.

Furthermore, as described above, in the vehicle acceleration suppression method performed by the operation of the vehicular acceleration suppression device 1 according to the present embodiment, the acceleration command value depending on the manipulation amount of the accelerator pedal 32 is suppressed in a lower suppression degree when the total certainty degree is lower than when the total certainty degree is higher. Note that the total certainty degree means the degree of the total certainty of the parking frame certainty degree and the parking frame entering certainty degree. Furthermore, the parking frame entering certainty degree means the degree of the certainty about whether the vehicle V enters the parking frame L0.

(Effects of First Embodiment)

According to the present embodiment, following effects to be described below will be brought out.

(1) The parking frame certainty degree calculation unit 36 is configured to calculate the parking frame certainty degree on the basis of the bird's-eye view image (environment) of surroundings of the vehicle V and the vehicle speed (travel state) of the vehicle V. In addition to this, the suppression degree of the acceleration command value is set to be lower when the parking frame certainty degree calculated by the parking frame certainty degree calculation unit 36 is lower than when the parking frame certainty degree is higher. That is, the suppression degree of the acceleration command value is set to be higher when the parking frame certainty degree calculated by the parking frame certainty degree calculation unit 36 is higher than when the parking frame certainty degree is lower. Therefore, it is possible to reduce the degradation in the drive performance by decreasing the suppression degree of the acceleration command value, when the parking frame certainty degree is low, and to enhance the acceleration suppression effect of the vehicle by increasing the suppression degree of the acceleration command value, when the parking frame certainty degree is high. As a result, it is possible to suppress the degradation in the drive performance of the vehicle V at the time of parking, and to suppress the acceleration of the vehicle V when the accelerator pedal 32 is erroneously manipulated.

(2) The parking frame entering certainty degree calculation unit 38 is configured to calculate the parking frame entering certainty degree on the basis of the bird's-eye view image (environment) of surroundings of the vehicle V, and the vehicle speed of the vehicle V and the rotation angle of the steering wheel 28 (travel state). In addition to this, the total certainty degree calculation unit 40 is configured to calculate the total certainty degree on the basis of the parking frame certainty degree calculated by the parking frame certainty degree calculation unit 36 and the parking frame entering certainty degree calculated by the parking frame entering certainty degree calculation unit 38. Furthermore, the suppression degree of the acceleration command value is set to be lower when the total certainty degree calculated by the total certainty degree calculation unit 40 is lower than when the total certainty degree is higher. Accordingly, the suppression degree of the acceleration command value can be controlled depending on the degree of the certainty about the presence of a parking frame L0 in the travel direction of the vehicle V and the degree of the certainty about whether vehicle V enters the parking frame L0. As a result, in addition to the above-described effect (1), it is possible to suppress the degradation in the drive performance of the vehicle V at the time of parking, and to suppress the acceleration of the vehicle V when the accelerator pedal 32 is erroneously manipulated.

(3) The acceleration suppression control start timing computing unit 42, the acceleration suppression command value computing unit 10J, and the target throttle opening degree computing unit 10K are configured to delay the acceleration suppression control start timing to decrease the suppression degree of the acceleration command value. As a result, it is possible to control the start timing of suppressing the throttle opening degree which depends on the pressed amount of the accelerator pedal 32 to control the suppression degree of the acceleration command value.

(4) The acceleration suppression control amount computing unit 44, the acceleration suppression command value computing unit 10J, and the target throttle opening degree computing unit 10K are configured to reduce acceleration suppression control amount to decrease the suppression degree of the acceleration command value. As a result, it is possible to control the suppression amount of the throttle opening degree which depends on the pressed amount of the accelerator pedal 32 to control the suppression degree of the acceleration command value.

(5) According to the vehicle acceleration suppression method according to the present embodiment, the parking frame certainty degree is calculated on the basis of the bird's-eye view image (environment) of surroundings of the vehicle V and the vehicle speed (travel state) of the vehicle V. In addition to this, when entering of the vehicle V into the parking frame L0 is detected and the parking frame certainty degree is lower, the acceleration command value is suppressed in a lower suppression degree, than when the parking frame certainty degree is higher. Therefore, it is possible to reduce the degradation in the drive performance by decreasing the suppression degree of the acceleration command value, when the parking frame certainty degree is low, and to enhance the acceleration suppression effect of the vehicle by increasing the suppression degree of the acceleration command value, when the parking frame certainty degree is high. As a result, it is possible to suppress the degradation in the drive performance of the vehicle V at the time of parking, and to suppress the acceleration of the vehicle V when the accelerator pedal 32 is erroneously manipulated.

(6) According to the vehicle acceleration suppression method according to the present embodiment, the parking frame entering certainty degree is calculated on the basis of the bird's-eye view image (environment) of surroundings of the vehicle V and the vehicle speed (travel state) of the vehicle V. In addition to this, the total certainty degree is calculated on the basis of the parking frame certainty degree and the parking frame entering certainty degree. The acceleration command value is suppressed in a lower suppression degree when the total certainty degree is lower than when the total certainty degree is higher. Accordingly, the suppression degree of the acceleration command value can be controlled depending on the degree of the certainty about the presence of a parking frame L0 in the travel direction of the vehicle V and the degree of the certainty about whether the vehicle V enters the parking frame L0.

As a result, in addition to the above-described effect (5), it is possible to suppress the degradation in the drive performance of the vehicle V at the time of parking, and to suppress the acceleration of the vehicle V when the accelerator pedal 32 is erroneously manipulated.

(Modifications)

(1) In the present embodiment, the acceleration suppression control start timing and the acceleration suppression control amount are computed on the basis of the total certainty degree calculated the total certainty degree calculation unit 40. However, the present disclosure is not limited to this. That is, the acceleration suppression control start timing and the acceleration suppression control amount may be computed only on the basis of the parking frame certainty degree calculated by the parking frame certainty degree calculation unit 36. In this case, the acceleration suppression control start timing and the acceleration suppression control amount are calculated, for example, by applying the parking frame certainty degree on an acceleration suppression condition computing map illustrated in FIG. 17. It is to be noted that FIG. 17 is a view illustrating the modification of the present embodiment.

(2) In the present embodiment, the parking frame certainty degree calculation unit 36 is configured to calculate the parking frame certainty degree on the basis of the bird's-eye view image (environment) of surroundings of the vehicle V and the vehicle speed (travel state) of the vehicle V. However, the parking frame certainty degree calculation unit 36 is not limited to this. That is, the parking frame certainty degree calculation unit 36 may be configured to calculate the parking frame certainty degree by using not only the bird's-eye view image of surroundings of the vehicle V and the vehicle speed, but also a current position of the vehicle V included in the vehicle position signal and the type of road (road type) on which the vehicle V travels included in the travel road information signal. In this case, for example, when it is detected that the current position of the vehicle V is on a public road on the basis of the vehicle position signal and the travel road information signal, it is determined that there is no parking frame L0 around the vehicle V, and the parking frame certainty degree is calculated as "level 0". In this way, for example, when the vehicle V moves into the parking frame in which the operation of the acceleration suppression control is not desirable, such as a parking frame arranged at a roadside of a public road, or the like, it is possible to suppress the degradation in the drive performance of the vehicle V.

(3) In the present embodiment, when determining that the end points of the lines La and Lb face each other in the width WL direction, the parking frame certainty degree calculation unit 36 calculates the parking frame certainty degree as the level 3 or the level 4 (see step S212). However, the processing of calculating the parking frame certainty degree as the level 3 or level 4 is not limited to this. That is, the end point of the line L has a shape that is not indicated on a public road, for example, such as a letter U shape (see FIGS. 4G to 4K, 4M, and 4N), the parking frame certainty degree may be calculated as the level 3 or the level 4.

(4) In the present embodiment, the parking frame certainty degree calculation unit 36 is configured to calculate the parking frame certainty degree on the basis of the bird's-eye view image (environment) of surroundings of the vehicle V and the vehicle speed (travel state) of the vehicle V. However, the parking frame certainty degree calculation unit 36 is not limited to this. That is, when the vehicle V is configured to include the device (parking support device) for supporting a driver operating the steering operation to the parking frame L0, and the parking support device is in the ON state, the level of the parking frame certainty degree may be easily increased. Note that the configuration in which the level of the parking frame certainty degree is easily increased is, for example, a configuration in which the above-mentioned predefined travel distance is set to be shorter than usual. Furthermore, the parking support device may be, for example, a device which displays a surrounding situation as a bird's-eye view image or the like on a monitor for parking the vehicle, or a device which sets a target parking position on a screen for guiding a course for parking. These devices may be used by manipulating a screen selector switch for displaying the surrounding situation as the bird's-eye view image or the like on the monitor, or a screen selector switch for setting the target parking position on the screen. Then, when the parking support device turns to the ON state upon manipulation of these switches, the parking frame may become easy to be detected, such that the level of the parking frame certainty degree may be easily increased. Note that as a method of making the parking frame easy to be detected, for example, a method of correct the setting values such that the above-mentioned conditions C1 to C4 in step S206 is easily satisfied may be adopted. Furthermore, other than this method, the predefined travel distance which is used in step S206 to determine that the continuous verification state reaches the predefined travel distance may be set to be shorter. Furthermore, for example, the condition of the end point used in step S212 to determine that the parking frame certainty degree is "level 3" or "level 4", such as the number of the end point may be set to be smaller than the initial settings. It is to be noted that, as a method of making the parking frame easy to be detected, for example, a method of detecting that the parking frame certainty degree is a predefined level ("level 4" for example) regardless of the actual detection condition of the parking frame may be adopted.

(5) In the present embodiment, the acceleration suppression control amount and the acceleration suppression control start timing are changed on the basis of the total certainty degree so as to change the suppression degree of the acceleration command value. However, the present disclosure is not limited to this. That is, depending on the total certainty degree, only the acceleration suppression control start timing or only the acceleration suppression control amount may be changed so as to change the suppression degree of the acceleration command value. In this case, for example, as the total certainty degree is higher, the acceleration suppression control amount may be set to be higher, so that the suppression degree of the acceleration command value may be increased without changing the acceleration suppression control start timing.

(6) In the present embodiment, the total certainty degree is calculated on the basis of the parking frame certainty degree and the parking frame entering certainty degree which have been calculated, regardless of the number of the frame line detected in calculating the level of the parking frame certainty degree. However, the present disclosure is not limited to this. That is, the total certainty degree may be calculated, for example, on the basis of the number of the lines L detected when the above-mentioned condition B is satisfied.

In this case, for example, the parking frame certainty degree and the parking frame entering certainty degree which have been calculated, and the number of the lines L when the condition B is satisfied are applied on a total certainty degree calculation map illustrated in FIG. 18. Then, the total certainty degree is calculated on the basis of the parking frame certainty degree, the parking frame entering certainty degree, and the number of the lines L when the condition B is satisfied. It is to be noted that FIG. 18 is a view illustrating the total certainty degree calculation map used in the modification of the present embodiment. Furthermore, similarly to FIG. 13, the parking frame certainty degree is indicated as "frame certainty degree" and the parking frame entering certainty degree is indicated as "entering certainty degree" in FIG. 18.

In the above-mentioned case, as illustrated in FIG. 18, when the parking frame entering certainty degree is "low level" and the parking frame certainty degree is calculated as "level 1" or "levels 2 to 4", the total certainty degree is calculated depending on the type of the lines L detected when the condition B is satisfied.

Specifically, in a case where the parking frame entering certainty degree is "low level", the parking frame certainty degree is calculated as "level 1", and the type of the lines L detected when the condition B is satisfied is a single line, the total certainty degree is calculated to be a value not to perform the acceleration suppression control, similarly to the case of "level 0". Furthermore, in a case where the parking frame entering certainty degree is "low level", the parking frame certainty degree is calculated as "level 1", and the type of the lines L detected when the condition B is satisfied is a double line, the total certainty degree is calculated as "extremely-low".

Furthermore, in a case where the parking frame entering certainty degree is "low level", the parking frame certainty degree is calculated as "levels 2 to 4", and the type of the lines L detected when the condition B is satisfied is a single line, the total certainty degree is calculated as "extremely-low". Furthermore, in a case where the parking frame entering certainty degree is "low level", the parking frame certainty degree is calculated as "levels 2 to 4", and the type of the lines L detected when the condition B is satisfied is a double line, the total certainty degree is calculated as "extremely-high".

Note that, when the total certainty degree is calculated by using the total certainty degree calculation map illustrated in FIG. 18, the acceleration suppression control start timing is computed, for example, by applying the total certainty degree that has been calculated on a acceleration suppression condition computing map illustrated in FIG. 19. It is to be noted that FIG. 19 is a view illustrating the acceleration suppression condition computing map used in the modification of the present embodiment. Furthermore, similarly to FIG. 14, in a column of the "acceleration suppression condition" in FIG. 19, the acceleration suppression control start timing is indicated by "suppression control start timing (accelerator opening degree)".

In a case where the acceleration suppression control start timing is computed by using the acceleration suppression condition computing map illustrated in FIG. 19, when the total certainty degree is "extremely-low", the acceleration suppression control start timing is determined by starting the measurement of time at the time when the opening degree of the accelerator pedal 32 increases and reaches "80%". In addition to this, the time when the measured time in which the opening degree of the accelerator pedal 32 is equal to or higher than "80%" reaches "0.25 sec" is set as the acceleration suppression control start timing. That is, when the total certainty degree is "extremely-low", the acceleration suppression control starts at the time when the measured time in which the opening degree of the accelerator pedal 32 is equal to or higher than "80%" reaches "0.25 sec".

Furthermore, the acceleration suppression control amount when the total certainty degree is "extremely-low" is set to a control amount to suppress the throttle opening degree to "small" level. It is to be noted that, similarly to FIG. 14, in a column of the "acceleration suppression condition" in FIG. 19, the acceleration suppression control amount is indicated by "suppression control amount".

On the other hand, when the total certainty degree is "extremely-high", the acceleration suppression control start timing is determined by starting the measurement of time at the time when the opening degree of the accelerator pedal 32 increases and reaches "50%". In addition to this, the time when the measured time in which the opening degree of the accelerator pedal 32 is equal to or higher than "50%" reaches "0.65 sec" is set as the acceleration suppression control start timing. That is, when the total certainty degree is "extremely-high", the acceleration suppression control starts at the time when the measured time in which the opening degree of the accelerator pedal 32 is equal to or higher than "50%" reaches "0.65 sec".

Furthermore, the acceleration suppression control amount when the total certainty degree is "extremely-high" is set to a control amount to suppress the throttle opening degree to "large" level. An example of the operation in a case where the acceleration suppression control start timing is computed by using the acceleration suppression condition computing map illustrated in FIG. 19 will be described below.

Figures 20, 21:
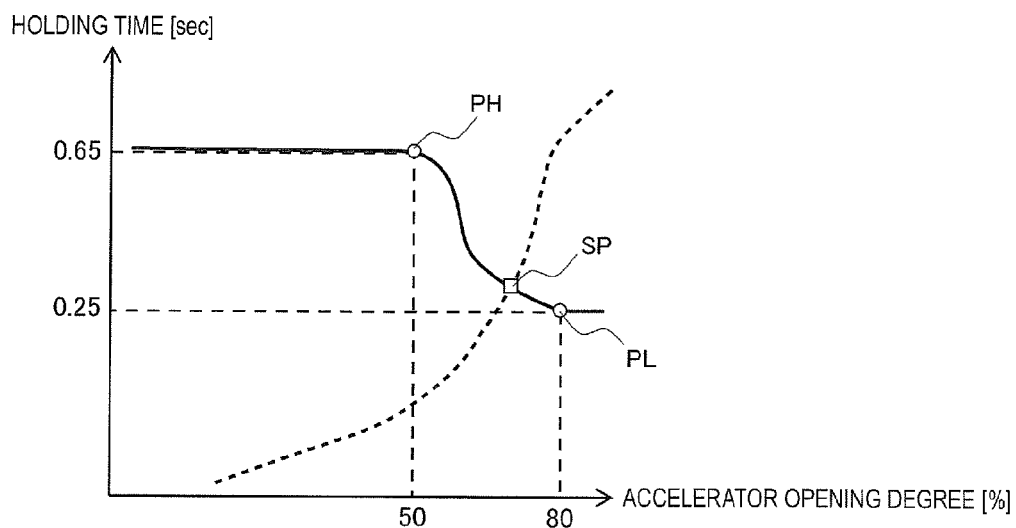
FIG. 20 is a view illustrating a modification of the first embodiment of the present disclosure.
FIG. 21 is a view illustrating a total certainty degree calculation map used in the second embodiment of the present disclosure.

When using the acceleration suppression condition computing map illustrated in FIG. 19, the acceleration suppression control start timing on the basis of the total certainty degree and a holding time have a relationship illustrated in FIG. 20. It is to be noted that the FIG. 20 is a view illustrating the relationship between the acceleration suppression control start timing and the holding time. Furthermore, FIG. 20 represents the acceleration suppression control start timing in abscissa as "accelerator opening degree (%)" and the holding time in ordinate as "holding time (sec)".

As illustrated in FIG. 20, when the total certainty degree is calculated as "extremely-low", the time PL when the measured time in which the accelerator opening degree is equal to or higher than "80%" reaches "0.25 sec" is set as the acceleration suppression control start timing. Furthermore, when the total certainty degree is calculated as "extremely-high", the time PH when the measured time in which the accelerator opening degree is equal to or higher than "50%" reaches "0.65 sec" is set as the acceleration suppression control start timing. It is to be noted that the solid line continuously indicates a control threshold used as a reference for setting the acceleration suppression control start timing.

However, when the image captured by the surrounding environment recognition sensor 14 changes while the vehicle V is traveling, the type of the line L detected when the condition B is satisfied may change.

It is assumed that the type of the line L detected when the condition B is satisfied changes from a single line to a double line in a situation where the parking frame certainty degree is calculated as "levels 2 to 4". In this case, at the time when the type of the line L detected when the condition B is satisfied changes from a single line to a double line, the total certainty degree changes from "extremely-low" to "extremely-high".

At the time when the type of the line L detected when the condition B is a single line, the timing PL illustrated in FIG. 20 is set as the acceleration suppression control start timing, and thus the measurement of the holding timing does not start until the accelerator opening degree reaches 80%.

However, in a case where the total certainty degree changes from "extremely-low" to "extremely-high", even when the accelerator opening degree has already reached 50%, the measurement of the holding timing starts at the time when the total certainty degree changes from "extremely-low" to "extremely-high". Then, in FIG. 20, the time SP where the line indicating the relationship of the measurement time and the accelerator opening degree intersects with the line continuously indicating the control threshold, the acceleration suppression control starts. It is to be noted that the broken line in FIG. 20 indicates the change in the accelerator opening degree through time.

Therefore, when the total certainty degree changes from "extremely-low" to "extremely-high", the start timing of the acceleration suppression control is delayed in comparison with the case where the total certainty degree is calculated as "extremely-high" from the beginning.

Therefore, it is possible to suppress the degradation in the drive performance in a situation where the vehicle V traveling in a parking space which has a configuration in which plural parking frames are arranged, such as a parking tower or the like, travels an uphill slope when moving from a parking space in a lower layer to a parking space in a higher layer. This operation is apply on a situation, for example, where the state of vehicle shifts from a straight travel state to a turning travel state before traveling the uphill slope, and the vehicle speed thereof decreases, and the type of the line L detected when the condition B is satisfied changes from a single line to a double line, and thus the total certainty degree changes from "extremely-low" to "extremely-high".

In this situation, even when the state of vehicle shifts from the straight travel state to the turning travel state before traveling the uphill slope, the vehicle speed thereof decreases, and thus the total certainty degree changes from "extremely-low" to "extremely-high", the start timing of the acceleration suppression control is delayed in comparison with the case where the total certainty degree is calculated as "extremely-high" from the beginning. In this way, the start timing of the acceleration suppression control is delayed in comparison with the case where the total certainty degree is calculated as "extremely-high" from the beginning, and the start timing is set to a time when the vehicle travels the uphill slope and the parking frame certainty degree is highly likely calculated as "level 0".

Next, for example, it is assumed that the type of the line L detected when the condition B is satisfied is a single line in a situation where the parking frame certainty degree is calculated as "levels 2 to 4", and the parking frame entering certainty degree changes "low level" to "high level".

In this case, at the time when the parking frame entering certainty degree changes "low level" to "high level", the total certainty degree changes from "extremely-low" to "extremely-high". Then, similarly to the case where the type of the line L detected when the condition B is satisfied changes from a single line to a double line, the start timing of acceleration suppression control is delayed in comparison with the case where the total certainty degree is calculated as "extremely-high" from the beginning.

Therefore, it is possible to suppress the degradation in the drive performance in a situation where the vehicle V turns left at an intersection, and then the vehicle V overtakes another vehicle which has been already parked, and then the vehicle enters to the parking frame arranged at a roadside and is parked. This operation is apply on a situation where the parking frame entering certainty degree changes "low level" to "high level" and thus the total certainty degree changes from "extremely-low" to "extremely-high", when the vehicle V, which has turned left at the intersection, overtakes the right side of other vehicle and then moves to the left toward the road side.

In this situation, even when the vehicle speed which has been reduced for the left turn in the intersection increases and the total certainty degree changes from "extremely-low" to "extremely-high", the start timing of acceleration suppression control is delayed in comparison with the case where the total certainty degree is calculated as "extremely-high" from the beginning. In this way, the start timing of the acceleration suppression control is delayed in comparison with the case where the total certainty degree is calculated as "extremely-high" from the beginning, and the start timing of the acceleration suppression control is set to a time when the vehicle in traveling starts parking and thus the speed thereof highly likely decreases on the public road.

(7) In the present embodiment, the acceleration command value is controlled to suppress the acceleration of the vehicle V which depends on the pressed amount (drive force manipulation amount) of the accelerator pedal 32. However, the present embodiment is not limited to this. That is, for example, the throttle opening degree depending on the pressed amount (drive force manipulation amount) of the accelerator pedal 32 may be set to a target throttle opening degree, and in addition, a brake force may be generated by the above-descried brake device so that the acceleration of the vehicle V depending on the drive force manipulation amount may be suppressed.

(8) In the present embodiment, the parking frame certainty degree is calculated as the level 0 that is a minimum value and several stages of level (levels 1 to 4) higher than the minimum value. However, the stages of the parking frame certainty degree are not limited to them. That is, the parking frame certainty degree may be calculated as only two stages, including a level (for example, "level 0") that is the minimum value and the other level (for example, "level 100") that is higher than the minimum value.

(9) In the present embodiment, the parking frame entering certainty degree is calculated as the "level 0" that is the minimum value, the "low level" that is higher than the level 0, or the "high level" that is higher than the low level. However, the stages of the parking frame entering certainty degree are not limited to this. That is, the parking frame entering certainty degree, may be calculated as only two stages including a level (for example, "level 0") that is the minimum value and the other level (for example, "level 100") that is higher than the minimum value.

(10) In the present embodiment, the total certainty degree is calculated as any one of four stages of level ("extremely low", "low", "high", and "extremely high") depending on the parking frame certainty degree that has been calculated as any one of five stages of level and the parking frame entering certainty degree that has been calculated as any one of three stages of level. However, the stages of the total certainty degree are not limited to this. That is, the total certainty degree may be calculated as only two stages of level including a level (for example, "level 0") that is the minimum value and the other level (for example, "level 100") that is higher than the minimum value. In this case, when the parking frame certainty degree and the parking frame entering certainty degree are calculated as the level that is the minimum value, for example, the total certainty degree is calculated as the level that is the minimum value. Furthermore, for example, when the parking frame certainty degree and the parking frame entering certainty degree are calculated as the level that is higher than the minimum value, the total certainty degree may be calculated as the level that is higher than the minimum value.

Second Embodiment

Hereinafter, the second embodiment of the present disclosure (hereinafter, referred to as "the present embodiment") will now be described with reference to the drawings.

(Configuration)

Firstly, the configuration of the vehicular acceleration suppression device 1 according to the present embodiment will be described, by using FIG. 21 and FIG. 22, and referring to FIG. 1 to FIG. 20. The vehicular acceleration suppression device 1 according to the present embodiment is similar to the above-mentioned first embodiment except the processing performed by the acceleration suppression control computing unit 10I. Thus, the explanation for other than the processing performed by the acceleration suppression control computing unit 10I may be omitted.

Furthermore, the vehicular acceleration suppression device 1 according to the present embodiment is different from the above-mentioned first embodiment in processing other than the processing performed by the acceleration suppression activation condition determination unit 34 and the parking frame entering certainty degree calculation unit 38 out of processing performed by the acceleration suppression control computing unit 10I. Therefore, in the following explanation, the description of processing similar to that in the above-mentioned embodiment may be omitted.

In the processing of step S208, the parking frame certainty degree calculation unit 36 in the present embodiment determines whether the travel direction of the vehicle V is the direction of forward movement or backward movement firstly, and set the predefined travel distance depending on the determination result. Then, on the basis of the predefined travel distance set depending on the travel direction of the vehicle V, the processing of determining whether or not the satisfaction of the condition is continuously verified in the processing of step S206 after the processing of step S206 starts until the travel distance of the vehicle V reaches a predefined travel distance, is performed.

Note that the processing of setting the predefined travel distance depending on the travel direction of the vehicle V is performed, for example, by referring to the current shift position signal received from the shift position computing unit 10E.

Furthermore, in the present embodiment, as an example, a description will be also given of a case where the predefined travel distance is set to 2.5 m when it is determined that the travel direction of the vehicle V is the direction of the forward movement, and the predefined travel distance is set to 1 m when it is determined that the travel direction of the vehicle V is the direction of the backward movement.

It is to be noted that the above-mentioned predefined travel distance is an example, and it may be changed depending on the data of the vehicle V such as a brake performance of the vehicle V. Furthermore, for example, it may be changed depending on the local (national) traffic regulation where the vehicle V travels.

Therefore, in the processing of step S208 in the present embodiment, in the case where the travel direction of the vehicle V is the direction of the forward movement, the level of the parking frame certainty degree is less easily calculated as "level 1", in comparison with the case where the travel direction of the vehicle V is the direction of the backward movement.

Furthermore, in the processing of step S212 described above, the parking frame certainty degree calculation unit 36 in the present embodiment determines whether the travel direction of the vehicle V is the direction of the forward movement or the backward movement, firstly.

Then, in the case where the travel direction of the vehicle V is the direction of the forward movement, when it is determined that the end points located on the same side face each other in the direction of the width WL, the processing performed by the parking frame certainty degree calculation unit 36 proceeds to step S216, similarly to the above-mentioned first embodiment.

On the other hand, in the case where the travel direction of the vehicle V is the direction of the backward movement, when it is recognized that the end point of one of the lines La and Lb has, for example, a letter U shape (see FIGS. 4G to 4K, 4M, and 4N), the processing performed by the parking frame certainty degree calculation unit 36 proceeds to step S216. That is, in the case where the travel direction of the vehicle V is the direction of the backward movement, when it is recognized that the end point of one of the lines La and Lb has a shape that is not indicated on a public road, the processing performed by the parking frame certainty degree calculation unit 36 proceeds to step S216.

Therefore, in the processing of step S212 in the present embodiment, in the case where the travel direction of the vehicle V is the direction of the forward movement, the level of the parking frame certainty degree is less easily calculated as "level 3", in comparison with the case where the travel direction of the vehicle V is the direction of the backward movement.

That is, in the present embodiment, the level of the parking frame certainty degree is less easily increased in the case where the travel direction of the vehicle V is the direction of the forward movement, in comparison with the case where the travel direction of the vehicle V is the direction of the backward movement. Therefore, in the present embodiment, the suppression degree of the acceleration command value is higher in the case where the travel direction of the vehicle V is the direction of the backward movement than in the case where the travel direction of the vehicle V is the direction of the forward movement.

Furthermore, the total certainty degree calculation unit 40 is configured to receive an input of the parking frame certainty degree signal and the parking frame entering certainty degree signal, and to apply the parking frame certainty degree included in the parking frame certainty degree signal and the parking frame entering certainty degree included in the parking frame entering certainty degree signal on a total certainty degree calculation map illustrated in FIG. 21. Then, the total certainty degree is calculated on the basis of the parking frame certainty degree and the parking frame entering certainty degree.

It is to be noted that FIG. 21 is a view illustrating the total certainty degree calculation map used in the present embodiment. Furthermore, similarly to FIG. 13, the parking frame certainty degree is indicated as "frame certainty degree" and the parking frame entering certainty degree is indicated as "entering certainty degree" in FIG. 21.

Note that the total certainty degree calculation map used by the total certainty degree calculation unit 40 in the present embodiment is different from the total certainty degree calculation map used by the total certainty degree calculation unit 40 in the first embodiment in that the level of the total certainty degree changes depending on the determination result of the travel direction of the vehicle V. It is to be noted that in a column of the "entering certainty degree" in FIG. 21, the total certainty degrees when it is determined that the travel direction of the vehicle V is the direction of the forward movement are indicated by "low forward movement level"

and "high forward movement level". In addition to this, the column of the "entering certainty degree" in FIG. 21, the total certainty degrees when it is determined that the travel direction of the vehicle V is the direction of the backward movement are indicated by "low backward movement level" and "high backward movement level".

Furthermore, as illustrated in FIG. 21, the total certainty degree calculation unit 40 in the present embodiment is configured to calculate the total certainty degree when it is determined that the travel direction of the vehicle V is the direction of the backward movement as being equal to or higher than the total certainty degree when it is determined that the travel direction of the vehicle V is the direction of the forward movement.

In an example of processing by the total certainty degree calculation unit 40 in the present embodiment of calculating the total certainty degree, when the parking frame certainty degree is "level 2" and the parking frame entering certainty degree is "high forward movement level", the total certainty degree is calculated as "low" as illustrated in FIG. 21. On the other hand, when the parking frame certainty degree is "level 2" and the parking frame entering certainty degree is "high backward movement level", the total certainty degree is calculated as "high" as illustrated in FIG. 21.

Furthermore, as an example of processing by the total certainty degree calculation unit 40 in the present embodiment of calculating the total certainty degree, a processing in which the level of the parking frame certainty degree is easily increased when the vehicle V moves forward may be performed, by considering the vehicle as being already parked even when the travel direction of the vehicle V is the direction of the forward movement to calculate the total certainty degree in the same manner as the case of the backward movement. This processing is applied on the case where the parking frame certainty degree is calculated as "level 1" when the vehicle V moves forward, and then the vehicle moves backward by a predetermined distance (2.5 m, for example) or shorter, and then the vehicle moves forward again.

As described above, in the present embodiment, the level of the total certainty degree is less easily increased in the case where the travel direction of the vehicle V is the direction of the forward movement, in comparison with the case where the travel direction of the vehicle V is the direction of the backward movement. Therefore, in the present embodiment, the suppression degree of the acceleration command value is higher in the case where the travel direction of the vehicle V is the direction of the backward movement than in the case where the travel direction of the vehicle V is the direction of the forward movement.

Furthermore, when it is determined that the travel direction of the vehicle V is the direction of the backward movement, the acceleration suppression control start timing computing unit 42 in the present embodiment applies the total certainty degree included in the total certainty degree signal on the acceleration suppression condition computing map for backward movement illustrated in FIG. 22. Then, the acceleration suppression control start timing is computed on the basis of the total certainty degree.

It is to be noted that FIG. 22 is a view illustrating the acceleration suppression condition computing map for the backward movement. Furthermore, similarly to FIG. 14, in a column of the "acceleration suppression condition" in FIG. 22, the acceleration suppression control start timing is indicated by "suppression control start timing (accelerator opening degree)".

Note that, in the acceleration suppression condition computing map for the backward movement used by the acceleration suppression control start timing computing unit 42 in the present embodiment, the acceleration suppression control start timing corresponding to the total certainty degree is set to be earlier than that in the acceleration suppression condition computing map in the above-mentioned first embodiment. Therefore, in the acceleration suppression condition computing map for the backward movement used by the acceleration suppression control start timing computing unit 42 in the present embodiment, the suppression degree of the acceleration command value is higher in the case where the travel direction of the vehicle V is the direction of the backward movement, than in the case where the travel direction of the vehicle V is the direction of the forward movement.

As an example of the processing performed by the acceleration suppression control start timing computing unit 42 in the present embodiment, when the total certainty degree is "low", the acceleration suppression control start timing is set to a timing when the opening degree of the accelerator pedal 32 increases and reaches "50%", as illustrated in FIG. 22. It is to be noted that the acceleration suppression control start timing illustrated in FIG. 22 is an example, and it may be changed depending on the data of the vehicle V or the like, similarly to the acceleration suppression control start timing illustrated in FIG. 14.

Furthermore, when it is determined that the travel direction of the vehicle V is the direction of the backward movement, the acceleration suppression control amount computing unit 44 in the present embodiment applies the total certainty degree included in the total certainty degree signal on the acceleration suppression condition computing map for backward movement illustrated in FIG. 22. Then, the acceleration suppression control amount is computed on the basis of the total certainty degree. It is to be noted that, similarly to FIG. 14, in a column of the "acceleration suppression condition" in FIG. 22, the acceleration suppression control amount is indicated by "suppression control amount".

Note that, in the acceleration suppression condition computing map for the backward movement used by the acceleration suppression control amount computing unit 44 in the present embodiment, the acceleration suppression control amount corresponding to the total certainty degree is set to be lager than that in the acceleration suppression condition computing map in the above-mentioned first embodiment. Therefore, in the acceleration suppression condition computing map for the backward movement used by the acceleration suppression control amount computing unit 44 in the present embodiment, the suppression degree of the acceleration command value is higher in the case where the travel direction of the vehicle V is the direction of the backward movement, than in the case where the travel direction of the vehicle V is the direction of the forward movement.

In an example of the processing performed by the acceleration suppression control amount computing unit 44 in the present embodiment, when the total certainty degree is "extremely low", the acceleration suppression control amount is set to a control amount to suppress the throttle opening degree corresponding to the actual opening degree of the accelerator pedal 32 to "medium" level, as illustrated in FIG. 22. It is to be noted that the acceleration suppression control amount illustrated in FIG. 22 is an example, and it may be changed depending on the data of the vehicle V or the like, similarly to the acceleration suppression control amount illustrated in FIG. 14.

As described above, in the present embodiment, the acceleration suppression control start timing is set to be earlier and the acceleration suppression control amount is set to be lager in the case where the travel direction of the vehicle V is the direction of the forward movement, than in the case where the travel direction of the vehicle V is the direction of the backward movement. Therefore, in the present embodiment, the suppression degree of the acceleration command value is higher in the case where the travel direction of the vehicle V is the direction of the backward movement than in the case where the travel direction of the vehicle V is the direction of the forward movement.

(Operation)

Next, referring to FIG. 1 to FIG. 22, an example of an operation performed by using the vehicular acceleration suppression device 1 according to the present embodiment will be described. It is to be noted that the explanation for the operation similar to that in the above-mentioned first embodiment may be omitted. In the example of the operation described below, similarly to the above-mentioned first embodiment, an example in which the vehicle V moving in a parking space enters the parking frame L0 selected by the driver will be described.

While the vehicle V is traveling, the parking frame certainty degree calculation unit 36 calculates the parking frame certainty degree, and the parking frame entering certainty degree calculation unit 38 calculates the parking frame entering certainty degree. Then, the total certainty degree calculation unit 40 calculates the total certainty degree on the basis of the parking frame certainty degree and the parking frame entering certainty degree.

Furthermore, while the vehicle V is traveling, on the basis of the total certainty degree calculated by the total certainty degree calculation unit 40, the acceleration suppression control start timing computing unit 42 computes the acceleration suppression control start timing and the acceleration suppression control amount computing unit 44 computes the acceleration suppression control amount.

Then, when it is determined that the vehicle V enters the parking frame L0 and it is determined that the acceleration suppression control activation condition is satisfied, the acceleration suppression command value computing unit 10J outputs the acceleration suppression command value signal to the target throttle opening degree computing unit 10K. Furthermore, the target throttle opening degree computing unit 10K outputs the target throttle opening degree signal to the engine controller 12.

Note that, in the processing by the parking frame certainty degree calculation unit 36 of calculating the parking frame certainty degree in the present embodiment, the level of the parking frame certainty degree is less easily increased in the case where the travel direction of the vehicle V is the direction of the forward movement, in comparison with the case where the travel direction of the vehicle V is the direction of the backward movement.

Therefore, in the state where the acceleration suppression control activation condition is satisfied, the suppression degree of the acceleration command value is higher in the case where the travel direction of the vehicle V is the direction of the backward movement, than in the case where the travel direction of the vehicle V is the direction of the forward movement.

Furthermore, in the processing by the total certainty degree calculation unit 40 of calculating the total certainty degree in the present embodiment, the level of the parking frame certainty degree is less easily increased in the case where the travel direction of the vehicle V is the direction of the forward movement, in comparison with the case where the travel direction of the vehicle V is the direction of the backward movement.

Therefore, in the state where the acceleration suppression control activation condition is satisfied, the suppression degree of the acceleration command value is higher in the case where the travel direction of the vehicle V is the direction of the backward movement, than in the case where the travel direction of the vehicle V is the direction of the forward movement.

Furthermore, in the processing by the acceleration suppression control start timing computing unit 42 of computing the acceleration suppression control start timing in the present embodiment, the level of the parking frame certainty degree is less easily increased in the case where the travel direction of the vehicle V is the direction of the forward movement, in comparison with the case where the travel direction of the vehicle V is the direction of the backward movement.

Therefore, in the state where the acceleration suppression control activation condition is satisfied, the suppression degree of the acceleration command value is higher in the case where the travel direction of the vehicle V is the direction of the backward movement, than in the case where the travel direction of the vehicle V is the direction of the forward movement.

Furthermore, in the processing by the acceleration suppression control amount computing unit 44 of computing the acceleration suppression control amount in the present embodiment, the level of the parking frame certainty degree is less easily increased in the case where the travel direction of the vehicle V is the direction of the forward movement, in comparison with the case where the travel direction of the vehicle V is the direction of the backward movement.

Therefore, in the state where the acceleration suppression control activation condition is satisfied, the suppression degree of the acceleration command value is higher in the case where the travel direction of the vehicle V is the direction of the backward movement, than in the case where the travel direction of the vehicle V is the direction of the forward movement. It is to be noted that the shift position sensor 20 and the shift position computing unit 10E described above correspond to a vehicle travel direction detection unit.

Furthermore, as described above, in the vehicle acceleration suppression method according to the present embodiment, the acceleration command value corresponding to the manipulation amount of the accelerator pedal 32 is suppressed in a lower suppression degree in the case where the travel direction of the vehicle V is the direction of the forward movement, than in the case of the backward movement.

Effects of Second Embodiment

Hereinafter, effects of the present embodiment will be described. According to the present embodiment, following effects to be described below will be brought out, in addition to the effects of the first embodiment.

(1) The shift position sensor 20 and the shift position computing unit 10E detect the travel state of the vehicle. In addition to this, the acceleration suppression control start timing computing unit 42, the acceleration suppression control amount computing unit 44, the acceleration suppression command value computing unit 10J, and the target throttle opening degree computing unit 10K set the suppression degree of the acceleration command value to be lower in the case where the travel direction of the vehicle V is the direction of the forward movement, than in the case of the backward movement. That is, the acceleration suppression control start timing computing unit 42, the acceleration suppression control amount computing unit 44, the acceleration suppression command value computing unit 10J, and the target throttle opening degree computing unit 10K set the suppression degree of the acceleration command value to be higher in the case where the travel direction of the vehicle V is the direction of the backward movement, than in the case of the forward movement.

[0161] Therefore, in the case where the travel direction of the vehicle V is the direction of the forward movement in which the driver easily recognizes a view in the travel direction, it is possible to reduce the degradation in the drive performance by setting the suppression degree of the acceleration command value to be lower than in the case of the backward movement in which the driver less easily recognizes the view in the travel direction. Furthermore, in the case where the travel direction of the vehicle V is the direction of the backward movement in which the driver less easily recognizes a view in the travel direction, it is possible to enhance the acceleration suppression effect of the vehicle by setting the suppression degree of the acceleration command value to be higher than in the case of the forward movement in which the driver easily recognizes the view in the travel direction. As a result, it is possible to suppress the degradation in the drive performance of the vehicle V at the time of parking, and to suppress the acceleration of the vehicle V when the accelerator pedal 32 is erroneously manipulated.

(2) In the vehicle acceleration suppression method according to the present embodiment, the travel direction of the vehicle V is detected and the acceleration command value is suppressed in a lower suppression degree in the case where the travel direction of the vehicle V is the direction of the forward movement, than in the case of the backward movement. Therefore, in the case where the travel direction of the vehicle V is the direction of the forward movement in which the driver easily recognizes a view in the travel direction, it is possible to reduce the degradation in the drive performance by setting the suppression degree of the acceleration command value to be lower than in the case of the backward movement in which the driver less easily recognizes the view in the travel direction. Furthermore, in the case where the travel direction of the vehicle V is the direction of the backward movement in which the driver less easily recognizes a view in the travel direction, it is possible to enhance the acceleration suppression effect of the vehicle by setting the suppression degree of the acceleration command value to be higher than in the case of the forward movement in which the driver easily recognizes the view in the travel direction. As a result, it is possible to suppress the degradation in the drive performance of the vehicle V at the time of parking, and to suppress the acceleration of the vehicle V when the accelerator pedal 32 is erroneously manipulated.

(Modifications)

(1) In the present embodiment, the level of the parking frame certainty degree is less easily increased, and thus the suppression degree of the acceleration command value is low in the case where the travel direction of the vehicle V is the direction of the forward movement, in comparison with the case where the travel direction of the vehicle V is the direction of the backward movement. However, the present disclosure is not limited to this. That is, for example, the setting of at least one of the parallel degree threshold, the turning radius threshold, the first threshold, and the second threshold may be changed to make the level of the parking frame entering certainty degree less easily increased in the case where the travel direction of the vehicle V is the direction of the forward movement, in comparison with the case where the travel direction of the vehicle V is the direction of the backward movement. In this way, the level of the parking frame entering certainty degree may be calculated to be less easily increased such that the suppression degree of the acceleration command value is low in the case where the travel direction of the vehicle V is the direction of the forward movement, in comparison with the case where the travel direction of the vehicle V is the direction of the backward movement.

(2) In the present embodiment, by setting the predefined travel distance to be longer in the case where the travel direction of the vehicle V is the direction of the forward movement, than in the case where the travel direction of the vehicle V is the direction of the backward movement, to make the level of the parking frame certainty degree less easily increased. However, the present disclosure is not limited to this. That is, for example, in the processing of determining whether or not the above-described four conditions (C1 to C4) are satisfied, when the line La is broken and the travel direction of the vehicle V is the direction of the forward movement, the processing continues with the line of four meters extended with a virtual line of two meters or so. On the other hand, when the travel direction of the vehicle V is the direction of the backward movement, the processing continues with the line of five meters extended with a virtual line of three meters or so. In this way, the level of the parking frame certainty degree may be calculated to be less easily increased in the case where the travel direction of the vehicle V is the direction of the forward movement, in comparison with the case where the travel direction of the vehicle V is the direction of the backward movement.

(3) In the present embodiment, the travel direction of the vehicle V is detected by using the shift position sensor 20 and the shift position computing unit 10E described above. However, the present disclosure is not limited to this. That is, for example, the vehicle V may include a longitudinal acceleration sensor configured to detect acceleration in the longitudinal direction of the vehicle body (vehicle longitudinal direction) to detect the travel direction of the vehicle V on the basis of the acceleration detected by the longitudinal acceleration sensor.

(4) In the present embodiment, the acceleration suppression control start timing and the acceleration suppression control amount are computed on the basis of the total certainty degree calculated the total certainty degree calculation unit 40. However, the present disclosure is not limited to this. That is, the acceleration suppression control start timing and the acceleration suppression control amount may be computed on the basis of the parking frame certainty degree calculated by the parking frame certainty degree calculation unit 36 and whether the travel direction of the vehicle V is the direction of the forward movement or the backward direction. In this case, the acceleration suppression control start timing and the acceleration suppression control amount are computed by applying the parking frame certainty degree on the acceleration suppression condition computing map illustrated in FIG. 23. It is to be noted that FIG. 23 is a view illustrating the modification of the present embodiment.

(5) In the present embodiment, the suppression degree of the acceleration of the vehicle V is set to be lower in the case where the travel direction of the vehicle V is the direction of the forward movement, than in the case where the travel direction of the vehicle V is the direction of the backward movement. The control of the suppression degree of the acceleration is not limited to this. That is, the suppression degree of the acceleration of the vehicle V may be set to be lower in the case where the travel direction of the vehicle V is the direction of the backward movement, than in the case where the travel direction of the vehicle V is the direction of the forward movement.

(Third Embodiment)

Hereinafter, the third embodiment of the present disclosure (hereinafter, referred to as "the present embodiment") will now be described with reference to the drawings.

(Configuration)

Firstly, the configuration of the vehicular acceleration suppression device 1 according to the present embodiment will be described, by using FIG. 24, and referring to FIG. 1 to FIG. 23. The vehicular acceleration suppression device 1 according to the present embodiment is similar to the above-mentioned first embodiment except the processing performed by the acceleration suppression control computing unit 10I. Thus, the explanation for other than the processing performed by the acceleration suppression control computing unit 10I may be omitted.

Furthermore, the vehicular acceleration suppression device 1 according to the present embodiment is similar to the above-mentioned first embodiment in the processing other than the processing performed by the parking frame certainty degree calculation unit 36 and the total certainty degree calculation unit 40, out of processing performed by the acceleration suppression control computing unit 10I, and thus the explanation will be omitted.

In the processing of step S208, the parking frame certainty degree calculation unit 36 in the present embodiment receives an input of the steering angle signal, and determines whether or not the travel state of the vehicle V is a turning state to set the predefined travel distance on the basis of the determination result. Then, on the basis of the predefined travel distance set depending on whether or not the travel state of the vehicle V is the turning state, the processing of determining whether or not the satisfaction of the condition is continuously verified in the processing of step S206 after the processing of step S206 starts until the travel distance of the vehicle V reaches a predefined travel distance, is performed.

Note that the processing of determining whether or not the travel state of the vehicle V is the turning state is performed, for example, by referring to the manipulation amount (rotation angle) from the neutral position of the steering wheel 28 included in the steering angle signal. Furthermore, it is determined whether or not the rotation angle that has been referred is larger than a predefined turning state determination threshold (90 degrees, for example). Then, when the rotation angle that has been referred is larger than the turning state determination threshold, it is determined that the vehicle V is in the turning state.

It is to be noted that, the turning state determination threshold is not limited to 90 degrees, and it may be changed depending on the data of the vehicle V such as a brake performance of the vehicle V. Furthermore, for example, it may be changed depending on the local (national) traffic regulation where the vehicle V travels.

Note that the processing of setting the predefined travel distance set depending on whether or not the travel state of the vehicle V is the turning state is preformed, by referring to the steering angle signal received from the steering angle computing unit 10C.

Furthermore, in the present embodiment, as an example, a description will be also given of a case where the predefined travel distance is set to 2.5 m when it is determined that the travel state of the vehicle V is not the turning state, and the predefined travel distance is set to 1 m when it is determined that the travel state of the vehicle V is the turning state.

It is to be noted that the above-mentioned predefined travel distance is an example, and it may be changed depending on the data of the vehicle V such as a brake performance of the vehicle V. Furthermore, for example, it may be changed depending on the local (national) traffic regulation where the vehicle V travels.

Therefore, in the processing of step S208 in the present embodiment, in the case where the travel state of the vehicle V is the turning state, the level of the parking frame certainty degree is less easily calculated as "level 1", in comparison with the case where the travel state of the vehicle V is not the turning state.

Furthermore, the total certainty degree calculation unit 40 in the present embodiment is configured to perform, for example, a processing similar to the above-mentioned processing of the parking frame certainty degree calculation unit 36 to determine whether or not the travel state of the vehicle V is the turning state.

Furthermore, the total certainty degree calculation unit 40 in the present embodiment is configured to receive inputs of the parking frame certainty degree signal and the parking frame entering certainty degree signal, and to apply the parking frame certainty degree included in the parking frame certainty degree signal and the parking frame entering certainty degree included in the parking frame entering certainty degree signal on a total certainty degree calculation map illustrated in FIG. 24. Then, the total certainty degree is calculated on the basis of the parking frame certainty degree and the parking frame entering certainty degree.

It is to be noted that FIG. 24 is a view illustrating the total certainty degree calculation map used in the present embodiment. Furthermore, similarly to FIG. 13, the parking frame certainty degree is indicated as "frame certainty degree" and the parking frame entering certainty degree is indicated as "entering certainty degree" in FIG. 24.

Note that the total certainty degree calculation map used by the total certainty degree calculation unit 40 in the present embodiment is different from the total certainty degree calculation map used by the total certainty degree calculation unit 40 in the first embodiment in that the level of the total certainty degree changes depending on the determination result of whether or not the travel state of the vehicle V is the turning state. It is to be noted that in a column of the "entering certainty degree" in FIG. 24, the total certainty degrees when it is determined that the vehicle V is not in the turning state are indicated by "low non-turning state level" and "high non-turning state level". In addition to this, in a column of the "entering certainty degree" in FIG. 24, the total certainty degrees when it is determined that the vehicle V is in the turning state are indicated by "low turning state level" and "high turning state level".

Furthermore, as illustrated in FIG. 24, the total certainty degree calculation unit 40 in the present embodiment is configured to calculate the total certainty degree when it is determined that the vehicle V is in the turning state as being equal to or higher than the total certainty degree when it is determined that the vehicle V is not in the turning state.

In a example of processing by the total certainty degree calculation unit 40 in the present embodiment of calculating the total certainty degree, when the parking frame certainty degree is "level 2" and the parking frame entering certainty degree is "high non-turning state level", the total certainty degree is calculated as "low" as illustrated in FIG. 24. On the other hand, when the parking frame certainty degree is "level 2" and the parking frame entering certainty degree is "high turning state level", the total certainty degree is calculated as "high" as illustrated in FIG. 21.

Therefore, in the present embodiment, the total certainty degree is easily calculated to be higher level in the case where the vehicle V is in the turning state, than in the case where the vehicle V is not in the turning state. Accordingly, in the present embodiment, the suppression degree of the acceleration command value is higher in the case where the vehicle V is in the turning state, than in the case where the vehicle V is not in the turning state.

(Operation)

Next, referring to FIG. 1 to FIG. 24, an example of an operation performed by using the vehicular acceleration suppression device 1 in the present embodiment will be described. It is to be noted that the explanation for the operation similar to that in the above-mentioned first embodiment may be omitted. In the example of the operation described below, similarly to the above-mentioned first embodiment, an example in which the vehicle V moving in a parking space enters the parking frame L0 selected by the driver will be described.

While the vehicle V is traveling, the parking frame certainty degree calculation unit 36 calculates the parking frame certainty degree, and the parking frame entering certainty degree calculation unit 38 calculates the parking frame entering certainty degree. Then, the total certainty degree calculation unit 40 calculates the total certainty degree on the basis of the parking frame certainty degree and the parking frame entering certainty degree.

Furthermore, while the vehicle V is traveling, on the basis of the total certainty degree calculated by the total certainty degree calculation unit 40, the acceleration suppression control start timing computing unit 42 computes the acceleration suppression control start timing and the acceleration suppression control amount computing unit 44 computes the acceleration suppression control amount.

Then, when it is determined that the vehicle V enters the parking frame L0 and it is determined that the acceleration suppression control activation condition is satisfied, the acceleration suppression command value computing unit 10J outputs the acceleration suppression command value signal to the target throttle opening degree computing unit 10K. Furthermore, the target throttle opening degree computing unit 10K outputs the target throttle opening degree signal to the engine controller 12.

Note that, in the processing by the total certainty degree calculation unit 40 of calculating the total certainty degree in the present embodiment, the level of the total certainty degree is easily calculated to be higher level in the case where the vehicle V is in the turning state, than in the case where the vehicle V is not in the turning state.

Therefore, in the state where the acceleration suppression control activation condition is satisfied, the suppression degree of the acceleration command value is higher in the case where the vehicle V is in the turning state, than in the case where the vehicle V is not in the turning state. It is to be noted that the steering angle sensor 18 and the steering angle computing unit 10C described above correspond to a vehicle turning state detection unit.

Furthermore, as described above, in the vehicle acceleration suppression method according to the present embodiment, the acceleration command value corresponding to the manipulation amount of the accelerator pedal 32 is suppressed in a lower suppression degree in the case where the turning state of the vehicle V is not detected, than in the case where the turning state of the vehicle V is detected.

(Effects of Third Embodiment)

Hereinafter, effects of the present embodiment will be described. According to the present embodiment, following effects to be described below will be brought out, in addition to the effects of the first embodiment.

(1) The steering angle sensor 18 and the steering angle computing unit 10C detect whether or not the vehicle V is in the turning state. In addition to this, the acceleration suppression control start timing computing unit 42, the acceleration suppression control amount computing unit 44, the acceleration suppression command value computing unit 10J, and the target throttle opening degree computing unit 10K set the suppression degree of the acceleration command value to be lower in the case where the vehicle V is not in the turning state, than in the case where the vehicle V is in the turning state. That is, the acceleration suppression control start timing computing unit 42, the acceleration suppression control amount computing unit 44, the acceleration suppression command value computing unit 10J, and the target throttle opening degree computing unit 10K set the suppression degree of the acceleration command value to be higher in the case where the vehicle V is in the turning state, than in the case where the vehicle V is not in the turning state. Therefore, in the case where the travel state is a straight state in which the driver often intends to accelerate, it is possible to reduce the degradation in the drive performance by setting the suppression degree of the acceleration command value to be lower than in the case of the turning state in which the driver does not often intends to accelerate. Furthermore, in the case where the travel state is the turning state in which the driver does not often intends to accelerate, it is possible to enhance the acceleration suppression effect of the vehicle V by setting the suppression degree of the acceleration command value to be higher than in the case of the straight state in which the driver often intends to accelerate. As a result, it is possible to suppress the degradation in the drive performance of the vehicle V at the time of parking, and to suppress the acceleration of the vehicle V when the accelerator pedal 32 is erroneously manipulated.

(2) I n the in the vehicle acceleration suppression method according to the present embodiment, it is detected whether or not the vehicle V is in the turning state. The acceleration command value is suppressed in a lower suppression degree in the case where the turning state of the vehicle V is not detected, than in the case where the turning state of the vehicle V is detected. Therefore, in the case where the travel state is the straight state in which the driver often intends to accelerate, it is possible to reduce the degradation in the drive performance by setting the suppression degree of the acceleration command value to be lower than in the case of the turning state in which the driver does not often intends to accelerate. Furthermore, in the case where the travel state is the turning state in which the driver does not often intends to accelerate, it is possible to enhance the acceleration suppression effect of the vehicle by setting the suppression degree of the acceleration command value to be higher than in the case of the straight state in which the driver often intends to accelerate. As a result, it is possible to suppress the degradation in the drive performance of the vehicle V at the time of parking, and to suppress the acceleration of the vehicle V when the accelerator pedal 32 is erroneously manipulated.

(Modification)

(1) In the present embodiment, the level of the total certainty degree is easily calculated to be higher and thus the suppression degree of the acceleration command value is higher in the case where the case where the vehicle is in the turning state, than in the case where the vehicle is not in the turning state. However, the present disclosure is not limited to this. That is, for example, the acceleration suppression control start timing and the acceleration suppression control amount may be changed to make the suppression degree of the acceleration command value higher in the case where the vehicle is in the turning state, than in the case where the vehicle is not in the turning state. Furthermore, for example, the level of the parking frame certainty degree or the parking frame entering certainty degree may be easily calculated to be higher and thus the suppression degree of the acceleration command value may be higher in the case where the case where the vehicle is in the turning state, than in the case where the vehicle is not in the turning state.

(2) In the present embodiment, the turning state determination threshold is set to a value (90 degrees, for example) corresponding to the rotation angle of the steering wheel 28. However, the turning state determination threshold is not limited to this. That is, the vehicle V may have a configuration including a yaw rate sensor configured to detect the yaw rate of the vehicle V. The turning state determination threshold may be set to a value (100 R, for example) corresponding to the yaw rate of the vehicle V. Furthermore, the vehicle V may have a configuration including a turning angle sensor configured to detect the turning angle of the turning wheels (the front right wheel WFR and the front left wheel WFL, for example). The turning state determination threshold may be set to a value (6 degrees, for example) corresponding to the turning angle of the turning wheels.

(3) In the present embodiment, the acceleration suppression control start timing and the acceleration suppression control amount are computed on the basis of the total certainty degree calculated the total certainty degree calculation unit 40. However, the present disclosure is not limited to this. That is, the acceleration suppression control start timing and the acceleration suppression control amount may be computed on the basis of the parking frame certainty degree calculated by the parking frame certainty degree calculation unit 36 and the determination of whether or not the vehicle V is in the turning state. In this case, the acceleration suppression control start timing and the acceleration suppression control amount are computed by applying the parking frame certainty degree on the acceleration suppression condition computing map illustrated in FIG. 25. It is to be noted that FIG. 25 is a view illustrating the modification of the present embodiment.

Furthermore, when the travel state of the vehicle V is the turning state in a situation using the acceleration suppression condition computing map illustrated in FIG. 25, the acceleration suppression control start timing and the acceleration suppression control amount may be computed, for example, by using an acceleration suppression condition computing map similar to that illustrated in FIG. 22.

(Fourth Embodiment)

Hereinafter, the fourth embodiment of the present disclosure (hereinafter, referred to as "the present embodiment") will now be described with reference to the drawings.

(Configuration)

Firstly, the configuration of the vehicular acceleration suppression device 1 according to the present embodiment will be described, by using FIG. 26, and referring to FIG. 1 to FIG. 25. The vehicular acceleration suppression device 1 according to the present embodiment is similar to the above-mentioned first embodiment except the processing performed by the acceleration suppression control computing unit 10I.

Thus, the explanation for other than the processing performed by the acceleration suppression control computing unit 10I may be omitted.

Furthermore, the vehicular acceleration suppression device 1 according to the present embodiment is similar to the above-mentioned first embodiment in the processing other than the processing performed by the acceleration suppression activation condition determination unit 34 and the total certainty degree calculation unit 40, out of processing performed by the acceleration suppression control computing unit 10I, and thus the explanation will be omitted.

In the processing of step S106, the acceleration suppression activation condition determination unit 34 in the present embodiment determines which of predestined plural threshold vehicle speed regions the vehicle speed of the vehicle V matches. Then, after the processing of step S106, the processing performed by the acceleration suppression activation condition determination unit 34 in the present embodiment proceeds to step S108.

It is to be noted that, in the present embodiment, as an example, a description will be also given of a case where four regions are set as the plural threshold vehicle speed regions, as illustrated in FIG. 26. Furthermore, FIG. 26 is a view illustrating a map used in processing performed by the acceleration suppression control computing unit 10I in the present embodiment, and illustrates a relationship between the vehicle speed and the control.

Note that the four threshold speed regions include the first vehicle speed region equal to 0 km/h, the second vehicle speed region equal to or higher than 0 km/h and equal to or lower than 15 km/h, the third vehicle speed region higher than 15 km/h and equal to or lower than 20 km/h and the fourth vehicle speed region higher than 20 km/h.

Next, in the above-mentioned step S118, the acceleration suppression activation condition determination unit 34 in the present embodiment changes a condition by which it is determined that the vehicle V enters a parking frame, on the basis of the threshold vehicle speed region determined as matching the vehicle speed of the vehicle V in step S106. It is to be noted that, in FIG. 26, the condition by which it is determined that the vehicle V enters the parking frame is used as a condition of starting the acceleration suppression control and indicated as "control start" in a column of the "control".

In a specific example of the processing of changing the condition by which it is determined that the vehicle V enters the parking frame, when the vehicle speed of vehicle is in the first vehicle speed region or the second vehicle speed region, the acceleration suppression activation condition determination unit 34 performs a processing of setting the setting values in the above-mentioned condition A in the same manner as the above-mentioned first embodiment. Note that the setting value in the condition A is at least one of the redefined steering angle, the predefined time, the predefined angle, and predefined distance, described above. It is to be noted that, in FIG. 26, a symbol "o" indicate situations where the setting values in the conditions (A1 to A3) is set in the same manner as the above-mentioned first embodiment.

On the other hand, when the vehicle speed of the vehicle V is in the third vehicle speed region or the fourth vehicle speed region, the setting values in the condition A are changed such that it is less easily determined that the vehicle V enters the parking frame in comparison with the first embodiment. This is performed, for example, by changing the predefined value in the condition A1 to be longer than that in the first embodiment. It is to be noted that, in FIG. 26, a situation where the setting values in the condition A is changed such that it is less easily determined that the vehicle V enters the parking frame in comparison with the first embodiment, is indicated as "control start condition is regulated".

Furthermore, in the situation where the acceleration suppression control is activated, the acceleration suppression activation condition determination unit 34 in the present embodiment changes a condition for continuing the active acceleration suppression control, on the basis of the threshold vehicle speed region determined as matching the vehicle speed of the vehicle V in step S106. It is to be noted that, in FIG. 26, the condition for continuing the active acceleration suppression control is indicated as "control continuation", in a column of the "control".

In a specific example of the processing of changing the condition for continuing the active acceleration suppression control, when the vehicle speed of the vehicle V is in a region other than the fourth vehicle speed region, the acceleration suppression activation condition determination unit 34 performs a processing of continuing the active acceleration suppression control. It is to be noted that, in FIG. 26, as symbol "o" indicates situations continuing the active acceleration suppression control.

On the other hand, when the vehicle speed of the vehicle V is in the fourth vehicle speed region, the acceleration suppression activation condition determination unit 34 performs a processing of making the active acceleration suppression control easy to be terminated, for example, by changing the setting values in the condition A such that it is less easily determined that the vehicle V enters the parking frame in comparison with the first embodiment. It is to be noted that, in FIG. 26, a situation where the active acceleration suppression control is easily terminated as "control termination condition is relaxed".

Furthermore, the total certainty degree calculation unit 40 in the present embodiment is configured to receive an input of the vehicle speed computed value and to perform a processing, which is similar to the processing performed by the acceleration suppression activation condition determination unit 34, of determining which of the threshold vehicle speed regions the vehicle speed of the vehicle V matches. It is to be noted that, in the processing by the total certainty degree calculation unit 40 of determining which of the threshold vehicle speed regions the vehicle speed of the vehicle V matches, the processing result by the acceleration suppression activation condition determination unit 34 may be used.

Then, the total certainty degree calculation unit 40 in the present embodiment is configured to perform of calculating the total certainty degree on the basis of the parking frame certainty degree and the parking frame entering certainty degree, and of changing the level of the total certainty degree on the basis of the threshold vehicle speed regions matching the vehicle speed of the vehicle V. It is to be noted that, in FIG. 26, the processing of changing the level of the total certainty degree is indicated as "certainty degree" in a column of the "control"

In a specific example of the processing of changing the level of the total certainty degree, when the vehicle speed of the vehicle V in the first vehicle speed region or the second vehicle speed region, the total certainty degree calculation unit 40 performs a processing of maintains the level of the total certainty degree calculated on the basis of the parking frame certainty degree and the parking frame entering certainty degree. It is to be noted that, in FIG. 26, a symbol "-" indicates a situation where the level of the total certainty degree calculated on the basis of the parking frame certainty degree and the parking frame entering certainty degree is maintained.

On the other hand, in a state where the vehicle speed of the vehicle V in the third vehicle speed region, the total certainty degree calculation unit 40 performs a processing of maintains the level of the total certainty degree calculated on the basis of the parking frame certainty degree and the parking frame entering certainty degree, when the acceleration suppression control is activated. It is to be noted that, in FIG. 26, a situation where the level of the total certainty degree is maintained when the acceleration suppression control is activated is indicated as "certainty degree is maintained during control"

Furthermore, in a state where the vehicle speed of the vehicle V in the third vehicle speed region, the total certainty degree calculation unit 40 performs a processing of decrease the level of the total certainty degree calculated on the basis of the parking frame certainty degree and the parking frame entering certainty degree (for example, decreasing the level by one stage), when the acceleration suppression control is not activated. It is to be noted that, in FIG. 26, a situation where the level of the total certainty degree is decreased when the acceleration suppression control is not activated is indicated as "certainty degree is decreased other than during control".

Furthermore, in a state where the vehicle speed of the vehicle V in the fourth vehicle speed region, the total certainty degree calculation unit 40 performs a processing of decrease the level of the total certainty degree calculated on the basis of the parking frame certainty degree and the parking frame entering certainty degree (for example, decreasing the level by one stage) regardless of whether or not the acceleration suppression control is activated. It is to be noted that, in FIG. 26, a situation where the level of the total certainty degree is decreased regardless of whether or not the acceleration suppression control is activated is indicated as "certainty degree is decreased across the board".

Therefore, in the present embodiment, the total certainty degree is easily calculated as a lower level, as the vehicle speed of the vehicle V is higher. In this way, in the present embodiment, the acceleration command value is suppressed in a higher suppression degree, as the vehicle speed of the vehicle V is lower.

(Operation)

Next, referring to FIG. 1 to FIG. 26, an example of an operation performed by using the vehicular acceleration suppression device 1 in the present embodiment will be described. It is to be noted that the explanation for the operation similar to that in the above-mentioned first embodiment may be omitted. In the example of the operation described below, similarly to the above-mentioned first embodiment, an example in which the vehicle V moving in a parking space enters the parking frame L0 selected by the driver will be described.

While the vehicle V is traveling, the parking frame certainty degree calculation unit 36 calculates the parking frame certainty degree, and the parking frame entering certainty degree calculation unit 38 calculates the parking frame entering certainty degree. Then, the total certainty degree calculation unit 40 calculates the total certainty degree on the basis of the parking frame certainty degree and the parking frame entering certainty degree.

Furthermore, while the vehicle V is traveling, on the basis of the total certainty degree calculated by the total certainty degree calculation unit 40, the acceleration suppression control start timing computing unit 42 computes the acceleration suppression control start timing and the acceleration suppression control amount computing unit 44 computes the acceleration suppression control amount.

Then, when it is determined that the vehicle V enters the parking frame L0 and it is determined that the acceleration suppression control activation condition is satisfied, the acceleration suppression command value computing unit 10J outputs the acceleration suppression command value signal to the target throttle opening degree computing unit 10K. Furthermore, the target throttle opening degree computing unit 10K outputs the target throttle opening degree signal to the engine controller 12.

Note that, in the present embodiment, in the processing by the total certainty degree calculation unit 40 of calculating the total certainty degree, the total certainty degree is easily calculated as a lower level, as the vehicle speed of the vehicle V is higher.

Therefore, in the state where the acceleration suppression control activation condition is satisfied, the acceleration command value is suppressed in a higher suppression degree, as the vehicle speed of the vehicle V is lower. It is to be noted that the wheel speed sensor 16 and the vehicle speed computing unit 10B correspond a vehicle speed detection unit.

Furthermore, as described above, in the vehicle acceleration suppression method according to the present embodiment, the acceleration command value corresponding to the manipulation amount of the accelerator pedal 32 is suppressed in a lower suppression degree, as the vehicle speed of the vehicle V is higher.

(Effects of Fourth Embodiment)

Hereinafter, effects of the present embodiment will be described. According to the present embodiment, following effects to be described below will be brought out, in addition to the effects of the first embodiment.

(1) The wheel speed sensor 16 and the vehicle speed computing unit 10B detect the vehicle speed of the vehicle V. In addition to this, the acceleration suppression control start timing computing unit 42, the acceleration suppression control amount computing unit 44, the acceleration suppression command value computing unit 10J, the target throttle opening degree computing unit 10K suppress the acceleration command value in a lower suppression degree, as the vehicle speed of the vehicle is higher. That is, the acceleration suppression control start timing computing unit 42, the acceleration suppression control amount computing unit 44, the acceleration suppression command value computing unit 10J, the target throttle opening degree computing unit 10K suppress the acceleration command value in a higher suppression degree, as the vehicle speed of the vehicle is lower. Therefore, in the case where the vehicle speed of the vehicle V is high and the driver highly likely not to intend to park the vehicle V, the suppression degree of the acceleration command value is set to be lower than in the case where the vehicle speed of the vehicle V is low and the driver highly likely to intend to park the vehicle V. Thus, it is possible to reduce the degradation in the drive performance. Furthermore, in the case where the vehicle speed of the vehicle V is low and the driver highly likely to intend to park the vehicle V, the suppression degree of the acceleration command value is set to be higher than in the case where the vehicle speed of the vehicle V is high and the driver highly likely not to intend to park the vehicle V. Thus, it is possible to enhance the acceleration suppression effect of the vehicle V. As a result, it is possible to suppress the degradation in the drive performance of the vehicle V at the time of parking, and to suppress the acceleration of the vehicle V when the accelerator pedal 32 is erroneously manipulated.

(2) In the in the vehicle acceleration suppression method according to the present embodiment, the acceleration command value is suppressed in a lower suppression degree, as the vehicle speed of the vehicle V is higher. Therefore, in the case where the vehicle speed of the vehicle V is high and the driver highly likely not to intend to park the vehicle V, the suppression degree of the acceleration command value is set to be lower than in the case where the vehicle speed of the vehicle V is low and the driver highly likely to intend to park the vehicle V. Thus, it is possible to reduce the degradation in the drive performance. Furthermore, in the case where the vehicle speed of the vehicle V is low and the driver highly likely to intend to park the vehicle V, the suppression degree of the acceleration command value is set to be higher than in the case where the vehicle speed of the vehicle V is high and the driver highly likely not to intend to park the vehicle V. Thus, it is possible to enhance the acceleration suppression effect of the vehicle V. As a result, it is possible to suppress the degradation in the drive performance of the vehicle V at the time of parking, and to suppress the acceleration of the vehicle V when the accelerator pedal 32 is erroneously manipulated.

(Modifications)

(1) In the present embodiment, the level of the total certainty degree is easily calculated to be lower and thus the suppression degree of the acceleration command value is lower, as the vehicle speed of the vehicle V is higher. However, the present disclosure is not limited to this. That is, for example, the acceleration suppression control start timing and the acceleration suppression control amount may be changed to make the suppression degree of the acceleration command value lower, as the vehicle speed of the vehicle V is higher. Furthermore, for example, the level of the parking frame certainty degree or the parking frame entering certainty degree may be easily calculated to be lower and thus the suppression degree of the acceleration command value may be higher, as the vehicle speed of the vehicle V is higher.

(2) In the present embodiment, the four regions are set as the plural threshold vehicle speed regions, however, the present disclosure is not limited to this. Two regions, three regions, or five or more regions may be set as the plural threshold vehicle speed regions. Furthermore, the predefined speeds of the respective threshold vehicle speed regions are not limited to the above-mentioned speeds. For example, they may be set or changed depending on the data of the vehicle V such as a brake performance of the vehicle V.

While a limited number of embodiments have been described with illustration herein, it should be apparent that the present disclosure is not limited to them and modifications and adaptations to each of the embodiments on the basis of the above disclosure may occur to one skilled in the art.

The invention claimed is:

1. A vehicular acceleration suppression device for suppressing acceleration of a vehicle which depends on a manipulation amount of a drive force instruction manipulation element manipulated by a driver to instruct a drive force to control suppression of the drive force, the vehicular acceleration suppression device comprising:

a drive force manipulation amount detection unit configured to detect a drive force manipulation amount which is the manipulation amount of the drive force instruction manipulation element;

an acceleration control unit configured to control the acceleration of the vehicle depending on the drive force manipulation amount detected by the drive force manipulation amount detection unit;

a surrounding environment recognition unit configured to recognize an environment surrounding the vehicle based on detection information of a surrounding environment recognition sensor provided on the vehicle;

a vehicle travel direction detection unit configured to detect a travel direction of the vehicle;

a parking frame certainty degree calculation unit configured to calculate a parking frame certainty degree indicative of a degree of certainty about a presence of a parking frame in the travel direction of the vehicle based on the environment recognized by the surrounding environment recognition unit; and an acceleration suppression unit configured to suppress the acceleration controlled by the acceleration control unit based on the parking frame certainty degree calculated by the parking frame certainty degree calculation unit and the travel direction detected by the vehicle travel direction detection unit, wherein the acceleration suppression unit is configured to decrease a suppression degree of the acceleration depending on the travel direction detected by the vehicle travel direction detection unit.

2. The vehicular acceleration suppression device according to claim 1, further comprising:

a vehicle travel state detection unit configured to detect a travel state of the vehicle;

a parking frame entering certainty degree calculation unit configured to calculate a parking frame entering certainty degree indicative of a degree of certainty about whether the vehicle enters the parking frame based on the environment recognized by the surrounding environment recognition unit and the travel state detected by the vehicle travel state detection unit; and a total certainty degree calculation unit configured to calculate a total certainty degree indicative of a total degree of the certainty of the parking frame certainty degree and the parking frame entering certainty degree based on the parking frame certainty degree calculated by the parking frame certainty degree calculation unit and the parking frame entering certainty degree calculated by the parking frame entering certainty degree calculation unit, wherein the acceleration suppression unit is configured to set the suppression degree of the acceleration to be lower when the total certainty degree calculated by the total certainty degree calculation unit is lower than when the total certainty degree is higher.

3. The vehicular acceleration suppression device according to claim 1, further comprising:

a vehicle current position detection unit configured to detect a current position of the vehicle; and a vehicle travel road type detection unit configured to detect a road type of a road on which the vehicle travels, wherein the parking frame certainty degree calculation unit is configured to calculate the parking frame certainty degree by using the current position detected by the vehicle current position detection unit and the road type detected by the vehicle travel road type detection unit.

4. The vehicular acceleration suppression device according to claim 1, wherein the acceleration suppression unit is configured to decrease the suppression degree of the acceleration by delaying an acceleration suppression control start timing which is a start timing of the suppression of the acceleration controlled by the acceleration control unit.

5. The vehicular acceleration suppression device according to claim 1, wherein the acceleration suppression unit is configured to decrease the suppression degree of the acceleration by decreasing an acceleration suppression control amount which is a control amount for suppressing the acceleration controlled by the acceleration control unit.

6. A vehicular acceleration suppression method for suppressing acceleration of a vehicle which depends on a manipulation amount of a drive force instruction manipulation element manipulated by a driver to instruct a drive force to control suppression of the drive force, the vehicular acceleration suppression method comprising:

detecting a drive force manipulation amount which is the manipulation amount of the drive force instruction manipulation element, and a travel direction of the vehicle;

recognizing an environment surrounding the vehicle;

calculating a parking frame certainty degree indicative of a degree of certainty about a presence of a parking frame in the travel direction of the vehicle based on the environment which has been recognized; and suppressing the acceleration of the vehicle, which is controlled depending on the drive force manipulation amount which has been detected, in a suppression degree decreased depending on the travel direction which has been detected.

7. The vehicular acceleration suppression method according to claim 6, further comprising:

detecting a travel state of the vehicle;

calculating a parking frame entering certainty degree indicative of a degree of certainty about whether the vehicle enters the parking frame based on the environment which has been recognized and the travel state which has been detected;

calculating a total certainty degree indicative of a total degree of the certainty of the parking frame certainty degree and the parking frame entering certainty degree based on the parking frame certainty degree and the parking frame entering certainty degree which has been calculated, wherein the acceleration is suppressed in a lower suppression degree when the total certainty degree which has been calculated is lower than when the total certainty degree is higher.

* * * * *